United States Patent
Hosokawa et al.

(10) Patent No.: US 6,341,202 B1
(45) Date of Patent: Jan. 22, 2002

(54) OPERATION DIAL WITH AN ILLUMINATOR FOR A CAMERA

(75) Inventors: Tetsuo Hosokawa; Toshihiro Hamamura, both of Tokyo; Hiroyuki Takahashi, Tochigi; Shigeru Iwamoto; Tadahisa Ohkura, both of Saitama; Hidefumi Kaneko, Tokyo, all of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/598,799

(22) Filed: Jun. 21, 2000

(30) Foreign Application Priority Data

| Jun. 22, 1999 | (JP) | .............. | 11-175570 |
| Jun. 22, 1999 | (JP) | .............. | 11-175968 |
| Jun. 24, 1999 | (JP) | .............. | 11-178423 |

(51) Int. Cl.[7] .............................................. G03B 17/00
(52) U.S. Cl. .................... 396/281; 396/299; 396/543
(58) Field of Search ................ 396/293, 292, 396/297, 299, 281, 284, 287, 300, 543; 362/23, 30; 116/46, 47, 48, 49

(56) References Cited

U.S. PATENT DOCUMENTS

| 4,137,864 A | 2/1979 | Lauper |
| 4,196,988 A | 4/1980 | Kawasaki |
| 5,122,829 A | 6/1992 | Takami |
| 5,233,378 A | 8/1993 | Hosokawa et al. |
| RE35,415 E | 12/1996 | Takami |
| 5,745,809 A | * 4/1998 | Kawahata ................... 396/287 |
| 5,749,005 A | 5/1998 | Haga et al. |
| 5,761,554 A | 6/1998 | Kirigaya et al. |
| 5,822,628 A | 10/1998 | Sato et al. |
| 5,915,133 A | 6/1999 | Hirai et al. |

FOREIGN PATENT DOCUMENTS

| EP | 0709513 | 5/1996 |
| JP | 7-041529 | 7/1995 |
| JP | 9-197463 | 7/1997 |

* cited by examiner

Primary Examiner—Russell Adams
Assistant Examiner—Arthur A Smith
(74) Attorney, Agent, or Firm—Greenblum & Bernstein, P.L.

(57) ABSTRACT

An operation device of a camera includes an indication member comprising a plurality of characters, an operation member which is movable relative to the indication member and includes an index mark for pointing at one of the plurality of characters when the operation member stops at a corresponding stop position thereof; and an illuminating device which illuminates at least one of the plurality of characters at which the index mark points. Also disclosed is a control device for controlling the illuminating device to be turned ON and OFF in a predetermined particular pattern immediately after the power of the camera is turned ON, wherein the control device does not turn the illuminating device ON and OFF in the predetermined particular pattern thereafter, in a power-ON state of the camera.

54 Claims, 26 Drawing Sheets

OPERATION DIAL WITH AN ILLUMINATOR FOR A CAMERA

BACKGROUND OF THE INVENTION

1. Field of the Invention

The present invention relates to an operation dial provided on a camera body and, more particularly, to an operation dial with an illuminator which can be effectively used specifically as a mode dial for selecting a desired shooting mode (e.g., an exposure mode) from different shooting modes.

2. Description of the Related Art

In cameras having a program auto select mode in which a programmed AE (auto exposure) mode is automatically selected from different programmed AE modes based on the photographic situation, the camera bodies are usually provided thereon with an operation device for manually selecting the program auto select mode. One known type of the operation device is provided with a manually rotatable member (e.g., a mode select dial) on which a character representing the program auto select mode is printed. The program auto select mode is selected by manually rotating the rotatable member so that the character is set opposite an index mark formed on the camera body. If the program auto select mode is selected in advance, a microcomputer in the camera body chooses the most appropriate auto exposure mode from different programs based on object distance, brightness, lens focal length, etc. Some camera bodies are provided with an LCD panel which indicates the most appropriate auto exposure mode selected.

According to such a known type of operation device having the manually rotatable member, the user can confirm whether the program auto select mode has been currently selected by visually checking whether the character representing the program auto select mode on the rotatable member is currently set at the index mark. However, the user cannot confirm which program has been automatically selected from the different programs in the program auto select mode.

Cameras having a manual exposure mode, a shutter-priority AE mode and a program AE mode, and provided with a shutter dial on which numerals of different shutter speeds, a character representing an auto shutter-speed mode and other characters representing the program AE mode and other AE modes, are known in the art. In this type of camera, if the user desires to select one of the different shutter speeds, he or she operates the shutter dial so that the desired shutter speed printed on the shutter dial is set to the index mark formed on the camera body. Likewise, if the user desires to select one of different AE modes, he or she operates the shutter dial to select one of the different AE mode positions in the same manner. In the case where the user selects one of the different shutter speeds by operating the shutter dial, if the user wants to know the currently-selected shutter speed, the user needs to see the numerals of the currently-selected shutter speed on the shutter dial, at the index mark, which is currently set. Further, in the case where the user selects an AE mode by operating the shutter dial, he or she cannot know the selected shutter speed, which is automatically selected based mainly on object brightness, by looking at the shutter dial.

SUMMARY OF THE INVENTION

An object of the present invention is to provide an operation member which makes it possible to manually select a desired mode or parameter from different modes or parameters easily, and at the same time, a subordinate mode or parameter which is automatically selected from different subordinate modes or parameters by visually confirming the manually selected mode or parameter by looking at the operation member.

Another object of the present invention is to provide an operation device of a camera having an auto select mode in which a mode is selected from different modes based on the photographic conditions, wherein the auto select mode is selected by operating an operation member which can indicate whether the auto select mode has been automatically selected and further indicate which subordinate mode has been currently selected in the auto select mode.

Other objects of the present invention will become apparent from the detailed description to follow taken in conjunction with the appended claims.

To achieve the object mentioned above, according to an aspect of the present invention, there is provided an operation device of a camera is provided, which includes an indication member having a plurality of characters; an operation member which is movable relative to the indication member and comprises an index mark for pointing at one of the plurality of characters when the operation member stops at a corresponding stop position thereof; and an illuminating device which illuminates at least one of the plurality of characters at which the index mark points.

According to this structure, since a character formed on the indication member which is selected manually with an operation member from a plurality of characters is illuminated by an illuminating device, the operation member and the indication member are closely related to each other. This makes it easy for the user to visually confirm the currently selected character which represents, e.g., a corresponding mode or setting.

Preferably, the camera includes a control device for selecting at least one of a mode, a function, and a setting which corresponds to one of the plurality of characters at which the index mark is set at, to operate in accordance with the selected mode, function, and setting.

Preferably, the camera includes an auto picture mode in which an appropriate mode is automatically selected from different modes based on predetermined conditions.

Preferably, the illuminating device includes a plurality of light emitters so that each of the plurality of light emitters can illuminate a corresponding one of the plurality of characters.

In an embodiment, in the case where the power of the camera is ON, the control device controls the illuminating device, which corresponds to the one of the plurality of characters at which the index mark points, to be illuminated, and wherein after a predetermined time has elapsed, the control device controls the illuminating device to be turned off.

Preferably, the manual operation dial includes a shutter selecting dial which can select a shutter speed or shutter auto selected mode.

In an embodiment, the illuminating device does not illuminate the one of the plurality of characters even in the case where the one of the plurality of characters is set at the index mark.

In an embodiment, the illuminating device emits a plurality of illuminating lights of different colors.

In an embodiment, the control device turns each of the plurality of light emitters ON and OFF in a predetermined particular pattern immediately after the power of the camera is turned ON, wherein the control device does not turn the plurality of light emitters ON and OFF in the predetermined particular pattern thereafter in a power-ON state of the camera.

In an embodiment, the camera includes an auto picture mode in which an appropriate mode is automatically selected from different modes based on predetermined conditions; and a flash-prohibiting auto picture mode in which an appropriate mode is automatically selected from the different modes based on predetermined conditions, a flashlight unit, which is coupled to the camera body, being prohibited from discharging in the flash-prohibiting auto picture mode. One of the plurality of characters represents one of the auto picture mode and the flash-prohibiting auto picture mode; wherein the remaining characters of the plurality of characters represent each respective remaining the different modes.

In an embodiment, in the case where the power of the camera is ON while the index mark is set at the one of the plurality of characters which represents one of the auto picture mode and the flash-prohibiting auto picture mode, the control device turns ON one of the plurality of light emitters which corresponds to the one of the plurality of characters which represents one of the auto picture mode and the flash-prohibiting auto picture mode; and the control device further turns ON another one of the plurality of light emitters which corresponds to one of the another characters of the plurality of characters which represents one of the different modes that is automatically selected in one of the auto picture mode and the flash-prohibiting auto picture mode.

Preferably, a stop mechanism is further included for stopping the operation member at the corresponding stop position.

Preferably, the stop mechanism is disposed to lie substantially in a plane in which the illuminating device lies.

Preferably, the operation member is formed as a rotatable cylindrical member which is rotatable relative to the camera body, and wherein the indication member is formed as a disk member which is surrounded by the operation member.

Preferably, a support disk is further included positioned behind the indication member, the illuminating device being fixed to the support disk; wherein the operation member includes a bezel having the index mark which is rotatable around the indication member and the support disk.

Preferably, the bezel includes a bottom end member, the bottom end member having a through hole at the center thereof. The support disk includes an axial shaft which is fitted in the through hole, the support disk being fixed to the camera body via the axial shaft.

In an embodiment, a stop mechanism is further provided for stopping the operation member at the corresponding stop position; wherein the stop mechanism includes a series of click holes formed on the bottom end member at predetermined intervals a spring member part of which is fixed to the support disk; and a click ball which is fitted in a spring member hole formed on the spring member to stay engaged with the spring member hole. The click ball is continuously pressed against the bottom end member by the spring member so as to be engaged with one of the series of click holes when a rotation operation of the bezel stops.

In an embodiment, the illuminating device includes a plurality of LEDs which are arranged on the support disk substantially along a circle at predetermined intervals. The support disk includes a receiving hole in which the spring member is positioned, the plurality of LEDs being arranged on portion of the support disk other than a portion of the support disk on which the receiving hole is formed; and wherein the spring member is positioned so that the hole thereof is positioned in the receiving hole.

In an embodiment, in the case where the operation member is operated while the control device is controlling the plurality of light emitters to be turned ON and OFF in the predetermined particular pattern, the lighting controller stops turning the plurality of light emitters ON and OFF in the predetermined particular pattern and subsequently turns ON one of the plurality of light emitters which corresponds to one of the plurality of characters at which the index mark is set at.

In an embodiment, the control device controls the illuminating device to be turned ON and OFF in the predetermined particular pattern, between a first mode and a second mode. In the first mode, the control device controls the plurality of light emitters to be turned ON and OFF regularly immediately after the power of the camera is turned ON. In the second mode, the control device controls the plurality of light emitters to be turned ON and OFF irregularly immediately after the power of the camera is turned ON.

In an embodiment, the control device switches between the first mode and the second mode each time a battery is loaded in the camera body in the case where the index mark is set at a second one of the plurality of characters.

In an embodiment, the control device controls the plurality of light emitters to be turned ON and OFF in the predetermined particular pattern immediately after the power of the camera is turned ON only when the index mark is set at the auto picture mode.

In an embodiment, the camera body includes a built-in flash unit; the control device, receiving lens information from a interchangeable lens attached to the camera body, determines whether the attached interchangeable lens is identified as a type of lens wherein a picture mode can be selected according to the lens information. In the case where the control device determines that the auto picture mode cannot be selected, the control device does not turn each of the plurality of light emitters ON and OFF immediately after the power of the camera in turned ON.

In an embodiment, when the camera is switched ON, the control device selects one mode from a mode wherein the plurality of light emitters are turned ON and OFF and a mode wherein the plurality of light emitters are not turned ON and OFF.

According to another aspect of the present invention, an operation device of a camera is provided, including an indication member including a plurality of characters; an operation member which is movable relative to the indication member and includes an index mark for pointing at one of the plurality of characters when the operation member stops at a corresponding stop position thereof; an illuminating device; and a control device for controlling the illuminating device. The illuminating device illuminates the one of the plurality of characters at which the index mark points, wherein the one character displays an auto picture mode in which an appropriate mode is automatically selected from different modes based on predetermined conditions. One of the plurality of characters represents the auto picture mode and the remaining characters of the plurality of characters represent each respective remaining the different modes. The control device to be turned ON and OFF in a predetermined particular pattern immediately after the power of the camera is turned ON. The power-state of the camera is ON while the index mark is set at the one of the plurality of characters which represents one of the auto picture mode and the flash-prohibiting auto picture mode, the control device turns ON one of the plurality of light emitters which corresponds to the one of the plurality of characters which represents of the auto picture mode.

Preferably, the camera further includes a flash-prohibiting auto picture mode in which an appropriate mode is automatically selected from the different modes based on predetermined conditions, a flashlight unit, which is coupled to the camera body, being prohibited from discharging in the flash-prohibiting auto picture mode. One of the plurality of characters represents one of the auto picture mode and the flash-prohibiting auto picture mode and the remaining characters of the plurality of characters represent each respective remaining the different modes.

In an embodiment, the illuminating device includes a plurality of light emitters so that each of the plurality of light emitters can illuminate a corresponding one of the plurality of characters, wherein the control device controls the plurality of light emitters to be turned ON and OFF regularly immediately after the power of the camera is turned ON.

In an embodiment, the illuminating device includes a plurality of light emitters so that each of the plurality of light emitters can illuminate a corresponding one of the plurality of characters; and wherein the control device controls the plurality of light emitters to be turned ON and OFF irregularly immediately after the power of the camera is turned ON.

In an embodiment, immediately after the power of the camera is turned ON, the control device controls the plurality of light emitters to be firstly turned ON in order, and subsequently turned OFF in order after all of the plurality of light emitters are turned ON.

In an embodiment, immediately after the power of the camera is turned ON, the control device controls the plurality of light emitters to be turned ON and OFF one by one at random.

In an embodiment, the illuminating device includes a plurality of light emitters so that each of the plurality of light emitters can illuminate a corresponding one of the plurality of characters; wherein the control device turns ON all of the plurality of light emitters before a predetermined period of time elapses after the power of the camera is turned ON. The control device turns one of the plurality of light emitters which corresponds to one of the plurality of characters at which the index mark is set at, after the predetermined period of time elapses.

In an embodiment, the illuminating device includes a plurality of light emitters so that each of the plurality of light emitters can illuminate a corresponding one of the plurality of characters, wherein the control device controls the plurality of light emitters to be turned ON and OFF in the predetermined particular pattern immediately after the power of the camera is turned ON only when the index mark is set at a specific one of the plurality of characters.

In an embodiment, the illuminating device includes a plurality of light emitters so that each of the plurality of light emitters can illuminate a corresponding one of the plurality of characters; wherein, in the case where the operation member is operated while the control device is controlling the plurality of light emitters to be turned ON and OFF in the predetermined particular pattern, the lighting controller stops turning the plurality of light emitters ON and OFF in the predetermined particular pattern and subsequently turns ON one of the plurality of light emitters which corresponds to one of the plurality of characters at which the index mark is set at.

In an embodiment, the control device comprehensively controls overall operations of the camera; wherein the control device stops turning the plurality of light emitters ON and OFF in the predetermined particular pattern in the case where the operation member is operated while the control device is controlling the plurality of light emitters to be turned ON and OFF in the predetermined particular pattern.

In an embodiment, the control device controls the illuminating device to be turned ON and OFF in the predetermined particular pattern, between a first mode and a second mode. In the first mode, the control device controls the plurality of light emitters to be turned ON and OFF regularly immediately after the power of the camera is turned ON. In the second mode, the control device controls the plurality of light emitters to be turned ON and OFF irregularly immediately after the power of the camera is turned ON.

In an embodiment, the control device sets one of a first mode or a second mode. In the first mode, the control device controls the illuminating device to be turned ON and OFF regularly immediately after the power of the camera is turned ON. In the second mode, the control device does not control the illuminating device to be turned ON and OFF irregularly immediately after the power of the camera is turned ON. The control device switches between the first mode and the second mode each time a battery is loaded in the camera body in the case where the index mark is set at a second one of the plurality of characters.

In an embodiment, the illuminating device emits a plurality of illuminating lights of different colors.

In an embodiment, a color of one of the plurality of illuminating lights which illuminates a corresponding one of the plurality of characters is different from a color of another one of the plurality of illuminating lights which illuminates a corresponding another one of the plurality of characters.

In an embodiment a first one of the plurality of characters represents the auto picture mode and is illuminated by one of the plurality of illuminating lights which has a first color. A second one of the plurality of characters represents the flash-prohibiting auto picture mode and is illuminated by another one of the plurality of illuminating lights which has a second color that is different from the first color. The remaining characters of the plurality of characters represent each respective remaining the different modes and are respectively illuminated by yet another one of the plurality of illuminating lights which have a common third color that is different from the first color and the second color.

In an embodiment, at least one of the plurality of characters represents a corresponding mode which is not automatically selected in one of the auto picture mode and the flash-prohibiting auto picture mode, at least one of the plurality of characters being illuminated by yet another one of the plurality of illuminating lights which has a fourth color that is different from the first, second and common third color.

Preferably, at least two of the plurality of characters which can be illuminated by the illuminating device represent corresponding at least two different program exposure modes.

In an embodiment, at least two of the plurality of characters which can be illuminated by the illuminating device correspond to respective at least two groups of numerals which represent different shutter speeds.

According to another aspect of the present invention, an operation device of a camera is provided, including an indication member including a plurality of characters; an operation member which is movable relative to the indication member and includes an index mark for pointing at one of the plurality of characters when the operation member stops at a corresponding stop position thereof; an illuminating device which illuminates at least one of the plurality of characters at which the index mark points; and a stop mechanism for stopping the operation member at the corresponding stop position, wherein the stop mechanism lies substantially in a plane in which the illuminating device lies.

Preferably, the operation device further includes a support member on which the at least one light emitter is mounted; wherein the indication member includes a second plurality of characters, wherein character portions of the indication member which respectively correspond to the second plurality of characters are opaque, and at least one element of the stop mechanism is fixed to part of the support member which faces the opaque portions of the indication member.

In an embodiment, the operation member is formed as a rotatable cylindrical member which is rotatable relative to the camera body, and wherein the indication member is formed as a disk member which is surrounded by the operation member.

In an embodiment, the operation device further includes a support disk positioned behind the indication member, the illuminating device being fixed to the support disk. The operation member includes a bezel having the index mark which is rotatable around the indication member and the support disk.

Preferably, the bezel includes a bottom end member, the bottom end member having a through hole at the center thereof, wherein the support disk includes an axial shaft which is fitted in the through hole, the support disk being fixed to the camera body via the axial shaft.

Preferably, the operation device further includes a stop mechanism for stopping the operation member at the corresponding stop position. The stop mechanism includes a series of click holes formed on the bottom end member at predetermined intervals, a spring member part of which is fixed to the support disk, and a click ball which is fitted in a spring member hole formed on the spring member to stay engaged with the spring member hole. The click ball is continuously pressed against the bottom end member by the spring member so as to be engaged with one of the series of click holes when a rotation operation of the bezel stops.

In an embodiment, the illuminating device includes a plurality of LEDs which are arranged on the support disk substantially along a circle at predetermined intervals. The support disk includes a receiving hole in which the spring member is positioned, the plurality of LEDs being arranged on portion of the support disk other than a portion of the support disk on which the receiving hole is formed; and the spring member is positioned so that the hole thereof is positioned in the receiving hole.

Preferably, the operation device further includes a control device for selecting at least one of a mode, a function, and a setting which corresponds to one of the plurality of characters at which the index mark is set at, to operate in accordance with the selected mode, function, and setting; wherein in the case where power of the camera is ON, the control device controls one of the plurality of LEDs, which corresponds to the one of the plurality of characters at which the index mark points, to be turned ON.

In an embodiment, the control device turns OFF one of the plurality of LEDs after a predetermined period of time elapses after the one of the plurality of LEDs is turned ON; and the control device turns ON one of the plurality of LEDs which corresponds to the one of the plurality of characters at which the index mark is set at, each time the bezel is operated.

In an embodiment, the camera includes an auto picture mode in which an appropriate mode is automatically selected from different modes based on predetermined conditions; and a flash-prohibiting auto picture mode in which an appropriate mode is automatically selected from the different modes based on predetermined conditions, a flashlight unit, which is coupled to the camera body, being prohibited from discharging in the flash-prohibiting auto picture mode. One of the plurality of characters represents one of the auto picture mode and the flash-prohibiting auto picture mode. The remaining characters of the plurality of characters represent each respective remaining the different modes. In the case where the power of the camera is ON while the index mark is set at the one of the plurality of characters which represents one of the auto picture mode and the flash-prohibiting auto picture mode, the control device turns ON one of the plurality of LEDs which corresponds to the one of the plurality of characters which represents one of the auto picture mode and the flash-prohibiting auto picture mode; and the control device further turns ON another one of the plurality of LEDs which corresponds to one of the another characters of the plurality of characters which represents one of the different modes that is automatically selected in one of the auto picture mode and the flash-prohibiting auto picture mode. In the case where the power of the camera is ON while the index mark is set at one of the another characters of the plurality of characters which respectively represent the different modes, the controller turns ON one of the plurality of LEDs which corresponds to the one of the another characters of the plurality of characters which respectively represent the different modes.

In an embodiment, the control device turns each of the plurality of LEDs ON and OFF in a predetermined particular pattern immediately after the power of the camera is turned ON, wherein the control device does not turn the plurality of LEDs ON and OFF in the predetermined particular pattern thereafter, in a power-ON state of the camera.

The present disclosure relates to subject matter contained in Japanese Patent Applications No.11-175570 (filed on Jun. 22, 1999), No.11-175968 (filed on Jun. 22, 1999) and No.11-178423 (filed on Jun. 24, 1999) which are expressly incorporated herein by reference in their entireties.

BRIEF DESCRIPTION OF THE DRAWINGS

The present invention will be described below in detail with reference to the accompanying drawings in which.

DESCRIPTION OF THE PREFERRED EMBODIMENTS

Figure 1:
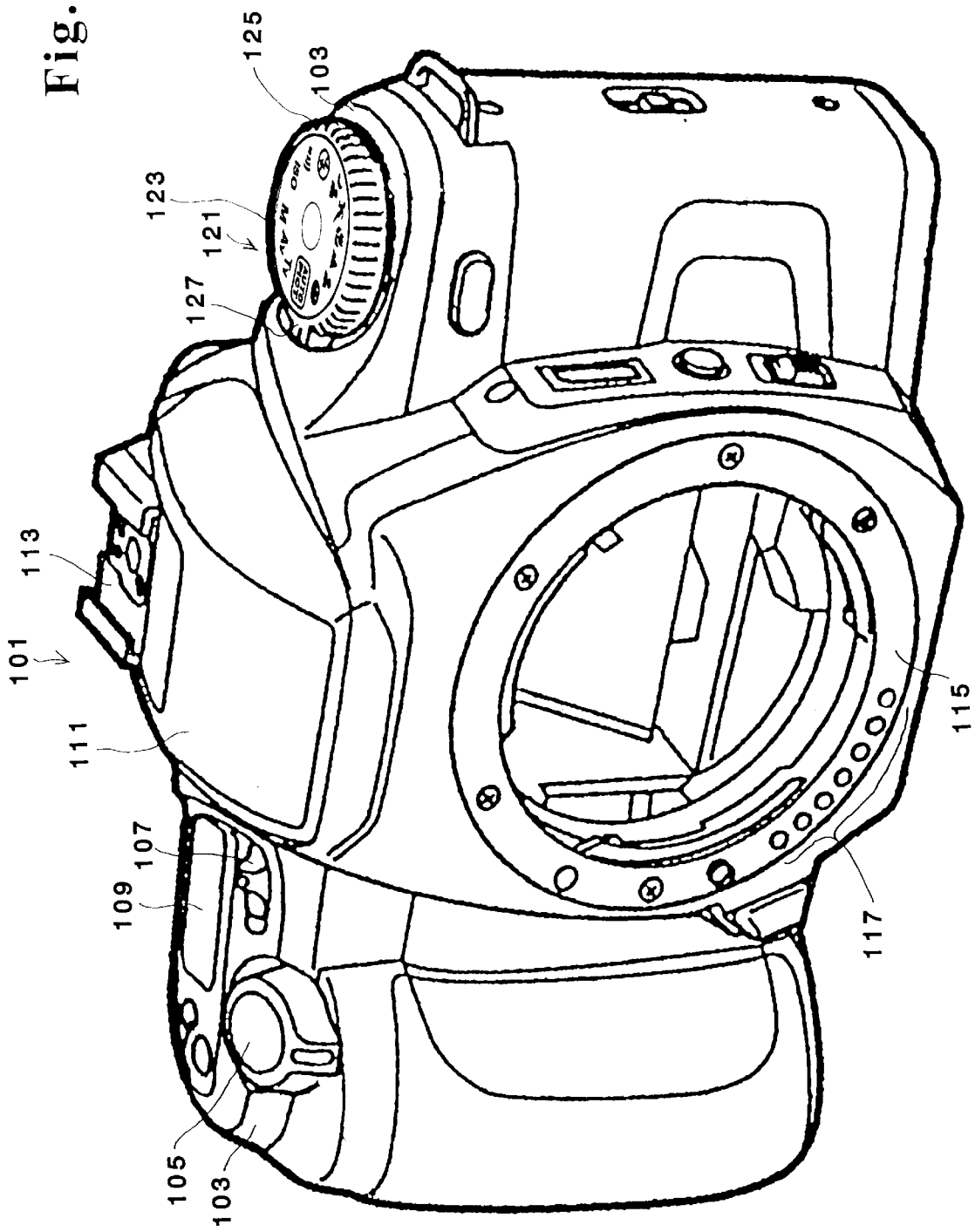
FIG. 1 is a perspective view of an embodiment of a camera body of an SLR camera system, according to the present invention.

FIG. 1 shows an embodiment of a camera body of an AE/AF SLR camera system to which the present invention is applied. The camera body 101 is provided on a top cover 103 thereof with a release button 105, which is positioned on the left side of the top cover 103 as viewed in FIG. 1. The camera body 101 is provided on the top cover 103 behind the release button 105 with a main switch knob 107 and an external LCD panel 109. The external LCD panel 109 indicates various photographic information such as frame number, shutter speed, aperture value and other information. The camera body 101 is provided on the top center thereof with a retractable built-in auto flash (built-in flash unit) 111 which is controlled by a CPU (control device) 11 of the camera body 101 via a built-in flash control circuit 53 (see FIG. 3). The camera body 101 is provided thereon immediately behind the built-in flash 111 with a hot shoe 113 to which an external flash can be coupled. Although the details are not herein discussed, the built-in flash 111 is provided therein with a flashlight unit including a reflector, a xenon tube (flashlight emitter) and a Fresnel lens. The flashlight unit is supported and driven by a pop-up mechanism so that the unit can move between a retracted position (shown in FIG. 1) and a pop-up position (discharge position) where the Fresnel lens faces the object. The pop-up mechanism is provided with a spring which continuously biases the built-in flash 111 towards the pop-up position and a hold mechanism for holding the built in flash 111 at the retracted position against the spring force of the aforementioned spring when the built-in flash 111 is retracted.

The camera body 101 is provided, on the top cover 103 on the right side thereof as viewed in FIG. 1, with a mode dial 121 adapted as a device for manually selecting a desired mode from different modes. The camera body 101 is provided on a front face thereof with an annular body mount 115 to which an interchangeable lens 61 (see FIG. 3) is detachably attached. The camera body 101 is provided on the body mount 115 with an array of contacts 117 which come into contact with a corresponding array of contacts provided on the interchangeable lens 61 so that the CPU 11 can communicate with a lens CPU 63 (see FIG. 3) to input various lens information such as open aperture value and focal length to the CPU 11.

The mode dial 121 is provided with a mode indication disk (indication member/disk member) 123 fixed to the top cover 103 and a bezel (operation member/rotatable cylindrical member) 125 rotatably fitted around the mode indication disk 123. The mode indication disk 123 is provided thereon circumferentially about a central axis thereof with a plurality of characters (thirteen characters 124a through 124m in this particular embodiment) each representing a corresponding mode. Namely, there are thirteen modes which can be selected by operating the mode dial 121. The bezel 125 is provided with an index mark 127. After the bezel 125 is rotated manually, it always stops by a click-stop mechanism (stop mechanism) so that the index mark 127 is set at (points to) one of the plurality of characters 124a through 124m. When the index mark 127 is set to one of the thirteen characters 124a through 124m, the corresponding one of the thirteen modes is selected.

Figure 4A:
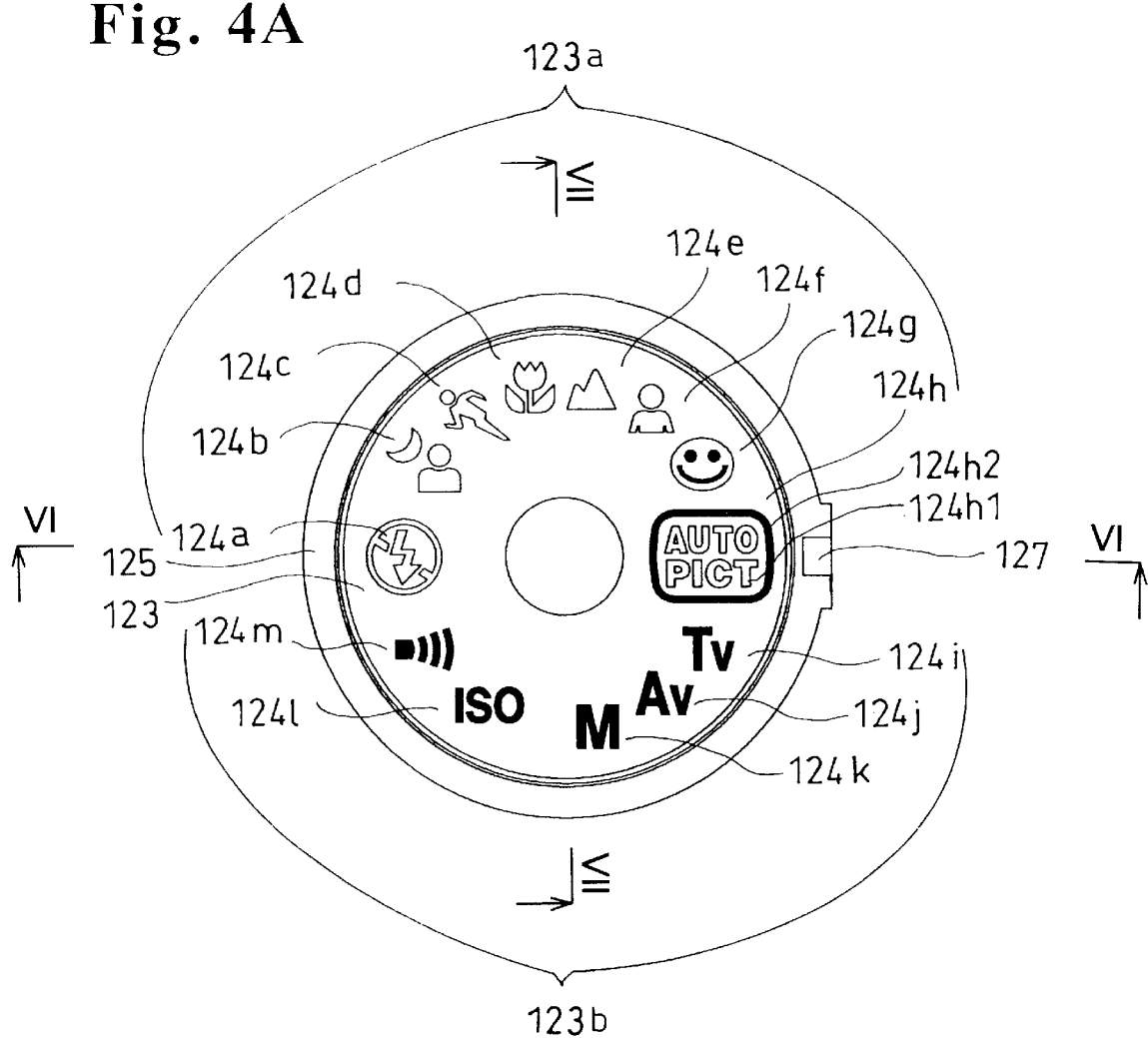
FIG. 4A is a plan view of a fundamental element of the mode dial provided on the camera body shown in FIG. 1.

The thirteen characters 124a through 124m are classified into two groups: the first group (character portions) 123a including eight characters 124a through 124h and the second group 123b including the remaining five characters 124i through 124m (refer to FIG. 4A). Portions of the mode indication disk 123 which respectively correspond to the first group of characters 123a are designed to be translucent so that each character in the first group 123a can be illuminated by a corresponding light emitter from the bottom (behind) of the mode indication disk 123 (i.e., from the inside of the camera body 101). None of the characters in the second group 123b are illuminated by a light emitter.

Figure 2:
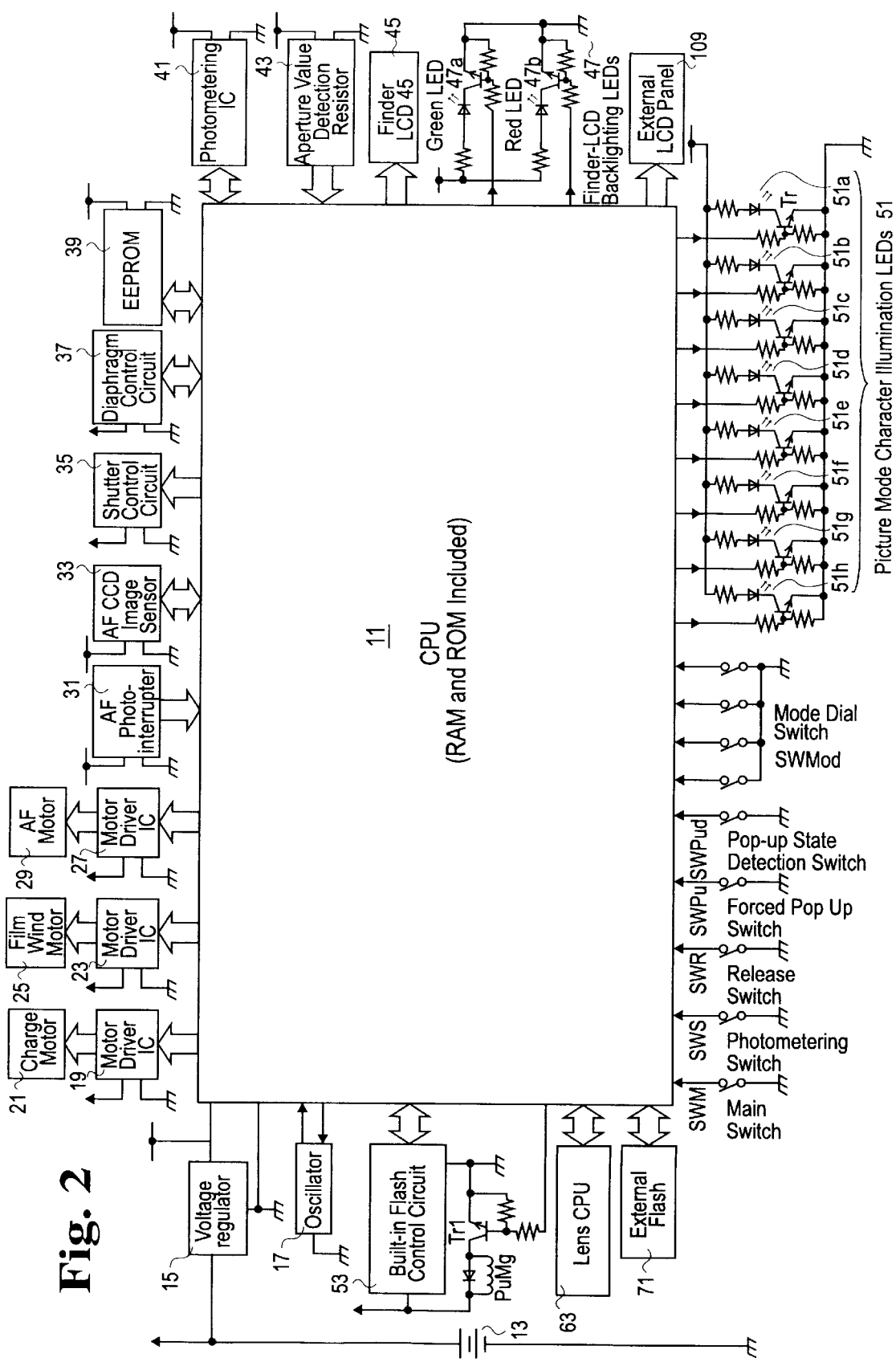
FIG. 2 is a block diagram of an embodiment of a control circuit of the camera body shown in FIG. 1.
Figure 3:
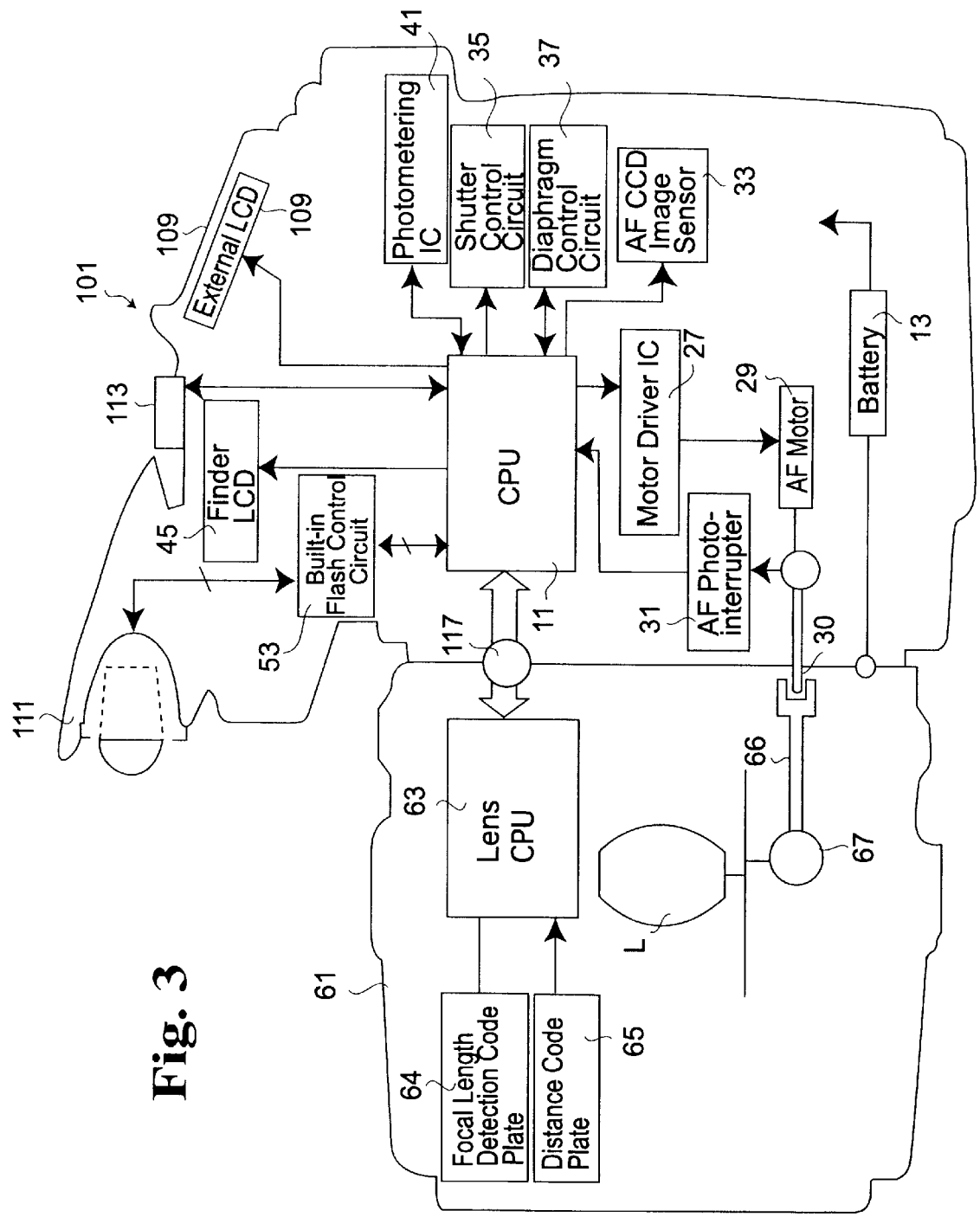
FIG. 3 is a schematic block diagram of fundamental elements of the SLR camera system according to the present invention, showing a state where an interchangeable lens is coupled to the camera body shown in FIG. 1.

Control system of the camera body 101 will be hereinafter discussed in detail with reference to FIGS. 2 and 3. The camera body 101 is provided with the CPU 11 which comprehensively controls the overall operations of the camera system. The CPU 11 is provided therein with a ROM in which control programs regarding various functions of the camera are written, and a RAM for temporarily storing information such as various parameters and lens information. As shown in FIG. 2, in addition to the CPU 11, the camera body 101 is provided therein with a voltage regulator 15, an oscillator 17, a first motor driver IC 19, a charge motor 21, a second motor driver IC 23, a film wind motor 25, a third motor driver IC 27, an AF motor 29, an AF photo interrupter 31, an AF CCD image sensor 33, a shutter control circuit 35, a diaphragm control circuit 37 and an EEPROM 39. The camera body 101 is further provided therein with a photometering IC 41, an aperture value detection resistor 43, a finder LCD 45, a pair of LEDs (green and red LEDs) 47 and eight LEDs (picture mode character illumination LEDs/ illumination device) 51 (51a through 51h). The camera body 101 is further provided therein with a main switch SWM, a photometering switch SWS, a release switch SWR, a forced pop-up switch SWPU, a pop-up state detection switch SWPud and a mode dial switch SWMod.

The EEPROM 39, in which information about the number of exposures of a film roll, and various re-writable parameters and modes are written, is connected to the CPU 11. Power of a battery 13 accommodated in a battery chamber (not shown) of the camera body 101 is supplied to the CPU 11 as a constant voltage power via the voltage regulator 15. The CPU 11 supplies the constant voltage power to the oscillator 17 to cause the oscillator 17 to output clock pulses. The CPU 11 operates in synchronism with the clock pulses output from the oscillator 17

The main switch SWM, the photometering switch SWS, the release switch SWR, the forced pop-up switch SWPu, the pop-up state detection switch SWPud and the mode dial switch SWMod are each connected to the CPU 11. The mode dial switch SWMod is interconnected with the bezel 125.

The main switch SWM is interconnected with the main switch knob 107 so that the main switch SWM is turned ON when the main switch knob 107 is operated. If the main switch SWM is turned ON, the CPU 11 starts operating, so that the CPU 11 supplies power to peripheral elements and at the same time the CPU 11 starts performing various operations which correspond to the ON/OFF states of the switches operated.

The photometering switch SWS and the release switch SWR are interconnected with the release button 105 so that the photometering switch SWS and the release switch SWR are turned ON when the release button 105 is depressed half way down and fully depressed, respectively. Immediately after the photometering switch SWS is turned ON, the CPU 11 inputs a photometering signal from the photometering IC 41 to calculate the object brightness. Based on this object brightness, the CPU 11 performs an AE calculation process ("AE Calculation Process" shown in FIG. 14) in which the optimum shutter speed and the optimum aperture value in the selected exposure mode are calculated. At the same time the CPU 11 inputs video signals of the object image from the AF CCD image sensor (a phase-difference detection CCD sensor) 33 to calculate the amount of defocus to perform an AF process ("AF Process" shown in FIGS. 9A and 9B). In the AF process, the CPU 11 drives the AF motor 29 by an amount corresponding to the amount of defocus via the motor driver IC 27 to move a focusing lens group L of the interchangeable lens 61 to an axial position where an in-focus state is obtained. Rotation of the AF motor 29 is transmitted to a joint 66 provided in the interchangeable lens 61 via an AF coupler 30 to drive an focal length adjusting mechanism 67 in the interchangeable lens 61 via the AF coupler 30 and the joint 66 to thereby move the focusing lens group L to an axial position thereof where an in-focus state is obtained. The AF photo-interrupter 31 outputs pulses in association with rotation of the AF motor 29 so that the number of pulses output from the AF photo-interrupter 31 corresponds to the amount of movement of the focusing lens group L. The CPU 11 inputs pulses output from the AF photo-interrupter 31 to control the amount of driving of the AF motor 29 in accordance with the input pulses. The photometering IC 41 is provided with a multi-segment photometering sensor, so that the camera measures and compares photometric readings in segmented areas of the photographic field.

Immediately after the release switch SWR is turned ON, the CPU 11 drives a quick-return mirror (see FIG. 1) to rise, controls the diaphragm control circuit 37 to stop down the iris diaphragm of the interchangeable lens 61 in accordance with the aperture value determined by the AE calculation process, and subsequently controls the shutter circuit 35 to release the shutter (focal plane shutter) in accordance with the determined shutter speed. Upon the completion of exposure, the CPU 11 drives the charge motor 21 via the motor driver IC 19 to make the quick-return mirror fall back and to charge the shutter mechanism, i.e., charge the drive springs of the leading and trailing curtains of the shutter mechanism. Subsequently the CPU 11 drives the film wind motor 25 via the motor driver IC 23 to wind film by one frame.

The forced pop-up switch SWPu is interconnected with a forced pop-up button or knob (not shown) provided on the camera body 101 in the vicinity of the built-in flash 111. Immediately after the forced pop-up switch SWPU is turned ON, i.e., the forced pop-up button is depressed, the CPU 11 turns a switching transistor Trl (shown in FIG. 2) ON to supply power to a pop-up magnet PuMg (shown in FIG. 2) to thereby release the engagement of the hold mechanism with the built-in flash 111 held at the retracted positioned thereof by the hold mechanism. Upon the release of the engagement of the hold mechanism with the built-in flash 111, the built-in flash 111 pops up by the aforementioned spring of the pop-up mechanism to be positioned at discharge position. The CPU 11 detects that the built-in flash 111 has popped up to the discharge position via the pop-up state detection switch SWPud, which is turned ON when the built-in flash 111 rises to the discharge position. The pop-up state detection switch SWPud is turned OFF when the built-in flash 111 moves from the discharge position towards the retracted position.

If the CPU 11 detects low-light and/or backlight conditions in accordance with data such as object brightness data obtained from the photometering IC 41 and ISO speed data, the CPU 11 supplies power to the pop-up magnet PuMg to make the built-in flash 111 pop-up so as to make it discharge automatically. When an external flash 71 (see FIG. 2) is attached to the hot shoe 113, the CPU 11 prohibits the built-in flash 111 from popping up to prevent the built-in flash 111 from bumping against the external flash 71 and when the CPU 11 controls the external flash 71 instead of the built-in flash 111.

The mode dial switch SWMod is a four-bit code switch which is turned ON and OFF in accordance with the rotational stop position (click-stop position) of the bezel 125. The CPU 11 selects one of the thirteen modes, functions or parameters which corresponds to one of the thirteen characters 124a, 124b, 124c, 124d, 124e, 125f, 125g, 125h, 125i, 125j, 125k, 125l or 125m which the index mark 127 is set to, i.e., which corresponds to the click-stop position of the bezel 125.

The finder LCD 45, which is positioned to be seen in the viewfinder, and the external LCD panel 109 are connected to the CPU 11. Each of the finder LCD 45 and the external LCD panel 109 indicates various photographic information such as frame number, shutter speed, aperture value. In a state where the main switch SWM is OFF, nothing is indicated on the finder LCD 45, while information necessary prior to picture taking is indicated on the external LCD panel 109. Such information includes, e.g., film status information (loaded/advance/rewind), film counter indication if film is properly loaded, and rewind completion state. In a state where the main switch SWM is ON, in addition to the film counter indication, the currently selected shutter speed/ mode, and other information are indicated on the external LCD panel 109, whereas nothing is indicated on the finder LCD 45 yet until the AE calculation process starts to be performed by an operation of the mode dial 121. After the AE calculation process is performed, the calculated optimum shutter speed, aperture value and other useful information are indicated on each of the finder LCD 45 and the external LCD panel 109.

Two LEDs 47 (a green LED 47*a* and a red LED 47*b*) illuminate information indicated on the finder LCD 45. The CPU 11 turns the green LED 47*a* ON in a normal photographic condition, while the CPU 11 turns the red LED 47*b* ON in a warning condition (e.g., when the selected shutter speed is slower than a slowest shutter speed calculated to prevent blurred images due to hand movement) to illuminate the finder LCD 45 by red light so as to warn the user that a desired photographic image will not be obtained.

Eight transistors Tr for driving the eight LEDs (picture mode character illumination LEDs 51*a* through 51*h*) 51 independently of one another which illuminate the eight characters 124*a* through 124*h* of the first group 123*a* on the mode indication disk 123, respectively, are connected to the CPU 11. In the illustrated embodiment, when the main switch SWM is turned ON or when one of the program modes represented by the corresponding one of the first group of characters 123*a* (124*a* through 124*h*) is selected by an operation of the bezel 125, the corresponding one of the eight LEDs (light emitters) 51*a*, 51*b*, 51*c*, 51*d*, 51*e*, 51*f*, 51*g* and 51*h* is turned ON to illuminate the corresponding character 124*a*, 124*b*, 124*c*, 124*d*, 124*e*, 124*f*, 124*g* or 125*h* by turning the corresponding transistor Tr ON in a corresponding predetermined manner.

In a state where the interchangeable lens 61 having the lens CPU 63 is coupled to the camera body 101, the CPU 11 data-communicates with the lens CPU 63 to input various lens information such as the focal length (the current focal length if the lens 61 is of a zoom lens), the object distance (the position of the focal lens group L) and the open aperture value. The lens CPU 63 detects the focal length via a focal length detection code plate 64 (see FIG. 3) and further detects the object distance (the position of the focal lens group L) via a distance code plate 65 to send the detected focal length and the detected object distance to the CPU 11 of the camera body 101.

Structure of Mode Dial 121

Figure 4B:
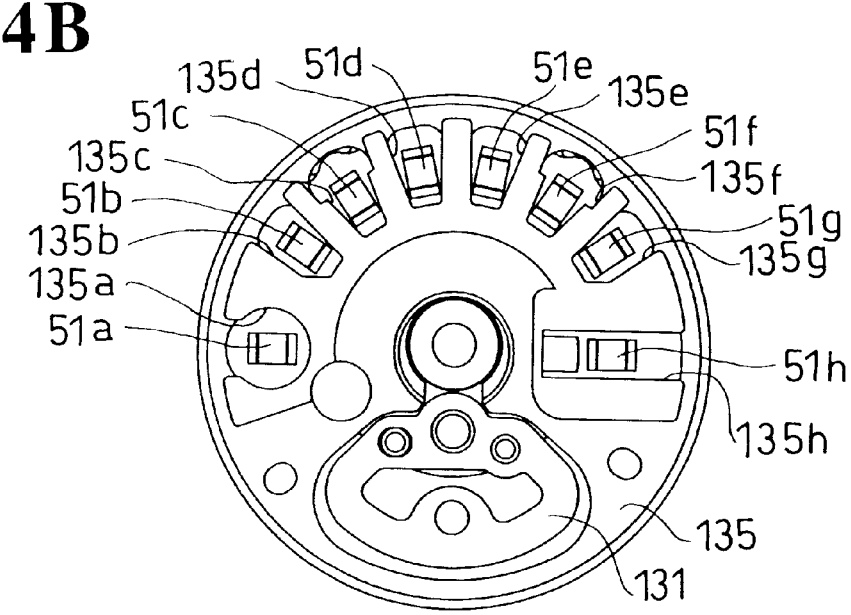
FIG. 4B is a plan view of another fundamental element of the mode dial provided on the camera body shown in FIG. 1.
Figure 4C:
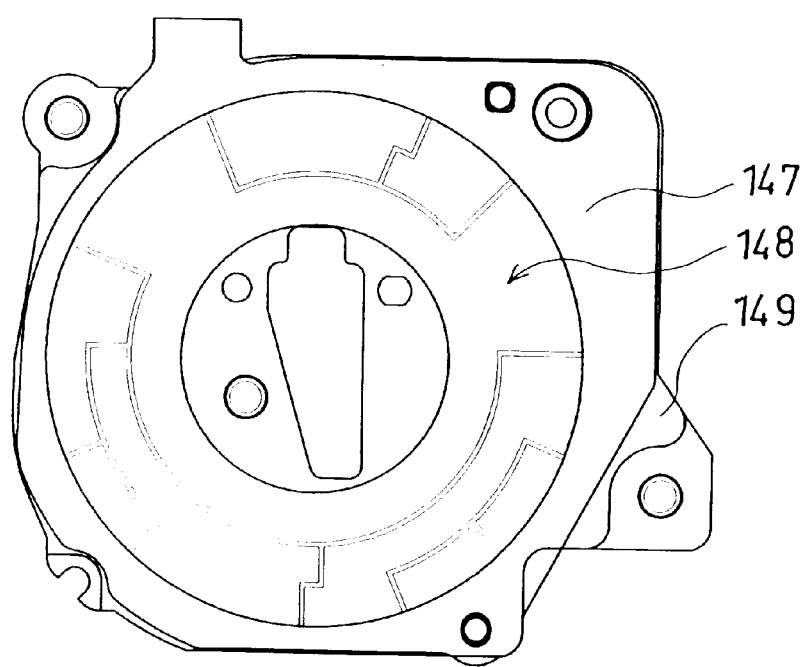
FIG. 4C is a plan view of another fundamental element of the mode dial provided on the camera body shown in FIG. 1.
Figure 5:
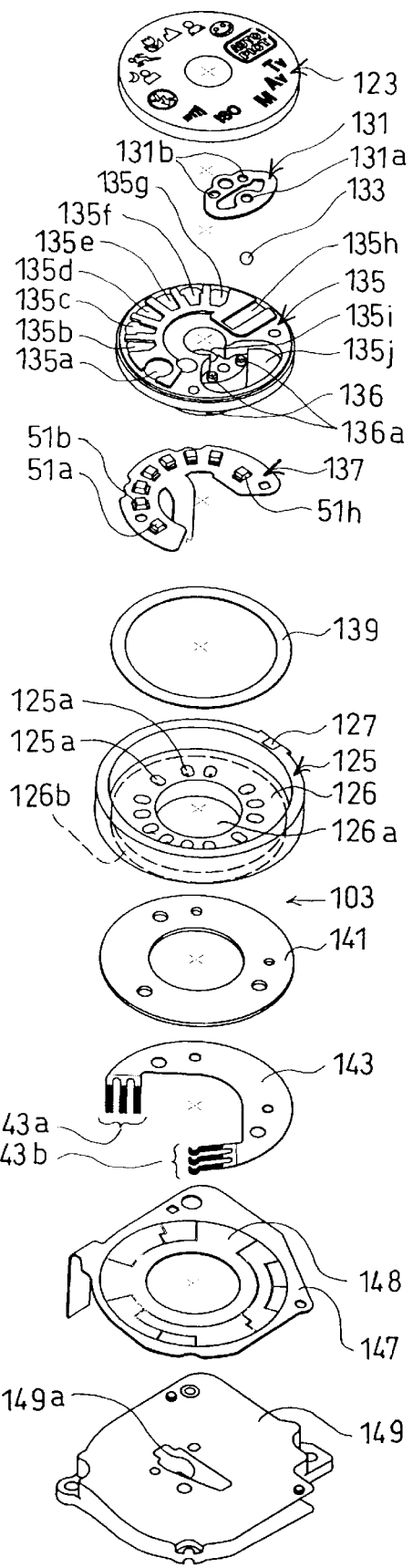
FIG. 5 is an exploded perspective view of the mode dial provided on the camera body shown in FIG. 1.
Figure 6:
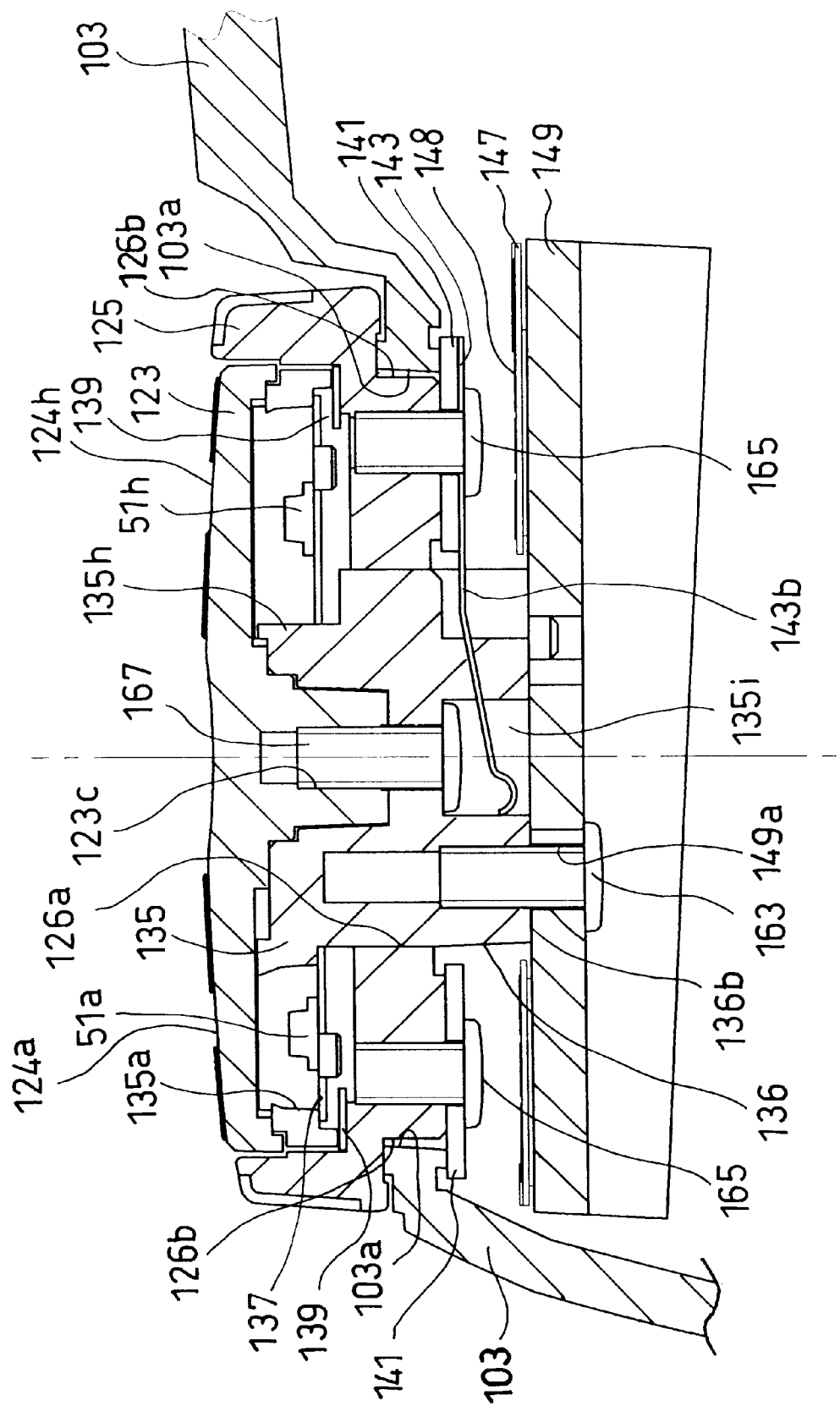
FIG. 6 is a cross sectional view of the mode dial provided on the camera body shown in FIG. 1, taken along a vertical plane extending in a right/left direction of the camera body and substantially crossing through the axis of the mode dial, as viewed from the back of the camera body.
Figure 7:
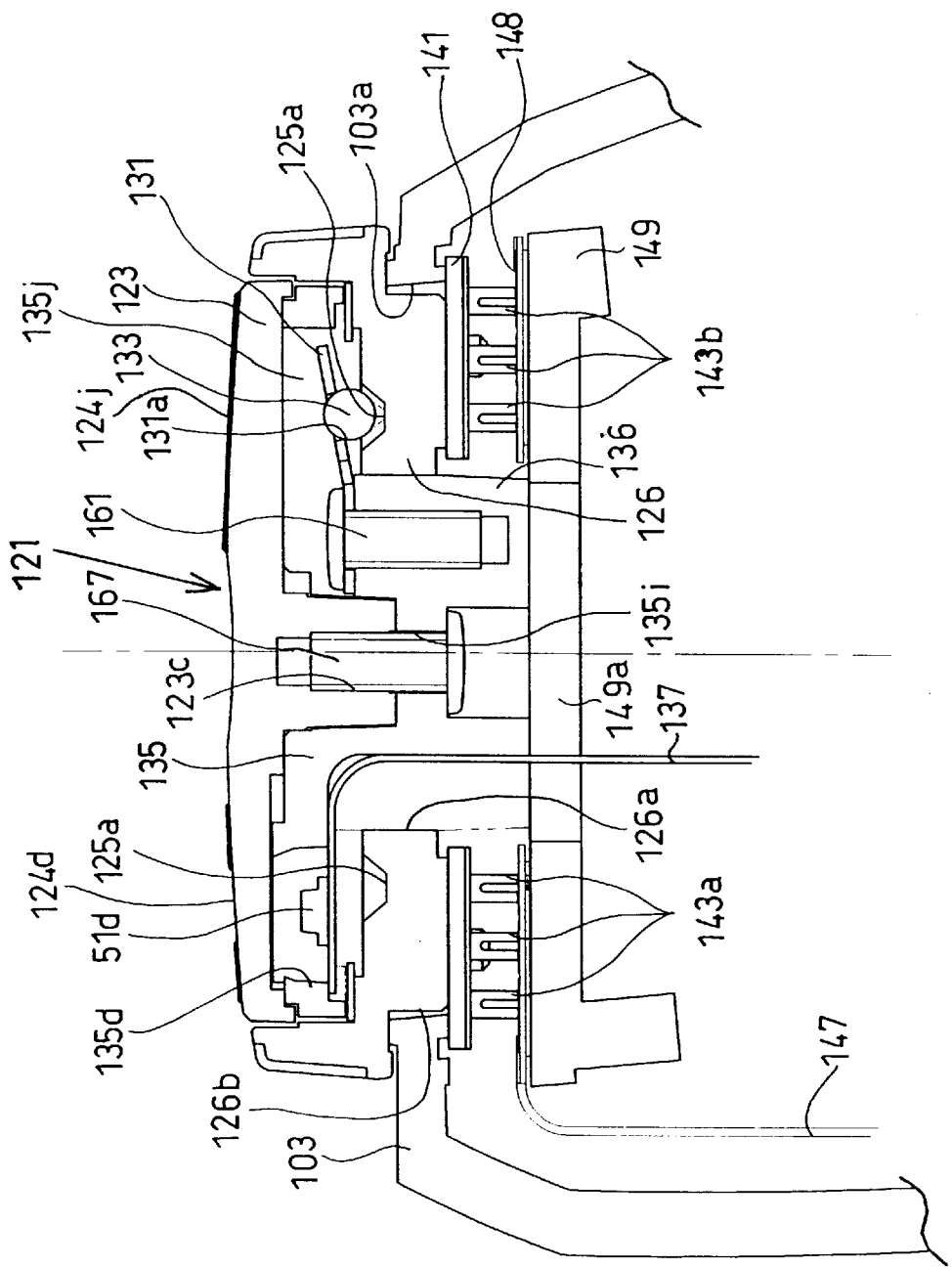
FIG. 7 is a cross sectional view of the mode dial provided on the camera body shown in FIG. 1, taken along a vertical plane extending in a front/rear direction of the camera body and substantially crossing through the axis of the mode dial, as viewed from the left side of the camera body.

The structure of the mode dial 121 will be hereinafter discussed in detail with reference to FIGS. 4A, 4B, 4C, 5, 6 and 7. FIGS. 4A, 4B and 4C are plan views of fundamental elements of the mode dial 121. FIG. 6 is a cross sectional view of the mode dial 121, taken along a vertical plane extending in a right/left direction of the camera body 101 and crossing substantially the axis of the mode dial 121, as viewed from the back of the camera body 101. FIG. 7 is a cross sectional view of the mode dial 121, taken along a vertical plane extending in a front/rear direction of the camera body 101 and crossing the axis of the mode dial 121, seen from the left side (right side as viewed in FIG. 1) of the camera body.

The mode indication disk 123 is provided thereon with the first group of characters 123*a* (eight characters or icons 124*a* through 124*h*) which are illuminated from the bottom of the mode indication disk 123, and the second group of characters 123*b* (five characters or icons 124*i* through 124*m*) which are not illuminated. The illuminated first group of characters 123*a* and the non-illuminated second group of characters 123*b* are formed at predetermined intervals on the mode indication disk 123 along a circle about the central axis thereof. The mode indication disk 123 is made of, e.g., a milky translucent synthetic resin. The first group of characters 123*a* are formed on the mode indication disk 123 by firstly coating the upper surface of the mode indication disk 123 with black paint, and secondly, by removing portions of the black paint coating, coated on each surface of the first group of characters 123*a*, by laser. On the other hand, the second group of characters 123*b* are formed on the black paint coating of the mode indication disk 123 in a manner such that the surfaces on the mode indication disk 123 on which the second group of characters 123*b* are to be formed are coated with opaque paint of a color other than the black color of the first group of characters 123*a*. In the illustrated embodiment, the eight characters 124*a* through 124*h*, whose portions of the mode indication disk 123 are formed to allow light to pass therethrough, represent eight different program modes, respectively, while the five characters 124*i* through 124*m*, whose portions of the mode indication disk 123 are formed not to allow light to pass therethrough, represent a shutter-priority AE mode, an aperture priority AE mode, a manual mode, an ISO film speed selecting mode and an audible signal ON/OFF selecting mode, respectively. Regarding the first group of characters 123*a* (124*a* through 124*h*), the characters 124*a* and 124*h* represent a flash-prohibiting auto picture mode (flash-prohibiting auto select picture mode) and an auto picture mode (auto select picture mode), respectively, while the characters 124*b*, 124*c*, 124*d*, 124*e*, 124*f* and 124*g* represent a night portrait mode, a sports action mode, a close-up mode, a landscape mode, a portrait mode and a standard mode, respectively. The character 124*h* includes translucent letters "AUTO PICT" 124*h*1, an abbreviation of the auto picture mode, and a substantially rectangular frame 124*h*2 which is printed on the mode indication disk 123 to surround the translucent letters 124*h*1.

When the index mark 127 is set to the character 124*h*, the aforementioned auto picture mode is selected. In the auto picture mode, the CPU 11 performs a predetermined calculation in accordance with the lens data input from the lens CPU 63 to select the most appropriate programmed exposure mode from five different programs (i.e., five picture modes: the sports action mode, the close-up mode, the landscape mode, the portrait mode and the standard mode) automatically. In the most appropriate programmed exposure mode selected in the auto picture mode, the CPU 11 controls the built-in flash 111 to automatically discharge in a low light condition. The flash-prohibiting auto picture mode is identical to the auto picture mode except that the built-in flash 111 is prohibited from discharging, and hence is prohibited from popping up in the flash-prohibiting auto picture mode.

The bezel 125 is provided with a click-stop mechanism so that the index mark 127 reliably stops at one of the plurality of characters 124*a* through 124*m*. The mode dial switch SWMod is designed to be associated with the bezel 125 so that one of the thirteen characters 124*a* through 124*m*, which the index mark 127 is set at, is selected.

In addition to the mode indication disk 123, the mode dial 121 is further provided with an LED disk 135 (see FIG. 4B)

and a code base 149 (see FIG. 4C). The LED disk 135 carries the picture mode character illumination LEDs 51*a* through 51*h*. The mode indication disk 123 is fixedly mounted on the LED disk 135 (see FIGS. 6 and 7). The picture mode character illumination LEDs 51*a* through 51*h* are arranged on the LED disk 135 to illuminate the characters 124*a* through 124*h*, respectively. The LEDs 51*a* through 51*h* are fixed to a flexible PWB 137. The LED disk 135 is provided on an upper face thereof with eight pits 135*a* through 135*h* which face the eight characters 124*a* through 124*h* so that the eight LEDs 51*a* through 51h are positioned in the eight pits 135*a* through 135*h* therein, respectively. The flexible PWB 137 is fixed to a bottom surface of the LED disk 135. Lead wire portions of the flexible PWB 137 extend within the camera body 101 to be connected with the CPU 11. The LED disk 135 is provided on bottom face thereof with an axial shaft 136 which is coaxial to an axial hole 135*i* of the LED disk 135.

The LED disk 135 is provided with a sector hole 135*j* (see. FIGS. 4B and 5) which is formed on upper portion of the LED disk 135, wherein none of the pits 135*a* through 135*h* are formed. A spring plate (spring member) 131, having a corresponding shape which is a fundamental element of the click-stop mechanism of the bezel 125, is positioned in the sector hole 135*j*. Part of the spring plate 131 is fixed to an upper face of the axial shaft 136 of the LED disk 135 by a set screw 161 (see FIG. 7). The spring plate 131 is provided with two positioning holes 131*b* which are respectively fitted on two positioning pins 136*a* extending from an upper end surface of the axial shaft 136 within the sector hole 135*j*. Fitting the two positioning holes 131*b* of the spring plate 131 onto the two positioning pins 136*a* of the LED disk 135 makes it easy to fix the spring plate 131 to the LED disk 135 while precisely positioning the spring plate 131 onto the LED disk 135. Accordingly, in the illustrated embodiment, since the spring plate 131 is fixed to an upper face of the LED disk 135 where the eight pits 135*a* through 135*h* are not formed, the picture mode character illumination LEDs 51*a* through 51*h* and the spring plate 131 are successfully positioned substantially in a common plane. This contributes to space-saving within the mode dial 121.

The bezel 125 is formed as a cylindrical member which is provided with a bottom ring portion (bottom end member) 126 (see FIGS. 5 and 7). The bottom ring portion 126 is provided at the center thereof with a circular axial hole 126*a*. The bottom ring portion 126 is further provided with thirteen click holes 125*a* which are formed on an upper face of the bottom ring portion 126 along a circle about the axis of the mode dial 121 to correspond the thirteen characters 124*a* through 124*m*, respectively. A click ball 133 is disposed between a click hole (spring member hole) 131*a* formed on the spring plate 131 and one of the thirteen click holes 125*a* (see FIG. 7). The thirteen click holes 125*a* and the click ball 133 are fundamental elements of the click-stop mechanism of the bezel 125. The spring plate 131, the thirteen click holes 125*a* and the click ball 133 together constitute the click-stop mechanism (stop mechanism) of the bezel 125. As can be seen in FIG. 7, this click-stop mechanism and the picture mode character illumination LEDs 51*a* through 51*h* are arranged substantially in a common plane, which contributes significantly to miniaturizing the mode dial 121.

The bottom ring portion 126 is designed so that the outer diameter thereof is smaller than the outer diameter of the upper operation portion of the bezel 125 so that the bottom ring portion 126 is fitted in a circular fitting hole 103*a* formed on the top cover 103 of the camera body 101 to be rotatable about the axis of the mode dial 121. Namely, the outer peripheral portion of the bottom ring portion 126 is formed as a fitting portion 126*b* which is fitted in the fitting hole 103*a* to be rotatable about the axis of the mode dial 121 (see FIGS. 6 and 7). A bezel substrate 141 and a brush-carrying member 143 are fixed to the bottom surface of the bottom ring portion 126 by set screws 165. The bezel 125 can rotate about the center of the fitting hole 103*a* with the bezel substrate 141 slidably contacting with an inner surface of the top cover 103 around the fitting hole 103*a* to prevent the bottom ring portion 126 from coming off the fitting hole 103*a* of the top cover 103.

The code base 149 is fixedly disposed below the bezel 125. A code plate 147 is fixed to an upper face of the code base 149. A predetermined code pattern 148 is fixed to an upper face of the code plate 147. The brush-carrying member 143, which is fixed to the bezel 125, is provided with two brushes 143*a* and 143*b* which contact with the code pattern 148, so that the brushes 143*a* and 143*b* slide on the code pattern 148 if the bezel 125 rotates.

The LED disk 135 is positioned inside the bezel 125 by fitting the axial shaft 136 in the circular axial hole 126*a* of the bottom ring portion 126 with an insulator ring 139 held between the LED disk 135 and the bezel 125 (see FIGS. 6 and 7). According to this structure, the spring plate 131 can be properly fitted in the sector hole 135*j* with the click ball 133 being placed on one of the click holes 125*a* while the click ball 133 is being viewed through the click hole 131*a*, and thereafter the axial shaft 136 of the LED disk 135 can be fitted in the circular axial hole 126*a* of the bottom ring portion 126, so that the spring plate 131 and the click ball 133 can be easily mounted on the LED disk 135. Furthermore, since the spring plate 131 presses against the bottom ring portion 126 via the click ball 133 so that the LED disk 135 is biased in a direction away from the bezel 125 to thereby press the bezel 125 against the top cover 103, a substantial gap is prevented from existing between the bezel 125 and the top cover 103.

After the LED disk 135 is properly positioned relative to the top cover 103, the LED disk 135 is fixed to the code base 149 by firstly inserting a set screw 163 into a hole 149*a* formed on the code base 149 from the inner side of the camera body 101, and subsequently screwing the set screw 163 into the bottom end 136*b* of the axial shaft 136 (see FIG. 6).

The mode indication disk 123 is provided with an axial shaft 123*c* which is formed integral with the mode indication disk 123 to extend towards the LED disk 135. The mode indication disk 123 is mounted on the LED disk 135 from the outside the camera body 101 by inserting the axial shaft 123*c* in the axial hole 135*i* of the LED disk 135 with the characters 124*a* through 124*m* facing the picture mode character illumination LEDs 51*a* through 51*h* when viewed in the direction of the axis of the mode dial 121, respectively. Thereafter, the mode indication disk 123 is fixed to the LED disk 135 by screwing a set screw 167 into the bottom end of the axial shaft 123*c*.

According to such a structure, the bezel 125 rotates around the mode indication disk 123 and the LED disk 135 which are secured to the top cover 103, which is a construction member of the camera body 101, via the code base 149. The code plate 147, which is fixed to an upper face of the code base 149, is provided with an annular code pattern 148 having a center which is coincident with the center of the mode dial 121. The brushes 143*a* and 143*b* of the brush-carrying member 143 contact with the code pattern 148, so that the brushes 143*a* and 143*b* slide on the code pattern 148 if the bezel 125 is rotated. As can be seen in FIG. 5, the brushes 143*a* and 143*b* are angled relative to each other by an approximately 90 degrees about the center of the code plate 147. The code pattern 148 includes three conductive patterns of different diameters. which are formed along three coaxial circles about the axis of the mode dial 121, respectively. The three conductive patterns are respectively arranged along the three coaxial circles at predetermined intervals to have predetermined angular ranges about the axis of the mode dial 121. Each of the brushes 143*a* and 143*b* is provided with three contacts which come into contact with the three conductive patterns of the code pattern 148, respectively. One of the three conductive patterns of the code pattern 148 is provided as a common ground so that a four-bit signal is generated by electrically connecting four conductive segments on the conductive patterns of the code pattern 148 with the common ground via the brushes 143*a* and 143*b*. Namely, a plurality of conductive segments on the code pattern 148 are electrically connected with one another via the brushes 143*a* and 143*b* to generate an electric potential difference on each conductive pattern of the code pattern 148. By detecting a combination of the electric potential differences of the code pattern 148, the positions of the brushes 143*a* and 143*b* relative to the code pattern 148 can be detected, namely, the current rotational position of the LED disk (support member) 135 can be detected. In the present embodiment, the brush-carrying member 143 and the code pattern 148 together constitute the mode dial switch SWMod. The click stopmechanism of the mode dial 121, which includes the spring plate 131, the click ball 133 and the click holes 125*a*, is designed so that the index mark 127 stops at one of the plurality of characters 124*a* through 124*m* with a 'click', and that at each click-stop position, a four-bit signal (which corresponds to the corresponding combination of a plurality of different combinations of four conductive segments on the conductive patterns of the code pattern 148) is generated. The CPU 11 detects the four-bit signal and then turns ON the corresponding one of the picture mode character illumination LEDs 51*a* through 51*h*.

Figure 8:
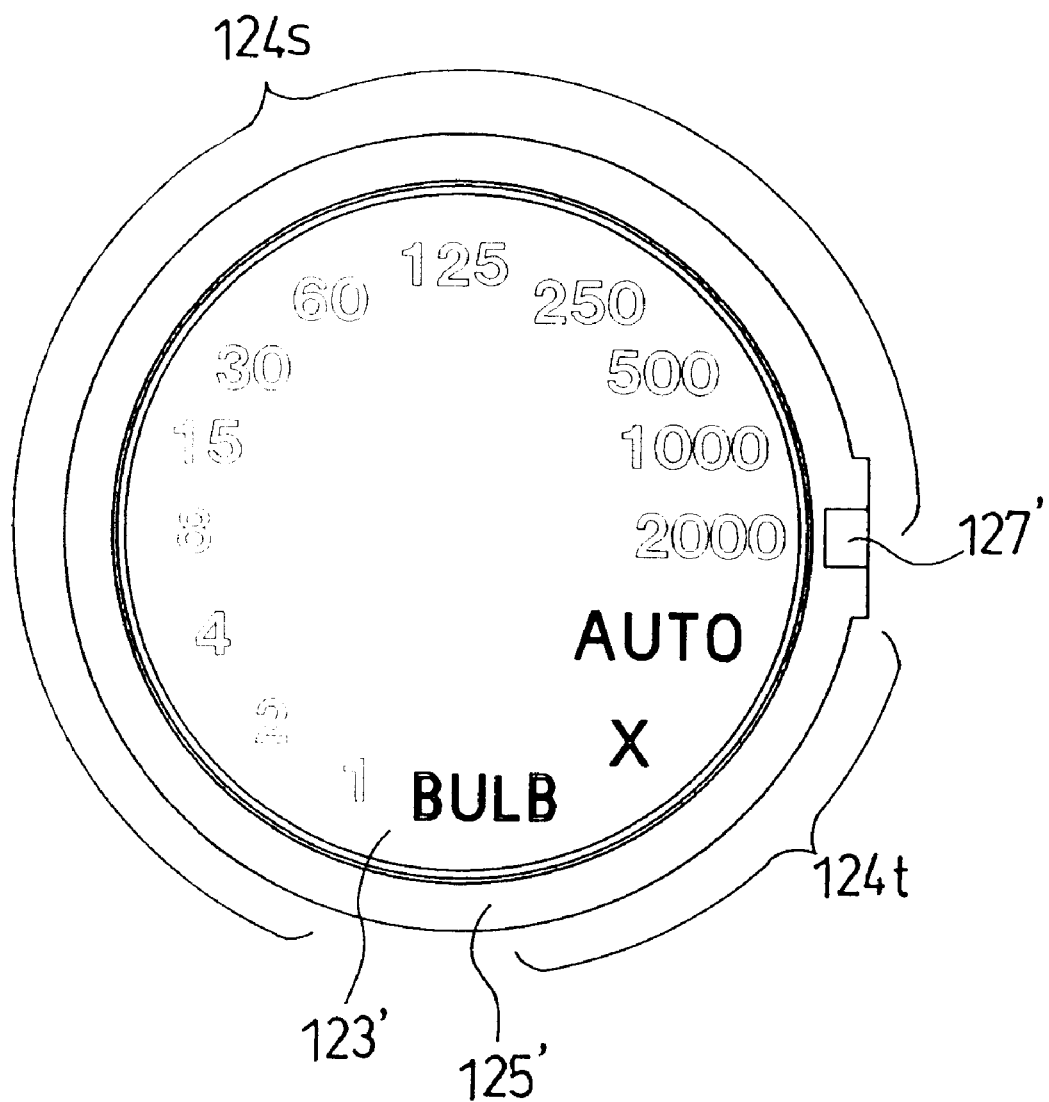
FIG. 8 is a plan view of an embodiment of a shutter dial which can be provided on a camera body, according to the present invention.

Although an embodiment of the mode dial 121, whose main function is to select an exposure mode from different exposure modes, has been discussed above, the structure of the mode dial 121 can be applied to a shutter dial adapted for manually selecting a shutter speed from different shutter speeds. Although such a shutter dial is not provided on the camera body 101 of the illustrated embodiment shown in FIG. 1, the camera body 101 can be modified to have such a shutter dial thereon. FIG. 8 shows an embodiment of such a shutter dial. In this embodiment the shutter dial is provided with a mode indication disk 123' on which different reciprocals of shutter speeds (1 through 2000), "AUTO" which represents shutter speed auto select mode, "X" which represents a shutter speed of an "X" shutter synchronization setting, and "BULB" which represents bulb mode are formed. Portions of the mode indication disk 123' correspond to a first group of characters 124*s*, i.e., the numerals of the different reciprocals of shutter speeds are designed to be translucent so that each numeral can be illuminated from the bottom of the mode indication disk 123'. On the other hand, a second group of characters 124*t*, i.e., the letters "AUTO", "X" and "BULB" are merely printed on the mode indication disk 123', similar to the second group of characters 123*b* (five characters or icons 124*i* through 124*m*) shown in FIG. 4. If an index mark 127' formed on the bezel 125' is set at one of the shutter speeds (1 through ¹⁄₂₀₀₀ sec.), a corresponding backlighting emitter (a corresponding LED) is turned ON to backlight the numerals of the selected shutter speed. If the index mark 127' is set to "AUTO" of the second group of characters 124*t*, one of the reciprocals of the shutter speeds (1 through ¹⁄₂₀₀₀ sec.) which corresponds to the most appropriate shutter speed calculated in accordance with the results of the AE calculation operation by the CPU 11 is backlit so that the user can visually confirm the selected shutter speed. In the present embodiment, a click ball and a spring plate which correspond to the click ball 133 and the spring plate 131 shown in FIG. 5, respectively, are positioned behind the second group of characters 124*t*.

In the illustrated embodiment, although the bezel 125, which is adapted as an operation member, rotates around the mode indication disk 123 adapted as a mode indication member which indicates the thirteen characters 124*a* through 124*m*, the thirteen characters 124*a* through 124*m* can be formed outside the bezel 125, not inside the bezel 125 on the mode indication disk 123, so that the thirteen characters 124*a* through 124*m* surround the outer periphery of the bezel 125. For instance, the mode indication member can be formed as a stationary ring member which surrounds the bezel 125.

The first group of characters 123*a* (124*a* through 124*h*) can be respectively printed directly on the light exit surfaces of the mode character illumination LEDs 51*a* through 51*h*. In this case, for instance, the LEDs 51*a* through 51*h* can be mounted on the mode indication disk 123 at predetermined intervals along a circle about the axial center of the mode indication disk 123.

Each of the mode character illumination LEDs 51*a* through 51*h* can be in the form of another light emitting element.

Operations of the SLR camera system (the camera body 101) provided with the mode dial 121 will be hereinafter discussed in detail with reference to flow charts shown in FIGS. 9A through 22. The processes represented by the flow charts shown in FIGS. 9A through 22 are performed by the CPU 11 in accordance with the programs written in the internal ROM of the CPU 11.

Main Process

A main process ("MAIN" shown in FIGS. 9A and 9B) is performed with the battery 13 loaded in the camera body 101. Immediately after the battery cover (not shown) of the camera body 101 is closed with the battery 13 loaded therein, a CPU initializing process is performed in which each of input and output ports and the internal RAM of the CPU 11 are initialized (step S11). Subsequently, peripheral circuits connected to the input and output ports are also initialized (step S13). Subsequently, a reference timer in the CPU 11 is started (step S15). The operations at steps S11, S13 and S15 are performed immediately after the battery cover is closed with the battery 13 loaded in the camera body 101, and thereafter operations at and after step S17 are repeatedly performed with the battery 13 loaded.

A 250 ms interval timer in the CPU 11 is started (step S17), an ON/OFF state of each switch is input in the CPU 11 (step S19), and it is determined whether the main switch SWM is ON (step S21). The 250 ms interval timer is adapted to set intervals at which the CPU 11 periodically checks if the main switch SWM is ON.

If it is determined at step S21 that the main switch SWM is OFF, control proceeds to step S23 at which an external LCD indication process is performed in which the external LCD 109 is controlled to indicate a character or characters which informs the user that the power is currently OFF. Subsequently, the LEDs 51*a* through 51*h* are turned OFF (step S25). Subsequently, it is determined whether 250 ms has elapsed since the 250 ms interval timer started (step S27). If it is determined at step S27 that 250 ms has elapsed, control returns to step S17 at which the 250 ms interval timer is started and the operations from step S19 to step S27 are performed again. The aforementioned operations from step S17 to step S27 are repeatedly performed during the time the main switch SWM is OFF.

If it is determined at step S21 that the main switch SWM is turned ON, control proceeds to step S29 at which it is determined if the main switch SWM was previously OFF. If it is determined at step S29 that the main switch SWM was previously OFF, it means that controls has entered the operation at step S29 for the first time since the main switch SWM was turned ON, therefore, control proceeds to step S31 at which an opening indication process ("Opening Indication Process" described in FIGS. 10A and 10B) is performed. In the opening indication process, each of the eight LEDs 51a through 51h is firstly turned ON and subsequently turned OFF in accordance with a predetermined algorithm, and only one of the eight LEDs 51a through 51h which corresponds to one of the eight program modes (the flash-prohibiting auto picture mode, the night portrait mode, the sports action mode, the close-up mode, the landscape mode, the portrait mode, the standard mode, and the auto picture mode) selected last by the bezel 125 is turned ON at the end. Details of the opening indication process will be discussed later. If it is determined at step S29 that the main switch SWM was not previously OFF, control skips step S31 to proceed to step S33.

A built-in flash pop-up process ("Built-in Flash Pop-up Process" described in FIG. 11) is performed at step S33. In the built-in flash pop-up process, if it is determined that the forced pop-up switch SWPu is ON, the switching transistor Tr1 is turned ON to supply power to the pop-up magnet PuMg to make the built in flash 111 pop-up. Details of the built-in flash pop-up process will be discussed later, It is determined at step S35 whether the pop-up state detection switch SWPud is ON, i.e., whether the built-in flash 111 has popped up. If it is determined at step S35 that the pop-up state detection switch SWPud is ON, control proceeds to step S37 at which a built-in flash charging process is performed. If it is determined at step S35 that the pop-up state detection switch SWPud is OFF, control skips step S37 to proceed to step S39.

An LCD indication process is performed at step S39. In this LCD indication process, in a power ON state of the camera body 101, useful information such as the currently selected shutter speed is indicated on the external LCD panel 109, while nothing is indicated on the finder LCD 45 until the AE calculation process starts to be performed by an operation of the mode dial 121.

It is determined at step S41 whether the photometering switch SWS is turned ON. It is determined at step S43 whether the release switch SWR is turned ON. If neither the photometering switch SWS nor the release switch SWR are turned ON, it is determined at step S45 whether a state of the mode dial switch SWMod has changed. If it is determined at step S45 that the state of the mode dial switch SWMod has not changed, control returns to step S27.

Control proceeds to step S49 if it is determined at step S41 that the photometering switch SWS is turned ON, if it is determined at step S43 that the release switch SWR is turned ON, or if it is determined at step S45 that the state of the mode dial switch SWMod has changed.

A photometering timer setting process is performed at step S49. In the photometering timer setting process, the number of times of performing a switch check process from step S53 to step S87 is set to a predetermined number of times. Following the photometering timer setting process, the CPU 11 waits for the release switch SWR to be turned ON while performing the. switch check process at intervals shorter than the intervals of the 250 ms interval timer. Further, in the case where the release switch SWR is not yet turned ON even if the switch check process has performed the aforementioned predetermined number of times, control returns to step S17. In the present embodiment, the interval timer used in the photometering timer setting process is an 125 ms interval timer (photometering timer), and the number of times of performing the switch check process is set to 80 to be registered in a counter (COUNTER).

After the photometering timer setting process is performed at step S49, the 125 ms interval timer is started (step S51). Thereafter, an ON/OFF state of each switch is input in the CPU 11 (step S53) and subsequently it is determined whether the main switch SWM is OFF (step S55). If it is determined at step S55 that the main switch SWM is OFF, control proceeds to step S89 at which a flashlight prohibition flag for prohibiting the built-in flash 111 from discharging is set to 0. Subsequently, a backlight for the finder LCD 45 is turned OFF (step S91), the LEDs 51a through 51h are turned OFF (step S93), and control returns to step S17. If it is determined at step S55 that the main switch SWM is ON, control proceeds to step S57.

At step S57 the lens data including the F-number at open aperture, the current focal length, and the information on flashlight interruption of the built-in flash 111 by the attached lens are input to the CPU 11. Subsequently, the photometered value (brightness value Bv) is input to the CPU 11 from the photometering IC 41 (step S59), and the set aperture value is input (step S61). The set aperture value, which is set by manually rotating an aperture setting ring (not shown) of the photographic lens 61, is detected from the resistance value of an aperture value detection resistor 43. In the case where the aperture setting ring is set to setting "A" (auto), the CPU 11 does not use the information on the resistance value of the aperture value detection resistor 43, but calculates the aperture value Av in the AE calculation process which is performed at step S63.

The shutter speed or time value Tv and the aperture value Av are calculated in the AE calculation process ("AE Calculation Process" described in FIG. 14) at step S63. In the AE calculation process, the optimum shutter speed Tv and the optimum aperture value Av are calculated based on the photometered value, the film speed and the exposure compensation value, in accordance with a predetermined algorithm which corresponds to the selected exposure mode. Details on the AE calculation process will be discussed later.

After the AE calculation process is performed, the built-in flash pop-up process ("Built-in Flash Pop-up Process" described in FIG. 11) is performed in accordance with the set shutter speed Tv and the set aperture value Av (step S65). In the built-in flash pop-up process, it is determined whether the built-in flash 111 needs to pop-up, and power is supplied to the pop-up magnet PuMg to make the built-in flash 111 pop-up if it is determined that the built-in flash 111 needs to pop-up. Details of the built-in flash pop-up process will be discussed later. After the built-in flash pop-up process is performed at step S65, it is determined whether the built-in flash 111 has popped up (step S67). If it is determined that the built-in flash 111 has popped up, control proceeds to step S69 at which the built-in flash charging process is performed, and thereafter control proceeds to step S71. If it is determined that the built-in flash 111 has not yet popped up, control skips step S69 to proceed to step S71.

An LCD indication process is performed at step S71. In this LCD indication process, various useful information such as the set shutter speed is indicated on the external LCD panel 109, while various useful information such as a current focus state, the set shutter speed, a hand-shake warning indication and flash discharge mode are indicated on the finder LCD 45 while the user is viewing an object through the finder.

Thereafter, a finder LCD backlight lighting process ("Finder LCD Backlight Lighting Process" described in FIG. 18) is performed at step S73. In the finder LCD backlight lighting process, the green LED 47a is turned ON in a normal photographic condition, while the red LED 47b is turned ON in a warning condition (e.g., when the selected shutter speed is slower than the slowest shutter speed calculated to prevent blurred images due to hand movement). Details of the finder LCD backlight process will be discussed later.

After the finder LCD backlight lighting process is performed at step S73, a picture mode indication lighting process ("Picture Mode Indication Lighting Process" shown in FIGS. 19A and 19B) is performed at step S75. In the picture mode indication lighting process, in the case where the auto picture mode or the flash-prohibiting auto picture mode is selected, one of the LEDs 51a through 51h which corresponds to the programmed exposure mode which has been selected in the AE calculation process at step S63 is turned ON. Details of the picture mode indication lighting process will be discussed later.

After the picture mode indication lighting process is performed at step S75, the AF process is performed at step S77. In the AF process, the AF CCD image sensor 33 is driven, video signals of object image are input to the CPU 11, and the AF motor 29 is driven by an amount corresponding to the amount of defocus to move the focusing lens group L of the interchangeable lens 61 to an axial position where an in-focus state is obtained.

Subsequently, it is determined whether the release switch SWR is turned ON (step S79). Control returns to step S49 upon performing a shutter release process (S95) if it is determined at step S79 that the release switch SWR is turned ON. If it is determined at step S79 that the release switch SWR is not turned ON, it is determined at step S81 whether 125 ms has elapsed (i.e., whether the 125 ms interval timer is up). If it is determined at step S81 that 125 ms has not yet elapsed, the operation at step S81 is repeatedly performed to wait for the 125 ms interval timer to elapse. If it is determined at step S81 that 125 ms has elapsed, it is determined whether the counter value is zero (step S83). If it is determined that the counter value is not zero, the counter value is decreased by one (step S85) and control returns to step S53. Accordingly, during the time the main switch SWM is ON while the release switch SWR is OFF, the operations from step S53 through step S85 are repeatedly performed eighty times until the counter value, whose initial value is 80, becomes zero. Note that 10 seconds (125 ms×80=10 sec) elapses if the operations from step S53 through step S85 are repeatedly performed eighty times.

If it is determined at step S83 that the counter value is zero, control proceeds to step S87 at which it is determined whether the photometering switch SWS is turned ON. If it is determined the photometering switch SWS is turned ON, control returns to step S53. Namely, even if ten seconds elapses, the operations at step S53 through step S83 and step S87 are repeatedly performed as long as the photometering switch SWS is ON. If it is determined at step S87 that the photometering switch SWS is not ON, control proceeds to step S89 at which the flashlight prohibition flag is set to 0. Subsequently, the backlight for the finder LCD 45 is turned OFF (step S91), the LEDs 51a through 51h are turned OFF (step S93), and control returns to step S17. At step S91, the CPU 11 turns OFF one of the LEDs 51a through 51h which corresponds to the programmed exposure mode selected in the AE calculation process at step S63 and which is turned ON in the picture mode indication lighting process at step S75 in the case where the auto picture mode or the flash-prohibiting auto picture mode is selected.

Opening Indication Process

Figure 9A:
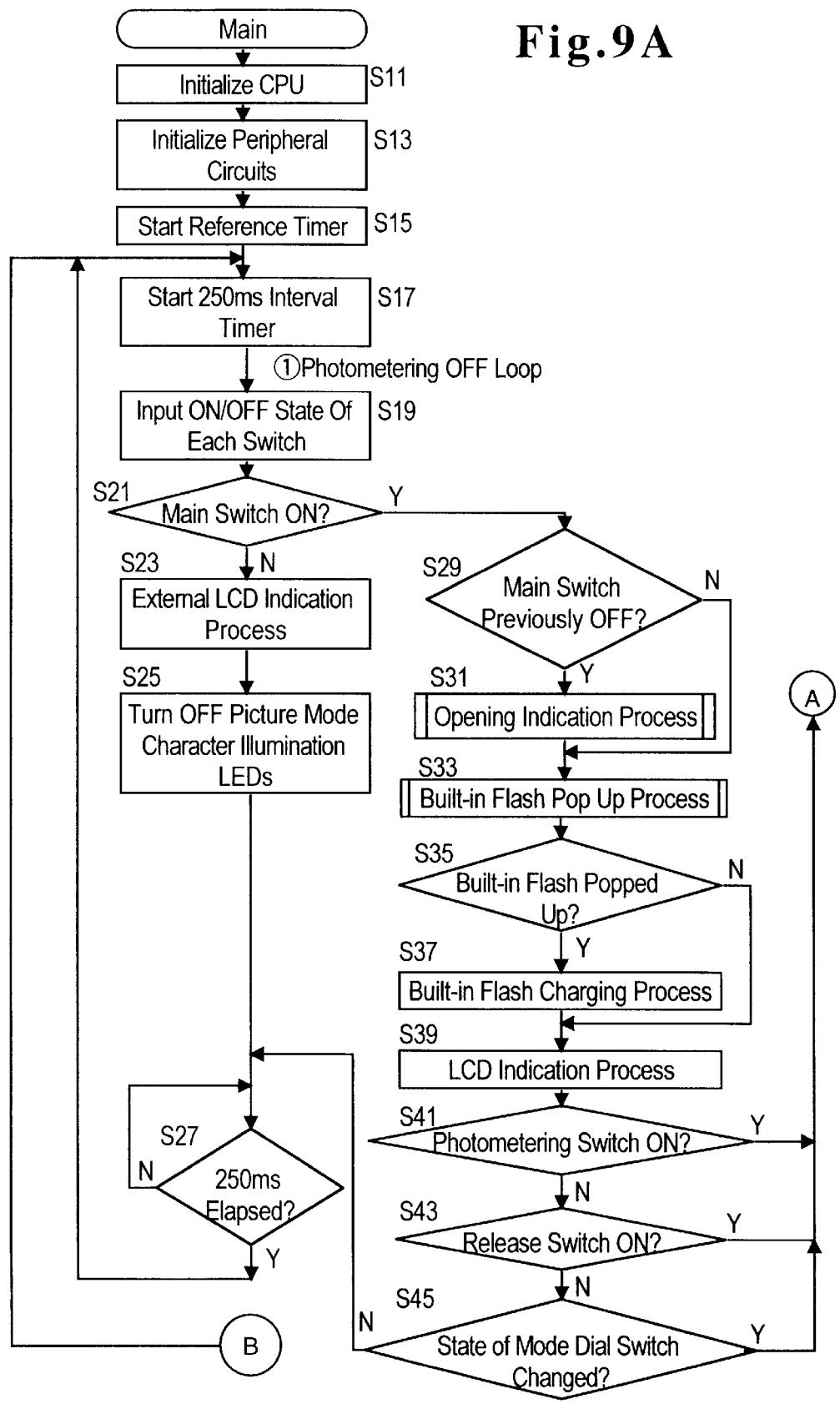
FIGS. 9A and 9B show a flow chart of an embodiment of a main process regarding fundamental operations of the SLR camera system shown in FIG. 3.
Figure 10A:
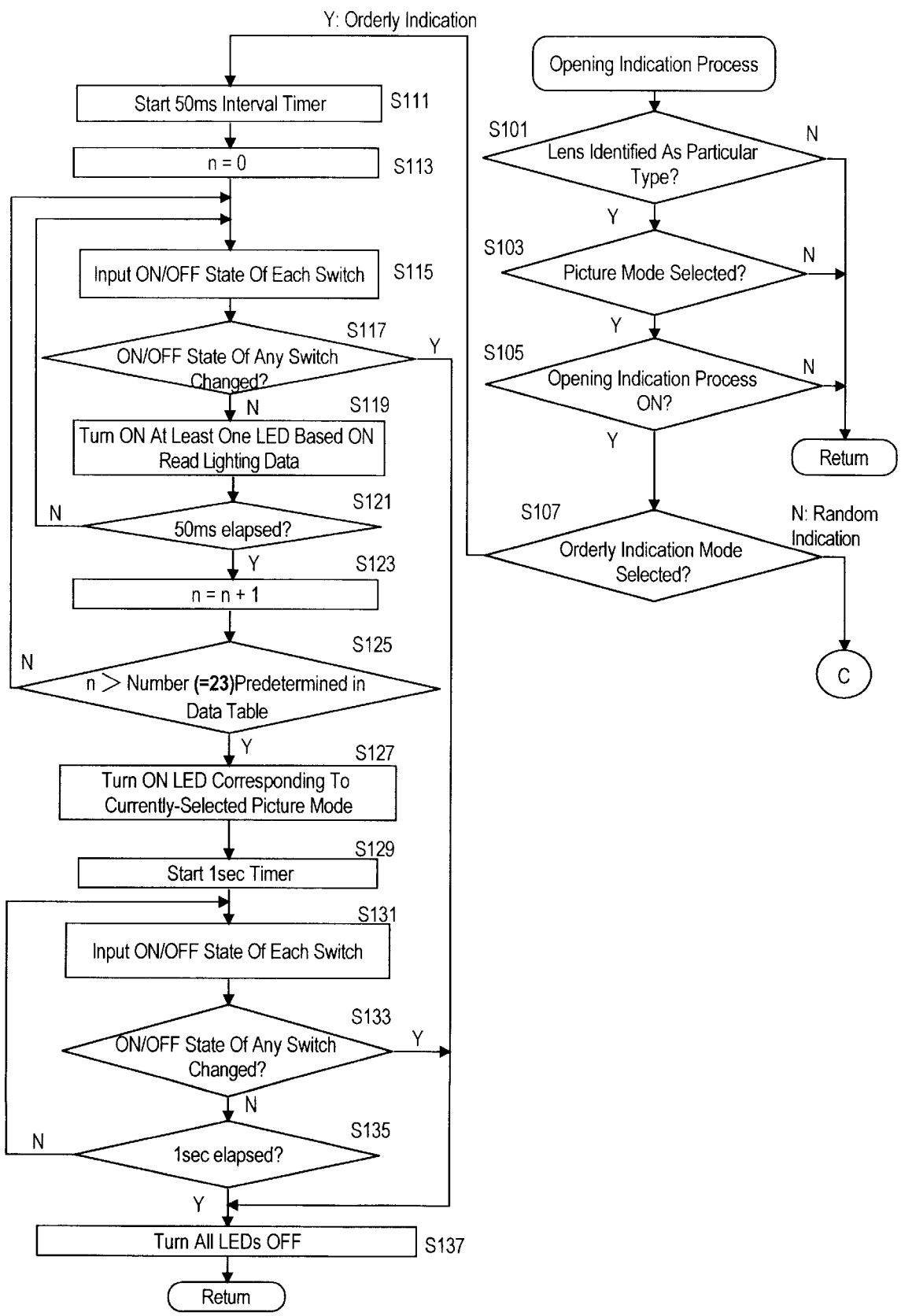
FIGS. 10A and 10B show a flow chart of the subroutine "Opening Indication Process" shown in FIG. 9.
Figure 10:
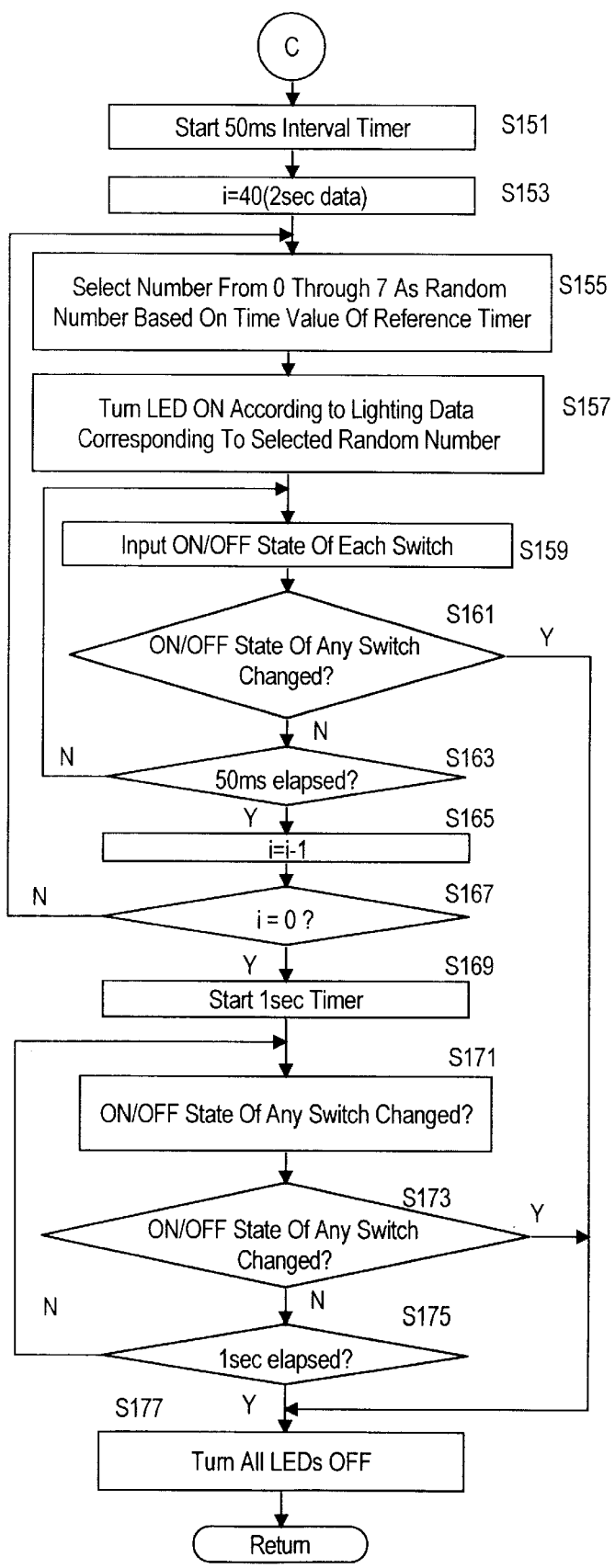

The opening indication process, which is performed at step S31 in the main process shown in FIG. 9A, will be hereinafter discussed in detail with reference to the flow chart shown in FIGS. 10A and 10B. In this process, in the present embodiment, the eight LEDs 51a through 51h are firstly turned ON and subsequently turned OFF regularly in a predetermined pattern or irregularly at random. It is preferable that the user determine whether the LEDs 51a through 51h are turned ON and OFF regularly in a predetermined pattern or at random by operating a select switch or knob. It is preferable that the result of this selection be stored in the EEPROM 39.

In a regular-pattern display mode, in the case where the eight LEDs 51a through 51h are firstly turned ON and subsequently turned OFF regularly in a predetermined pattern, firstly the eight LEDs 51a through 51h are turned ON in order at predetermined intervals. Subsequently, when a predetermined period of time elapses since all the LEDs 51a through 51h are turned ON, the eight LEDs 51a through 51h are turned OFF in the same order at predetermined intervals. Finally, only one of the eight LEDs 51a through 51h which corresponds to one of the eight program modes (the flash-prohibiting auto picture mode, the night portrait mode, the sports action mode, the close-up mode, the landscape mode, the portrait mode, the standard mode, and the auto picture mode) selected last by the bezel 125 is turned ON. In the present embodiment, none of the eight LEDs 51a through 51h are turned ON when a mode other than the programmed exposure modes is selected, i.e., when one of shutter-priority AE mode, aperture-priority AE mode, manual mode, ISO film speed selecting mode or audible signal ON/OFF selecting mode is selected by an operation of the bezel 125.

In the opening indication process, it is determined whether the attached interchangeable lens is OK, i.e., whether the attached interchangeable lens is identified as a type of lens having a lens CPU 63 so that one of eight picture modes (i.e., the flash-prohibiting auto picture mode, the night portrait mode, the sports action mode, the close-up mode, the landscape mode, the portrait mode, the standard mode and the auto picture mode) can be selected (step S101). If it is determined that the attached interchangeable lens is not OK, control returns to the main process. If it is determined that the attached interchangeable lens is OK, control proceeds to step S103 at which it is determined whether one picture mode has been selected from one of the eight picture modes. If it is determined that one picture mode has been selected, it is determined whether the opening indication process is ON (step S105). Control returns if it is determined that the opening indication is OFF at step S105. If it is determined at step S105 that the opening indication is ON, control proceeds to step S107 at which it is determined whether an orderly indication mode in which the eight LEDs 51a through 51h are firstly turned ON in order and subsequently turned OFF in the same order at predetermined intervals has been selected. If the orderly indication mode has been selected, control proceeds to step S111. If not, it means that a random indication mode in which the eight LEDs 51a through 51h are turned ON and OFF irregularly at random has been selected, so that control proceeds to step S151. It is determined in an opening indication changing process ("Opening Indication Changing Process" described in FIG. 22) whether to perform the opening indication process. It is also determined in the opening indication changing process whether to perform the orderly indication mode or the random indication mode if the opening indication process is performed. The details of the opening indication changing process will be discussed later.

If it is determined at step S107 that the orderly indication mode has been selected, control proceeds to step S111. A 50 ms interval timer is started at step S111 and subsequently a variable "n" is set to zero at step S113. The 50 ms interval timer is adapted as a reference timer for setting intervals at which the LEDs 51a through 51h are turned ON and OFF. The variable "n" is used to designate data of lighting at least one of the LEDs 51a through 51h. Table 1 shows the relationship among the variable "n", the lighting data and the corresponding picture mode, namely, the relationship between the variable "n" and the corresponding at least one of the LEDs 51a through 51h which is to be turned ON. In the present embodiment, the variable "n" is set to one of twenty-four integral numbers from 0 to 23, while the lighting data is represented by one of fifteen different hexadecimal digits. In Table 1, each black circle indicates lighting of the corresponding LED. The data of Table 1 is pre-stored in EEPROM 39, and the CPU 11 reads out the data of lighting (address) which corresponds to the set variable "n". In the present embodiment, each lighting data consists of a 8-bit byte so that each one-bit data thereof commands the corresponding one of the LEDs 51a through 51h to be turned ON or OFF.

After the variable "n" has been set to 0 at step S113, an ON/OFF state of each switch is input into the CPU 11 (step S115), and it is determined whether the ON/OFF state of any switch has changed (step S117). If it is determined that there is no change in the ON/OFF state of any switch, the CPU 11 reads out the lighting data which corresponds to the set variable "n" from the EEPROM 39 to light up at least one of the LEDs 51a through 51h based on the read lighting data (step S119). Subsequently it is determined whether 50 ms has elapsed (step S121). If 50 ms has not yet elapsed, control returns to step S115. If it is determined at step S117 that there is any change in the ON/OFF state of any switch before 50 ms elapses, control proceeds to step S137 at which all the LEDs 51a through 51h are turned OFF to stop operating the opening indication process and subsequently control returns to the main process.

If it is determined at step S121 that 50 ms has elapsed, the variable "n" is increased by one (step S123), and subsequently it is determined whether the variable "n" exceeds the number (=23) predetermined in the data table shown in Table 1 (step S125). If it is determined at step S125 that the variable "n" is equal to or less than the predetermined number (=23), control returns to step S115, and subsequently the CPU 11 again reads out the lighting data which corresponds to the variable "n" from the EEPROM 39 to light up at least one of the LEDs 51a through 51h which corresponds to the read lighting data (step S119).

The above operations from step S115 to step S125 are repeatedly performed to turn the LEDs 51a through 51h ON in order from the LED 51a to the LED 51h at 50 ms intervals. Subsequently, a lighting state of all the LEDs 51a through 51h is maintained for 500 ms (50 ms×10=500 ms) and subsequently the LEDs 51a through 51h ON are turned OFF in the same order from the LED 51a to the LED 51h at 50 ms intervals. Note that the intervals at which the LEDS 51a through 51h are turned ON in order, the duration of lighting of each LED and the intervals at which the LEDs 51a through 51h are turned OFF in order are not limited solely to this particular embodiment. For instance, the LEDs 51a through 51h can be turned ON in reverse order, and likewise, the LEDs 51a through 51h can be turned OFF in the same reverse order.

If it is determined at step S125 that the variable "n" exceeds the number (=23) predetermined in the data table shown in Table 1, only one of the LEDs 51a through 51h which corresponds to the current picture mode selected by the mode dial switch SWMod is turned ON (step S127). Subsequently, a 1-second timer is started (step S129). Subsequently, an ON/OFF state of each switch is input in the CPU 11 (step S131), and it is determined whether the ON/OFF state of any switch has changed (step S133). If it is determined that there is no change in the ON/OFF state of any switch, it is determined whether 1 second has elapsed (step S135). If it is determined that 1 second has not elapsed, control returns to step S131. If it is determined at step S133 that there is any change in the ON/OFF state of any switch, or if it is determined at step S135 that 1 second has elapsed, control proceeds to step S137 at which all the LEDs 51a through 51h are turned OFF. Thereafter control returns to the main process.

According to the aforementioned operations from step S101 to step S137, firstly the LEDs 51a through 51h are turned ON in order (clockwise as viewed in FIG. 4B) from the LED 51a to the LED 51h at 50 ms intervals, secondly a lighting state of all the LEDs 51a through 51h is maintained for 500 ms (50 ms×10=500 ms) and thereafter the LEDs 51a through 51h are turned OFF in the same order (clockwise as viewed in FIG. 4B) from the LED 51a to the LED 51h at 50 ms intervals. Immediately after all the LEDs 51a through 51h are turned OFF, one of the LEDs 51a through 51h which corresponds to the current picture mode selected by an operation of the mode dial 121 is turned ON to light up for one second and subsequently turned OFF after one second elapses. Due to this peculiar control, the user can visually confirm that power of the camera is turned ON. Furthermore, it is easy for the user to visually confirm the type of the currently-selected picture mode. If it is determined at step S117 or step S133 that there is any change in the ON/OFF state of any switch, i.e., if the bezel 125 is operated during the opening indication process, the opening indication process stops to return to the main process shown in FIGS. 9A and 9B so as to cause the camera system be in a photo-ready state.

The process in the case where it is determined at step S107 that the random indication mode has been selected will be hereinafter discussed with reference to FIGS. 10A and 10B and Table 2. In the random indication mode, the eight LEDs 51a through 51h are turned ON and OFF irregularly at random. In the present embodiment, lighting data (0 through 7) is prepared to correspond to the number of the picture mode character illumination LEDs 51a through 51h, and eight bits of lighting data are pre-stored in the EEPROM 39. One number is selected from 0 through 7 at random through a predetermined algorithm for generating random numbers, and the lighting data which corresponds to the selected random number is read out from the EEPROM 39 to turn ON the corresponding one of the LEDs 51a through 51h. Table 2 shows the relationship among a random number "r", the lighting data and the corresponding picture mode, i.e., the relationship between the random number "r" and the corresponding one of the LEDs 51a through 51h which is to be turned ON.

If it is determined at step S107 that the orderly indication mode is not selected by the user (i.e., the random indication mode has been selected), control proceeds to step S151. A 50 ms interval timer is started at step S151 and subsequently a variable "i" is set to 40 at step S153. Subsequently, at step S155, one number is selected as the random number r from 0 through 7 at random through a predetermined algorithm, in accordance with the time value of the reference timer (the 50 ms interval timer). Thereafter, the lighting data which corresponds to the selected random number "r" is read out from the EEPROM 39 to turn ON the corresponding one of the LEDs 51a through 51h (step S157). Subsequently, an ON/OFF state of each switch is input in the CPU 11 (step S159), and it is determined whether the ON/OFF state of any switch has changed (step S161). If it is determined that there is no change in the ON/OFF state of any switch, it is determined whether 50 ms has elapsed (step S163). If 50 ms has not yet elapsed, control returns to step S159. If it is determined at step S161 that there is change in the ON/OFF state of any switch, control proceeds to step S177 at which all the LEDs 51a through 51h are turned OFF to stop operating the opening indication process, and subsequently control returns to the main process.

If it is determined at step S163 that 50 ms has elapsed, the variable "i" is decreased by one (step S165) and subsequently it is determined whether the variable "i" is zero (step S167). If it is determined at step S167 that the variable "i" is not zero, control returns to step S155 and subsequently one number is selected as the random number "r" from 0 through 7 at random, in accordance with the time value of the reference timer (the 50 ms interval timer) at step S155. Thereafter, the lighting data which corresponds to the selected random number "r" is read out from the EEPROM 39 to turn ON the corresponding one of the LEDs 51a through 51h (step S157). The operations from step S155 to step S167 are repeatedly performed until the variable "i" becomes zero.

If it is determined at step S167 that the variable "i" is zero (i.e., the operation of making one of the LEDs 51a through 51b light up for 50 ms which is selected at random is performed forty times), a 1-second timer is started (step S169). Subsequently, an ON/OFF state of each switch is input in the CPU 11 (step S171), and it is determined whether the ON/OFF state of any switch has changed (step S173). If it is determined that there is no change in the ON/OFF state of any switch, it is determined whether 1 second has elapsed (step S175). If it is determined that 1 second has not elapsed, control returns to step S171. If it is determined at step S173 that there is a change in the ON/OFF state of any switch, or if it is determined at step S175 that 1 second has elapsed, control proceeds to step S177 at which all the LEDs 51a through 51h are turned OFF. Thereafter control returns to the main process.

According to the aforementioned operations from step S101 to step S107 and from step S151 to step S177, the LEDs 51a through 51h are turned ON and OFF one by one at random, which can visually inform the user that power of the camera is turned ON. If it is determined at step S161 or step S173 that there is any change in the ON/OFF state of any switch, i.e., if the bezel 125 is operated during the opening indication process, the opening indication process stops to return to the main process shown in FIGS. 9A and 9B so as to make the camera system be in a photo-ready state.

Built-in Flash Pop-up Process

Figure 11:
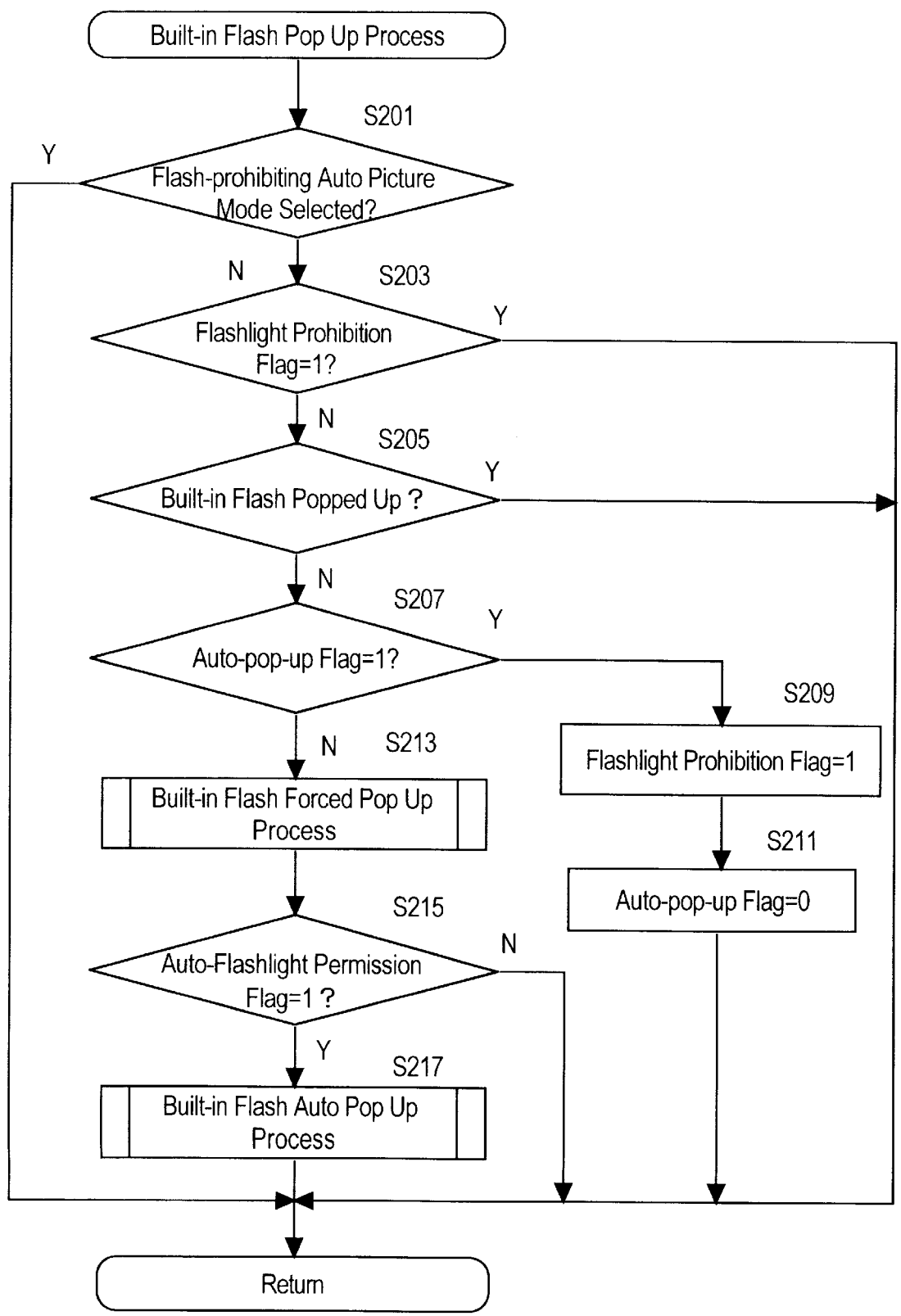
FIG. 11 is a flow chart of the subroutine "Built-in Flash Pop-up Process" shown in FIG. 9.

The built-in flash pop-up process, which is performed at step S33 or S65 in the main process shown in FIGS. 9A and 9B, will be hereinafter discussed in detail with reference to the flow chart shown in FIG. 11. In this process, the switching transistor Tr1 is turned ON to supply power to the pop-up magnet PuMg to make the built-in flash 111 pop-up on condition that any mode other than the flash-prohibiting auto picture mode is selected and that conditions necessary for having the built-in flash 111 discharge are all set. Furthermore, if the built-in flash 111 is forcibly retracted (e.g., manually by the user) after the built-in flash 111 is popped up, the built-in flash 111 is prohibited from popping up automatically until the photometering timer, which is started at step S51, has elapsed.

In the built-in flash pop-up process, firstly it is determined whether the flash-prohibiting auto picture mode has been selected (step S201). If the flash-prohibiting auto picture mode has been selected, the built-in flash 111 is prohibited from discharging, so that control returns.

If it is determined at step S201 that the flash-prohibiting auto picture mode is not selected (i.e., a mode other than the flash-prohibiting auto picture mode is selected), it is determined whether the flashlight prohibition flag is 1 (step S203). If the flashlight prohibition flag is not 1, it is determined whether the built-in flash 111 has popped up (step S205). The default of the flashlight prohibition flag is set to zero. If it is determined at step S203 that the flashlight prohibition flag is 1, or it is determined at step 205 that the built-in flash 111 has popped up, control returns to the main process. If it is determined at step 205 that the built-in flash 111 has not popped up, it is determined whether an auto-pop-up flag is 1 (step S207). The auto-pop-up flag indicates whether the built-in flash 111 has automatically popped up. The default of the auto pop-up flag is set to zero. The auto-pop-up flag is set to 1 at step S251 shown in FIG. 13.

If it is determined at step S207 that the auto-pop-up flag is zero, a built-in flash forced pop-up process ("Built-in Flash Forced Pop-up Process" described in FIG. 12) is performed (step S213). Subsequently, it is determined whether an auto-flashlight permission flag is 1 (step S215). If it is determined at step S215 that the auto-flashlight permission flag is 1, a built-in flash auto pop-up process ("Built-in Flash Auto Pop-up Process" described in FIG. 13) is performed (step S217) and subsequently control returns to the main process. If it is determined at step S215 that the auto-flashlight permission flag is not 1, control returns to the main process. The auto-flashlight permission flag indicates whether the built-in flash 111 is permitted from discharging automatically. The default of the auto-flashlight permission flag is set to zero. If it is determined at step S207 that the auto-pop-up flag is 1, control proceeds to step S209 at which the flashlight prohibition flag is set to 1. Subsequently, the auto-pop-up flag is set to 0 (step S211), and control returns to the main process.

Built-in Flash Forced Pop-up Process

Figure 12:
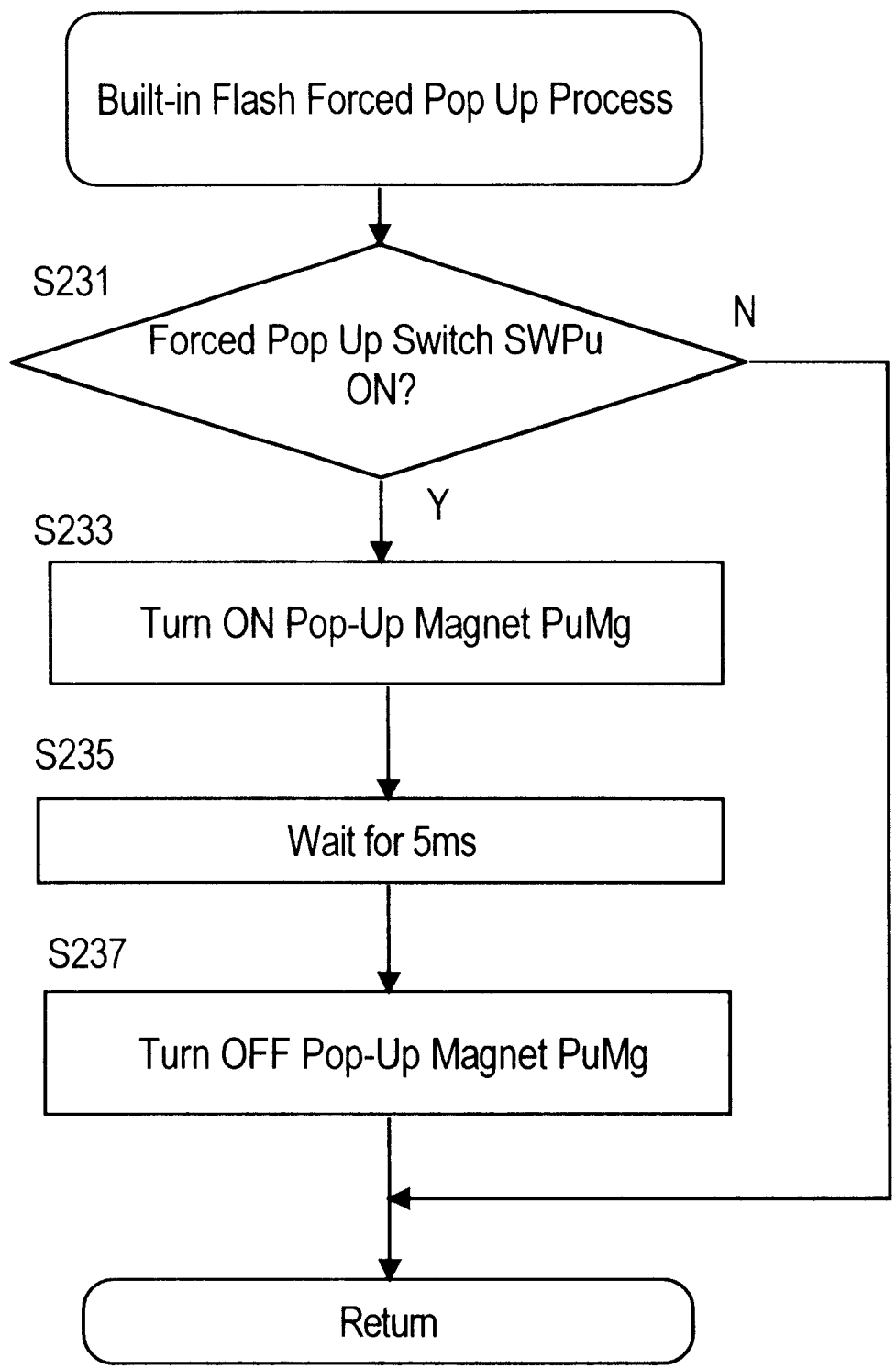
FIG. 12 is a flow chart of the subroutine "Built-in Flash Forced Pop-up Process" shown in FIG. 11.

The built-in flash forced pop-up process, which is performed at step S213 in the main process shown in FIG. 11, will be hereinafter discussed in detail with reference to the flow chart shown in FIG. 12. In this process, firstly it is determined whether the forced pop-up switch SWPu (forced discharge switch) is ON (step S231). If it is determined that the forced pop-up switch SWPU is ON, the pop-up magnet PuMg is turned ON (power starts to be supplied) at step S233. Subsequently, control waits for 5 ms so that power keeps to be supplied to the pop-up magnet PuMg for 5 ms (step S235). Subsequently, the engagement of the hold mechanism with the built-in flash 111 is released by turning the pop-up magnet PuMg OFF to make the built-in flash 111 pop-up by the spring force of the spring of the pop-up mechanism (step S237). The pop-up state detection switch SWPud is turned ON when the built-in flash 111 has risen, so that the CPU 11 can determine that the built-in flash 111 has risen by checking the ON/OFF state of the pop-up state detection switch SWPud. It is determined at step S231 that the forced pop-up switch SWPu is not ON, control skips the operation from step S233 to S237 to return to the main process.

Built-in Flash Auto Pop-up Process

Figure 13:
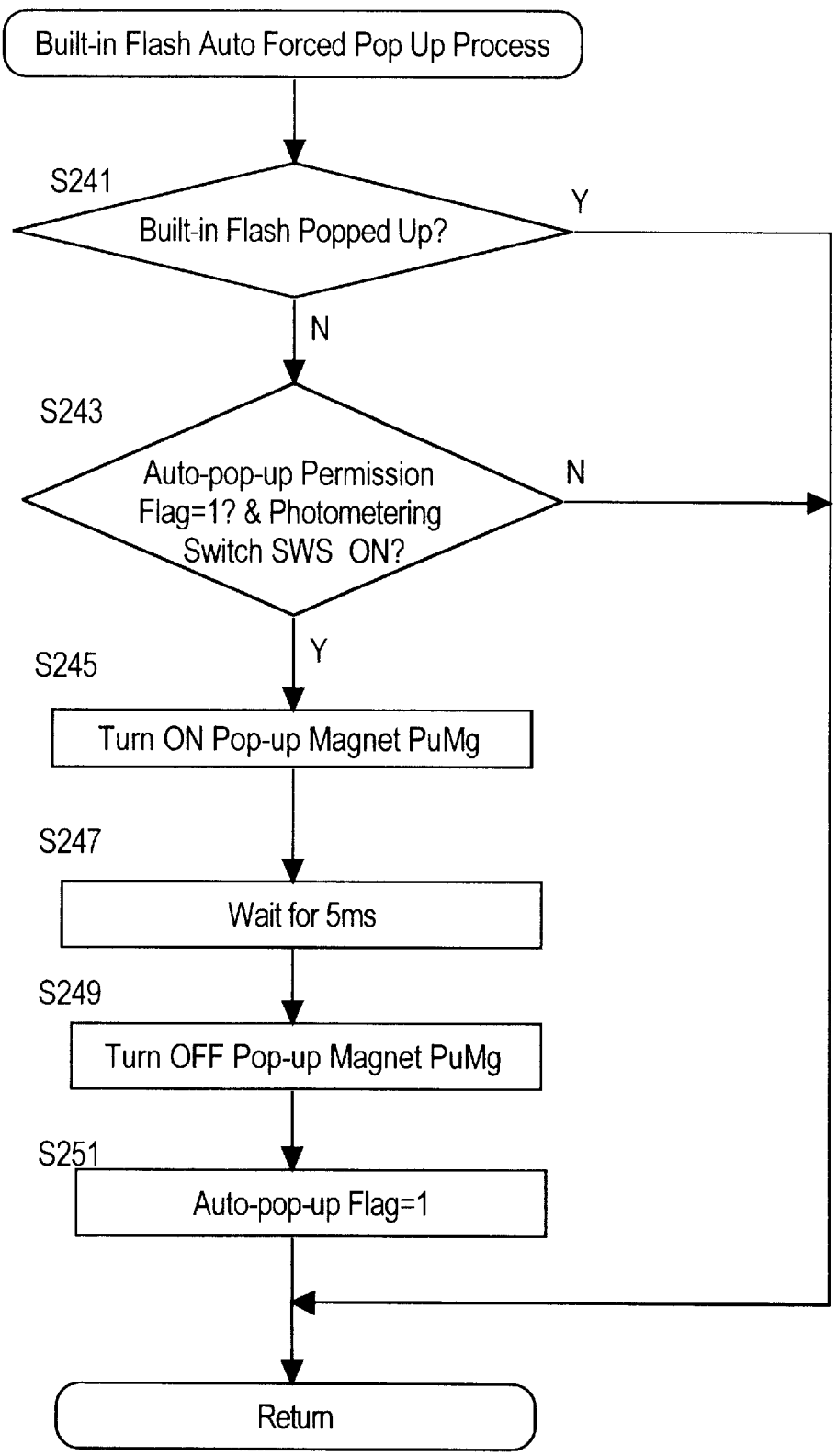
FIG. 13 is a flow chart of the subroutine "Built-in Flash Auto Pop-up Process" shown in FIG. 11.

The built-in flash auto pop-up process, which is performed at step S217 in the main process shown in FIG. 11, will be hereinafter discussed in detail with reference to the flow chart shown in FIG. 13. As can be seen from the flow chart shown in FIG. 13, in a state where the built-in flash 111 is retracted, it is popped up through the built-in flash auto pop-up process when conditions necessary for having the built-in flash 111 discharge are all set. In the built-in flash auto pop-up process, firstly it is determined whether the pop-up state detection switch SWPud is ON so as to know if the built-in flash 111 has popped (step S241). If it is determined at step S241 that the pop-up state detection switch SWPud is ON, it means that the built-in flash 111 has already popped, so that control returns to the main process. If the pop-up state detection switch SWPud is not ON, it is determined whether an auto-pop-up permission flag is 1 while the photometering switch SWS is ON (step S243).

The auto-pop-up permission flag is set to 1 on condition that the built-in flash 111 is retracted if it is judged in the AE calculation process (which includes an auto-discharge judging process shown in FIGS. 16A and 16B) that the built-in flash 111 should discharge. If the auto-pop-up permission flag is not 1 or the photometering switch SWS is not ON at step S243, control returns to the main process. If the auto-pop-up permission flag is 1 while the photometering switch SWS is ON at step S243, control proceeds to step S245. The pop-up magnet PuMg is turned ON (power starts to be supplied) at step S245. Subsequently, control waits for 5 ms so that power continues to be supplied to the pop-up magnet PuMg for 5 ms (step S247). Subsequently, the engagement of the hold mechanism with the built-in flash 111 is released by turning the pop-up magnet PuMg OFF to make the built-in flash 111 pop-up by the spring force of the spring of the pop-up mechanism (step S249). Subsequently, the auto-pop-up flag is set to 1 (step S251) and control returns to the main process.

Figure 9B:
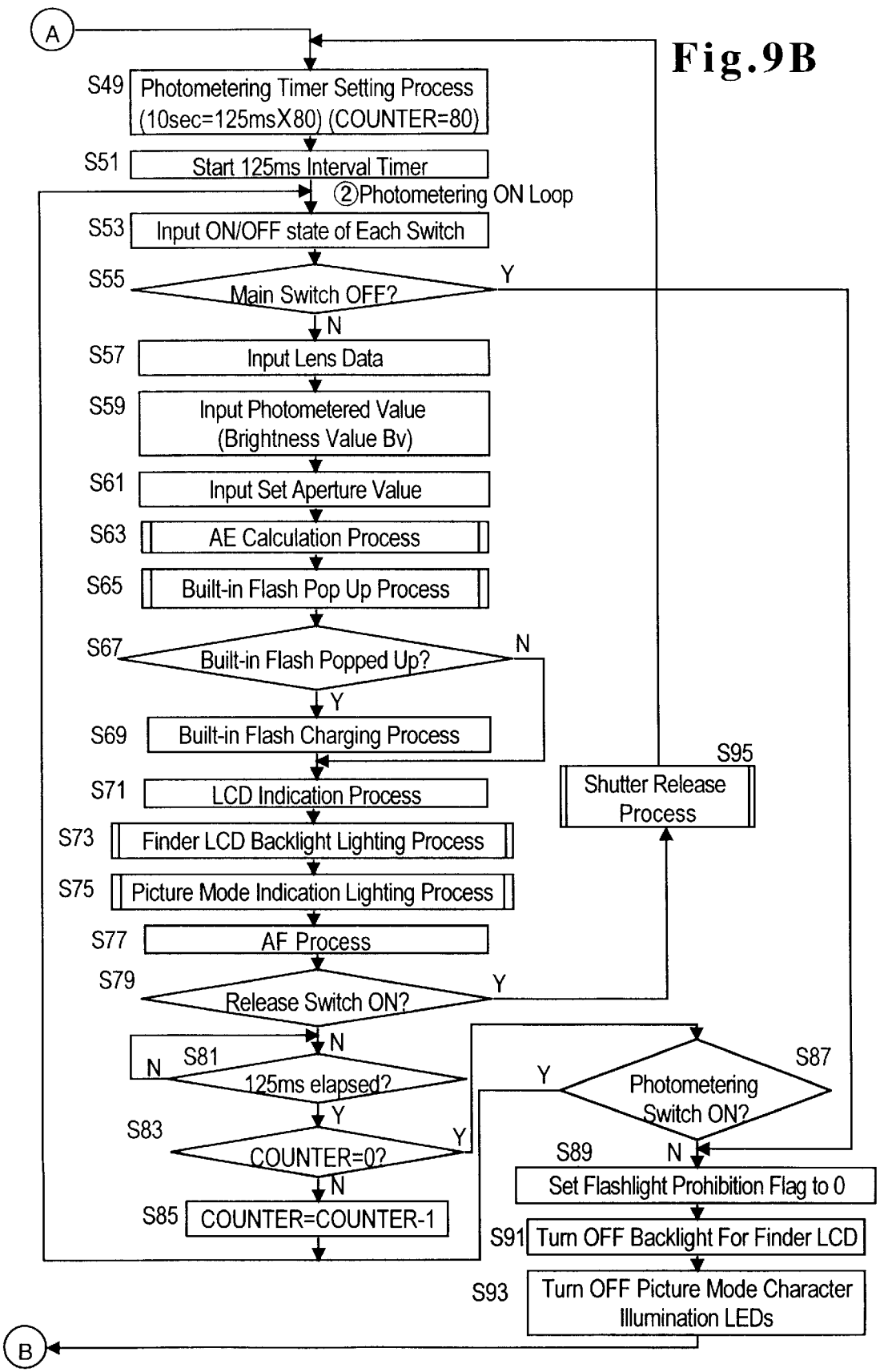

If the built-in flash 111 is made to pop-up in the built-in flash pop-up process performed at step S65 in the main process shown in FIG. 9B, the pop-up state detection switch SWPud is turned ON and the auto-pop-up flag is set to 1. Therefore, the next time control re-enters the built-in flash pop-up process, control comes out of the built-in flash pop-up process from step S205 (FIG. 11) to return to the main process. On the other hand, if the built-in flash 111 is retracted manually by the user after the built-in flash 111 is popped up, the pop-up state detection switch SWPud is turned OFF, so that at step S207 control proceeds to step S209 in the built-in flash pop-up process when control enters it for the first time since the pop-up state detection switch SWPud is turned OFF. Thereafter, the flashlight prohibition flag is set to 1, the auto-pop-up flag is set to 0 and control returns to the main process. Thereafter, the flashlight prohibition flag remains at 1 while the photometering switch SWS is held ON until the photometering timer, which is started at step S51, has elapsed. Thereafter, if control enters the built-in flash pop-up process at step S65 in the main process shown in FIG. 9B, at step S203 control comes out of the built-in flash pop-up process to return to the main process. According to this control, even if the auto flashlight permission flag is set to 1 and at the same time the photometering switch SWS is turned ON, the built-in flash 111 is not automatically popped up. After the photometering timer has elapsed, the flashlight prohibition flag is set to 0 at step S89 in the main process shown in FIG. 9B. Therefore, if control enters the built-in flash pop-up process at step S65, the built-in flash 111 is automatically popped up on condition that the auto-flashlight permission flag is set to 1 while the photometering switch SWS is turned ON.

AE Calculation Process

Figure 14:
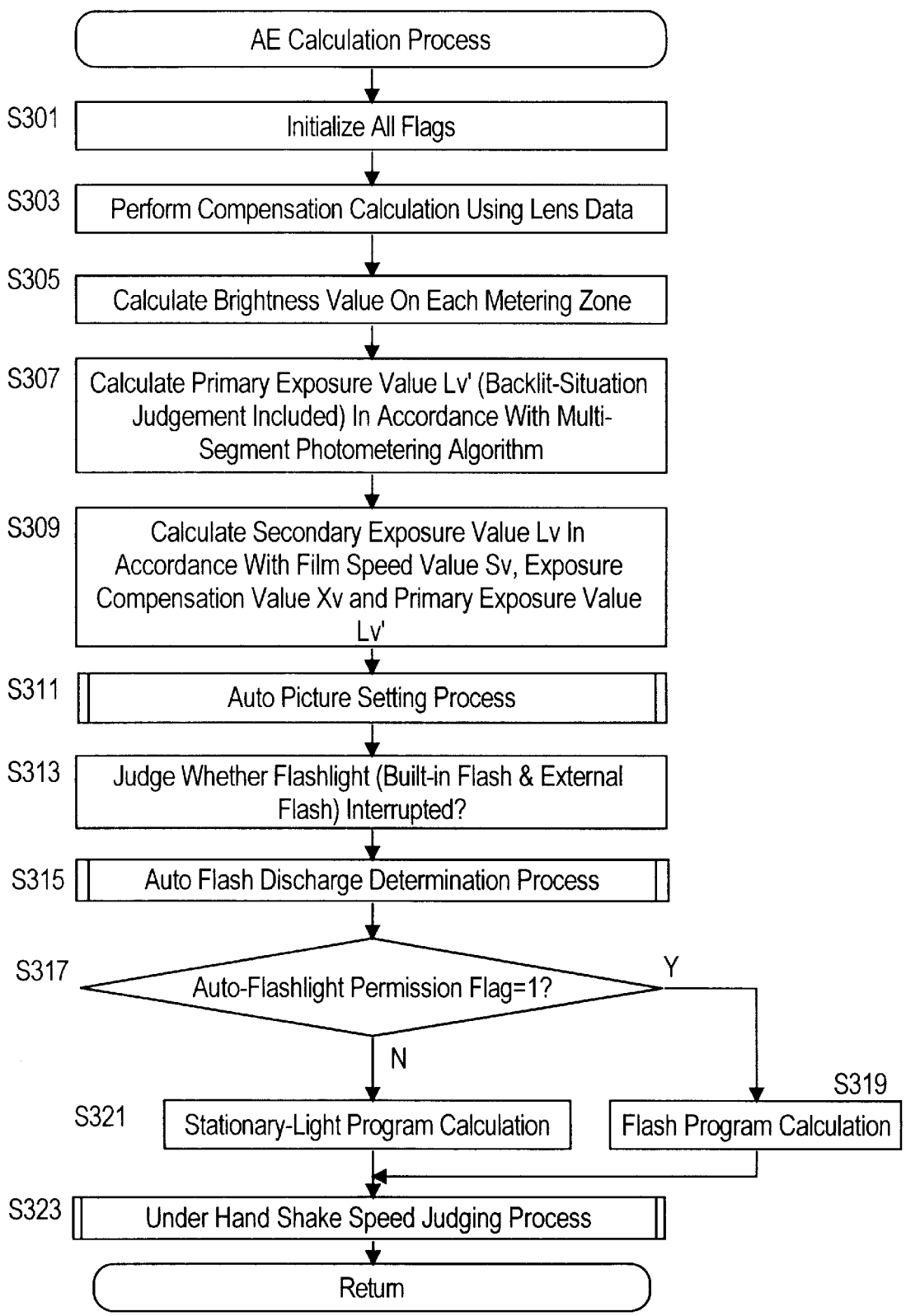
FIG. 14 is a flow chart of the subroutine "AE Calculation Process" shown in FIG. 9.

The AE calculation process, which is performed at step S63 in the main process shown in FIG. 9B, will be hereinafter discussed in detail with reference to the flow chart shown in FIG. 14. In this process, firstly, all flags which are associated with the AE calculation process such as an under hand-shake-speed flag are set to 0 (step S301). Subsequently, a predetermined compensation calculation is performed using the lens data such as the open aperture value and the minimum aperture value of the lens 61 which are input to the CPU 11 from the lens CPU 63 when the CPU 11 has data-communicated with the lens CPU 63 at step S57 (step S303). Subsequently, a brightness value is calculated on each photometering zone in accordance with the photometering signals input from the photometering IC 41 (step S305), and a primary exposure value Lv' is calculated in accordance with a multi-segment photometering algorithm (step S307). Thereafter, a secondary exposure value Lv which is used for the exposure control is calculated in accordance with a film speed value Sv, an exposure compensation value Xv and the primary exposure value Lv' (step S309).

Subsequently, an auto picture setting process ("Auto Picture Setting Process" described in FIG. 15) for setting an exposure mode selected by an operation of the mode dial 121 is performed (step S311). Details of the auto picture setting process will be discussed later. Subsequently, it is judged whether the flashlight emitted from the built-in flash 111 will be interrupted by part of the attached lens 61, and at the same it is judged whether the flashlight emitted from the external flash 71 attached to the hot shoe 113 will be interrupted by part of the attached lens 61, in accordance with the information on flashlight interruption of the built-in flash 111 by the attached lens, the information on flashlight interruption of the external flash 71 by the attached lens and the lens information on the attached lens 61 (step S313). "Flashlight interruption" means that the flashlight emitted from the built-in flash 111 or the external flash 71 is interrupted by part of the attached lens 61. Accordingly, the flashlight does not cover center lower part of the object area, so that the center lower part appears dark. In the present embodiment, in order to prevent such a problem from occurring, if it is judged at step S313 that flashlight emitted from the built-in flash 111 and/or the external flash 71 will be interrupted by part of the attached lens 61, this judgement is stored in the internal RAM of the CPU 11 so that the built-in flash 111 or the external flash 71 does not discharge in an auto flash discharge determination process performed at step S315.

The auto flash discharge determination process ("Auto Flash Discharge Determination Process" described in FIGS. 16A and 16B) is performed at step S315. If the auto-flashlight permission flag is set to 1 in the auto flash discharge determination process, the CPU 11 judges whether the built-in flash 111 or the external flash 71 should discharge in accordance with predetermined conditions in a program calculation process. Details of the auto flash discharge determination process will be discussed later. If the CPU 11 judges that the built-in flash 111 or the external flash 71 should discharge, the built-in flash 111 or the external flash 71 discharges in a shutter release process ("Shutter Release Process" described in FIG. 20) at step S95.

After the auto flash discharge determination process is performed, it is determined at step S317 whether the auto flashlight permission flag is 1. If the auto-flashlight permission flag is 1, a flash program calculation used on a flashlight-permission condition is performed to calculate the optimum shutter speed and the optimum aperture value (step S319). If the auto-flashlight permission flag is not 1, a stationary-light program calculation used on a flashlight-prohibition condition is performed to calculate the optimum shutter speed and the optimum aperture value (step S321). After the operation at step S319 or S321 is performed, an under hand-shake speed judging process is performed (step S323).

In the under hand-shake speed judging process ("Under Hand-shake Speed Judging Process" described in FIG. 17), it is determined whether the shutter speed calculated in the stationary-light program calculation at step S321 or the flash program calculation at step S319 is slower than the slowest shutter speed calculated to prevent blurred images due to hand movement. Details of the under hand-shake speed judging process will be discussed later. If the shutter speed calculated in the stationary-light program calculation at step S321 or the flash program calculation at step S319 is slower than the slowest shutter speed, the red LED 47*b* is turned ON in the finder LCD backlight lighting process at step S73 to illuminate the finder LCD 45 by red light, so as to warn the user that a desired image will not be obtained.

Auto Picture Setting Process

Figure 15:
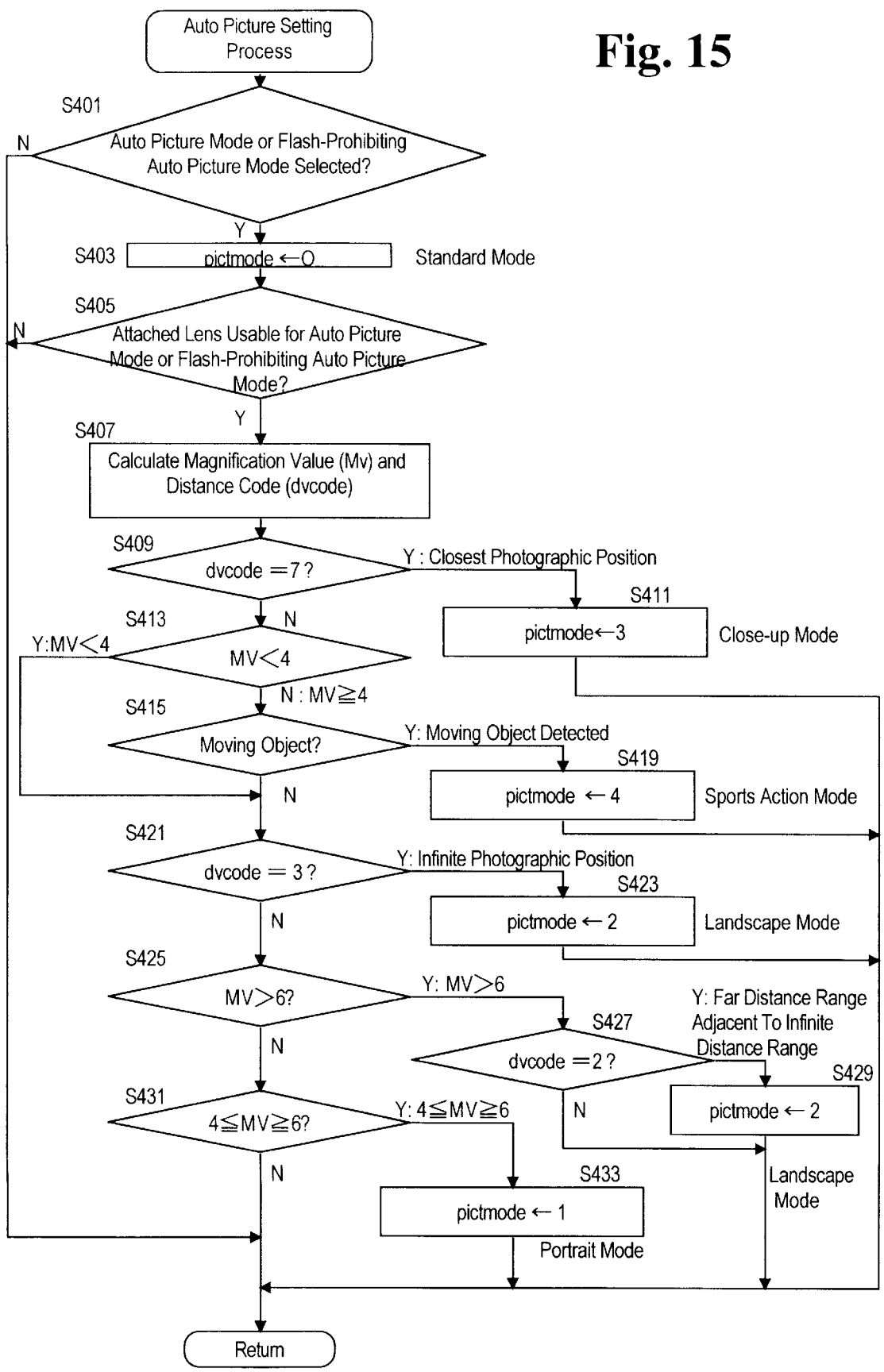
FIG. 15 is a flow chart of the subroutine "Auto Picture Setting Process" shown in FIG. 14.

The auto picture setting process, which is performed at step S311 in the AE calculation process shown in FIG. 14, will be hereinafter discussed in detail with reference to the flow chart shown in FIG. 15. In this process, if the flash-prohibiting auto picture mode or the auto picture mode is selected by an operation of the mode dial switch SWMod, the most appropriate program mode (program line) is selected from the five picture modes (the sports action mode, the close-up mode, the landscape mode, the portrait mode and the standard mode) in accordance with the object distance, the photographic magnification and the moving-object detection information. In the present embodiment, the night portrait mode, which is one of the eight program modes, is not selected in the auto picture setting process because the shutter speed will be slower than the slowest shutter speed calculated to prevent blurred images due to hand movement. The object distance used in the auto picture setting process is that which is determined by the position of the focal lens group L which is obtained in the operation at step S53 (FIG. 9B), while the photographic magnification used in the auto picture setting process is that which is determined by the focal length of the interchangeable lens 61 and the object distance (i.e., the position of the focal lens group L).

The lens CPU 63 of the interchangeable lens 61 detects the position of the focal lens group L with the distance code plate 65 which divides the movable range of the focal lens group L from the closest photographing position to the infinite photographing position into a plurality of sections to output the detected position of the focal lens group L to the CPU 11. Thereafter, the CPU 11 converts the input detected position of the focal lens group L into a corresponding one of eight distance codes "dvcode" 0 through 7. In the present embodiment, the eight distance codes "dvcode" are determined as follows.

| (Distance Code) | |
|---|---|
| 7 | Closest Photographic Position |
| 6 | ↑ |
| 4 | • |
| 5 | • |
| 1 | • |
| 0 | • |
| 2 | ↓ |
| 3 | Infinite Photographic Position |

The moving-object detection information is that which judges that the object to be photographed is in motion in the AF operation at step S77 shown in FIG. 9B in the case where the object cannot be brought into focus more then one time even if the focal lens group L is driven to move to an in-focus position, which is calculated in accordance with the amount of defocus of the object that is detected via the AF CCD image sensor 33. In the present embodiment, the object brightness, the object distance and the photographic magnification are converted into a brightness value Bv, a distance value Dv and a magnification value Mv, respectively, according to the APEX system (additive system of photographic exposure) respectively.

In the auto picture setting process, firstly, it is determined whether one of the auto picture mode or the flash-prohibiting auto picture mode has been selected (step S401). If neither the auto picture mode or the flash prohibiting auto picture mode has been selected, control returns to the AE calculation process. If the auto picture mode or the flash-prohibiting auto picture mode has been selected, pictmode (a variable for representing one of the five picture modes: the sports action mode, the close-up mode, the landscape mode, the portrait mode and the standard mode) is set to 0 (step S403). In the present embodiment, the pictmodes 0, 1, 2, 3 and 4 represent the standard mode, the portrait mode, the landscape mode, the close-up mode and the sports action mode, respectively. Subsequently, it is determined whether the attached interchangeable lens 61 includes a lens CPU wherein each of the auto picture mode and the flash-prohibiting auto picture mode is possible (step S405). If it is determined at step S405 that the attached interchangeable lens 61 does not include such a lens CPU, the pictmode remains 0 and control returns to the AE calculation process. If the attached interchangeable lens 61 includes such a lens CPU, the magnification value Mv and the distance code "dvcode" are calculated in accordance with the lens data input in the operation at step S57 (step S407).

The magnification value Mv is calculated using the following formula:

$\log_2$(object distance/focal length).

Subsequently, it is determined whether the distance code "dvcode" is 7, namely, it is determined whether the focal lens group L is positioned at the closest photographic position thereof (step S409). If the focal lens group L is positioned at the closest photographic position, the pictmode is set to 3 (the close-up mode) at step S411 and subsequently control returns to the AE calculation process.

If it is determined at step S409 that the distance code "dvcode" is not 7, it is determined whether the magnification value Mv is less than 4 (step S413). If the magnification value Mv is not less than 4, it is determined whether the object to be photographed has been identified as a moving object (step S415). If the object has been identified as a moving object, the pictmode is set to 4 (the sports action mode) at step S419 and subsequently control returns to the AE calculation process.

If it is determined at step S413 that the magnification value Mv is smaller than 4 or if it is determined at step S415 that the object to be photographed is not identified as a moving object, it is determined whether the distance code "dvcode" is 3, namely, it is determined whether the focal lens group L is positioned at the infinite photographic position thereof (step S421). If the focal lens group L is positioned at the infinite photographic position, the pictmode is set to 2 (the landscape mode) at step S423 and subsequently control returns to the AE calculation process.

If it is determined at step S421 that the distance code "dvcode" is not 3, it is determined whether the magnification value Mv is greater than 6 (step S425). If the magnification value Mv is greater than 6, it is determined whether the distance code "dvcode" is 2 (step S427). The distance code "dvcode" 2 corresponds to a far distance range adjacent to an infinite distance range. If it is determined at step 427 that the distance code "dvcode" is 2, the pictmode is set to 2 (the landscape mode) at step S429 and control returns to the AE calculation process. If it is determined at step 427 that the distance code "dvcode" is not 2, the pictmode remains at 0 and control returns to the AE calculation process.

If it is determined at step S425 that the magnification value Mv is not greater than 6, it is determined whether the magnification value Mv is greater than or equal to 4 and less than or equal to 6 (step S431). If the magnification value Mv is within this range ($4 \leq Mv \leq 6$), the pictmode is set to 1 (the portrait mode) at step S433 and subsequently control returns to the AE calculation process. If the magnification value Mv is not within this range, the pictmode remains at 0 and control returns to the AE calculation process.

According to the above process, the most appropriate programmed exposure mode (pictmode) is chosen from the sports action mode, the close-up mode, the landscape mode, the portrait mode and the standard mode in accordance with the photographic situation. Although neither the algorithm or the program line for each programmed exposure mode is illustrated, in the sports action mode, a faster shutter speed is selected than in the standard mode to capture an object in motion.

Thereafter, according to the selected pictmode, the stationary-light program calculation is performed at step S321 or the flash program calculation is performed at step S319 to calculate the optimum shutter speed and the optimum aperture value.

Auto Flash Discharge Determination Process

Figure 16A:
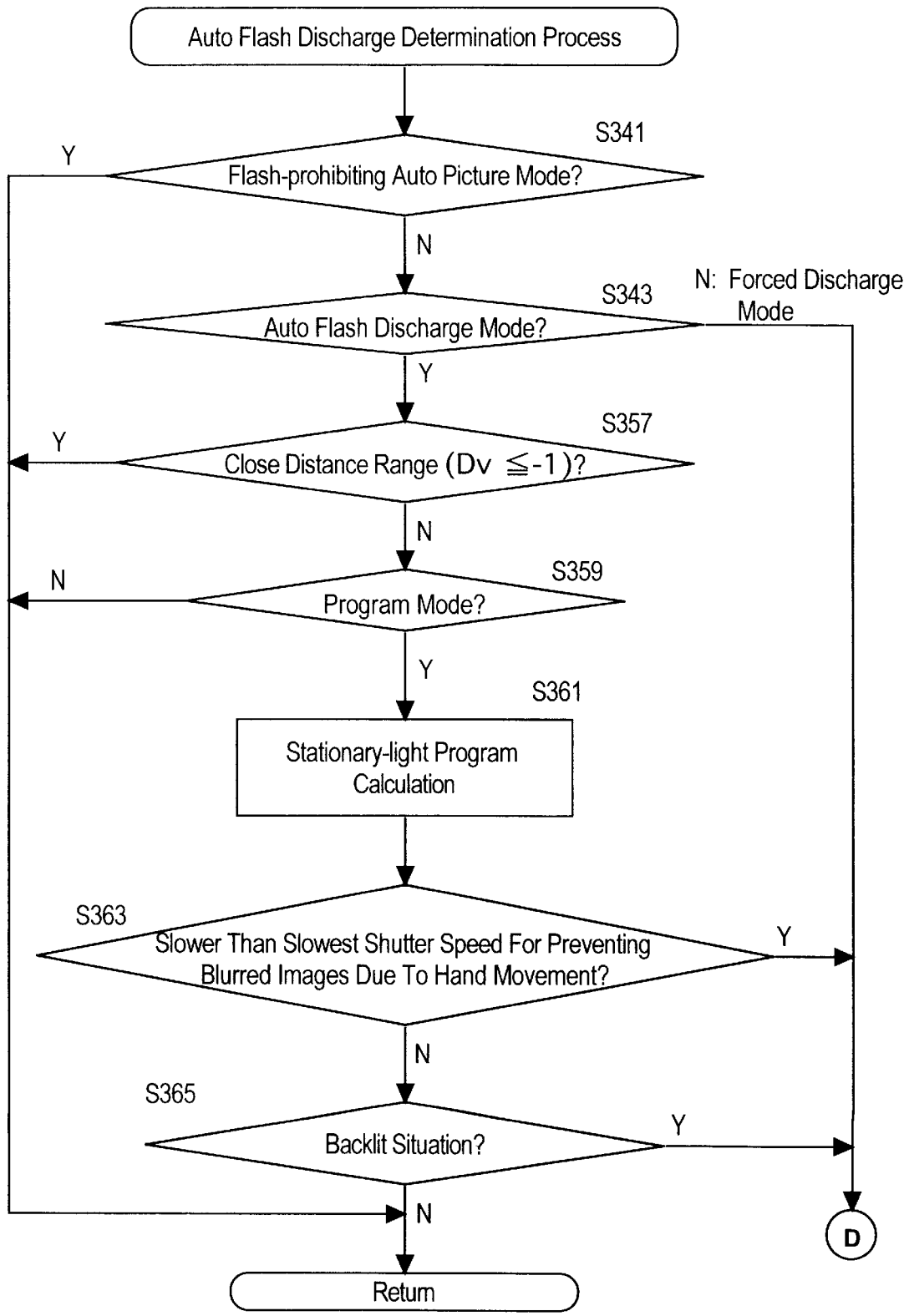
FIGS. 16A and 16B show a flow chart of "Auto Flash Discharge Determination Process" shown in FIG. 14.
Figure 16B:
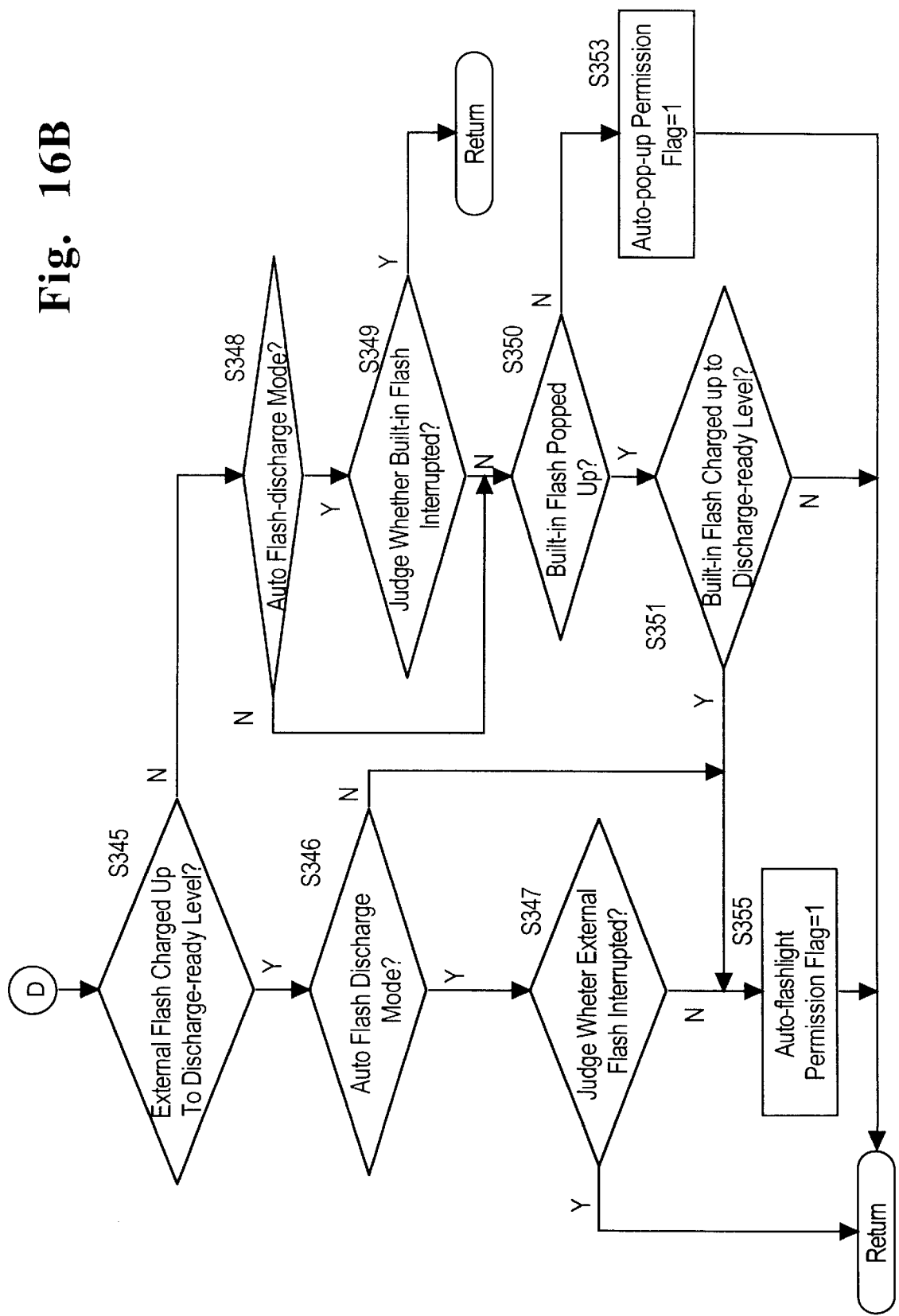

The auto flash discharge determination process, which is performed at step S315 in the AE calculation process described in FIG. 14, will be hereinafter discussed in detail with reference to the flow chart shown in FIGS. 16A and 16B. In this process, firstly, it is determined whether the flash-prohibiting auto picture mode has been selected by checking the state of the mode dial switch SWMod (step S341). If the flash-prohibiting auto picture mode has been selected, it means that the built-in flash 111 and the external flash 71 are prohibited from discharging, so that control returns to the AE calculation process. If a mode other than the flash-prohibiting auto picture mode has been selected, it is determined whether an auto flash discharge mode has been selected (step S343).

If it is determined at step S343 that the auto flash discharge mode is not selected, it means that a forced discharge mode has been selected, so that control proceeds to step S345 at which it is determined whether the external flash 71 has been charged up to a discharge-ready level thereof.

If it is determined at step S345 that the external flash 71 has been charged to the discharge-ready level, it is determined whether the auto flash discharge mode has been selected (step S346). If the auto flash discharge mode has been selected, it is determined whether, at step S313, the flashlight emitted from the external flash 71 attached to the hot shoe 113 was judged as being interrupted by part of the attached lens 61 (step S347). If such judgement was made at step S313, the external flash 71 is not permitted to discharge, and control returns to the AE calculation process. Otherwise, the auto-flashlight permission flag, which indicates whether the built-in flash 111 is permitted from discharging automatically, is set to 1 (step S355) and control returns to the AE calculation process. If it is determined at step S346 that the auto flash discharge mode is not selected, the auto-flashlight permission flag is set to 1 (step S355) and control returns to the AE calculation process.

If it is determined at step S345 that the external flash 71 has not yet been charged to the discharge-ready level (this is also true to the case where the external flash 71 is not attached to the hot shoe 113), it is determined whether the auto flash discharge mode has been selected (step S348). If the auto flash discharge mode has been selected, it is determined whether it was judged at step S313 that the flashlight emitted from the built-in flash 111 will be interrupted by part of the attached lens 61 (step S349). If such a judgement was made, the built-in flash 111 is not permitted to discharge, and control returns to the AE calculation process. Otherwise, it is determined whether the built-in flash 111 has popped up by checking the ON/OFF state of the pop-up state detection switch SWPud (step S350). Likewise, if it is determined at step S348 that the auto flash discharge mode is not selected, it is determined whether the built-in flash 111 has popped up by checking the ON/OFF state of the pop-up state detection switch SWPud (step S350).

If it is determined at step S350 that the built-in flash 111 has popped up, it is determined whether the built-in flash 111 has been charged up to a discharge-ready level thereof (step S351). If the built-in flash 111 has been charged up to the discharge-ready level, the auto-flashlight permission flag is set to 1 (step S355) and control returns to the AE calculation process. If it is determined at step S351 that the built-in flash 111 has not been yet charged up to the discharge-ready level, control returns to the AE calculation process.

If it is determined at step S350 that the built-in flash 111 has not popped up, it means that the built-in flash 111 is retracted or currently on the way to the fully-popped up position and therefore is not properly directed forwardly, so that the auto-pop-up permission flag is set to 1 (step S353) and subsequently control returns to the AE calculation process.

If the auto-pop-up permission flag is set at 1, in the built-in flash auto pop-up process (FIG. 13), control proceeds from step S243 to step S245 on condition that the photometering switch SWS is ON, so that the built-in flash 111 pops up automatically.

If it is determined at step S343 that the auto flash discharge mode has been selected, it is determined whether the object distance, which is obtained in the data-communication of the CPU 11 with the lens CPU 63, is equal to or shorter than a predetermined distance; namely, within a close distance range (step S357). If it is determined at step S357 that the object distance is within the close distance range, control returns to the AE calculation process. In the case where the object distance is too short, the automatic flashlight control does not work effectively. This may result in an over-exposure. In the present embodiment, if the distance value Dv is equal to or less than −1 (approximately 70 cm), the CPU 11 judges that the object distance is within the close distance range, so that in this case the CPU 11 controls each of the built-in flash 111 and the external flash 71 not to automatically discharge.

If it is determined at step S357 that the object distance, which is obtained in the data-communication of the CPU 11 with the lens CPU 63, is not equal to or less than the predetermined distance (i.e., the object distance is longer than the predetermined distance), it is determined whether one of the eight program modes (the flash-prohibiting auto picture mode, the night portrait mode, the sports action mode, the close-up mode, the landscape mode, the portrait mode, the standard mode, and the auto picture mode) has been selected (step S359). If it is determined at step S359 that a mode other than the eight program modes has been selected (i.e., one of the manual exposure mode, a shutter-priority AE mode or the program AE mode has been selected), whether the built-in flash 111 or the external flash 71 should be used or not depends on the user, so that control returns to the AE calculation process.

If it is determined at step S359 that one of the eight program modes has been selected, a stationary-light program calculation is performed to calculate the optimum shutter speed and the optimum aperture value (step S361). Subsequently, it is determined whether the shutter speed calculated in the stationary-light program calculation at step S361 is slower than the slowest shutter speed calculated to prevent blurred images which may be caused by hand movement (step S363). Subsequently, it is determined whether an object to be photographed is in a backlit situation in accordance with the object brightness data obtained from the photometering IC 41 (step S365). If it is determined at step S363 that the calculated shutter speed is not slower than the required slowest shutter speed, and if it is determined at step S365 that the object to be photographed is not in a backlit situation, control returns to the AE calculation process. If it is determined at step S363 that the calculated shutter speed is slower than the required slowest shutter speed or if it is determined at step S365 that the object to be photographed is in a backlit situation, control proceeds to step S345 so as to make the built-in flash 111 or the external flash 71 to discharge automatically.

Under Hand-shake Speed Judging Process

Figure 17:
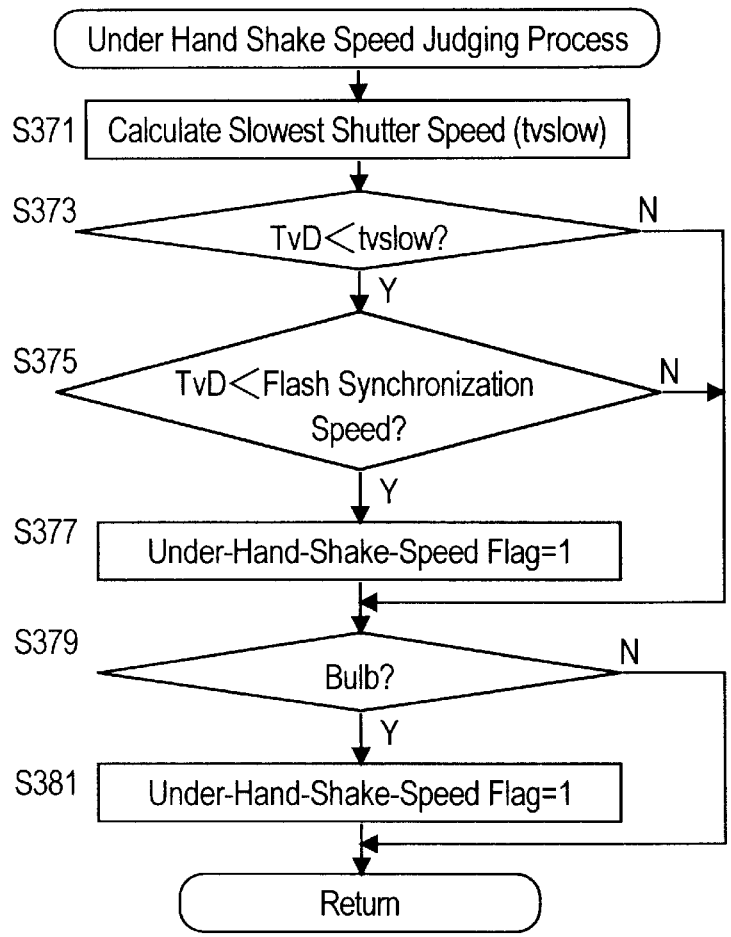
FIG. 17 is a flow chart of the subroutine "Under Handshake Speed Judging Process" shown in FIG. 14.

The under hand-shake speed judging process, which is performed at step S323 in the AE calculation process shown in FIG. 14, will be hereinafter discussed in detail with reference to the flow chart shown in FIG. 17. In this process, firstly, a slowest shutter speed "tvslow" for preventing blurred images due to hand movement is calculated using a predetermined operation (step S371). Subsequently, it is determined whether the shutter speed "TvD" calculated in the stationary-light program calculation at step S321 is slower than the slowest shutter speed "tvslow" (step S373). If it is determined at step S373 that the shutter speed "TvD" is slower than the slowest shutter speed "tvslow", it is determined whether the shutter speed "TvD" is slower than a flash synchronization speed (step S375).

If it is determined at step S373 that the shutter speed "TvD" is slower than the slowest shutter speed "tvslow" and further if it is determined at step S375 that the shutter speed "TvD" is slower than the flash synchronization speed, the under-hand-shake-speed flag is set to 1 (step S377) and control proceeds to step S379. If it is determined at step 373 that the shutter speed "TvD" is not slower than the slowest shutter speed "tvslow" or if it is determined at step S375 that the shutter speed "TvD" is not slower than the flash synchronization speed, control skips the operation at step S377 to proceed to step S379.

It is determined at step S379 whether bulb mode has been selected. The bulb mode is selected in the manual mode if it is chosen by the user from different shutter speeds including a bulb setting. If it is determined at step S379 that the bulb mode has been selected, the under-hand-shake speed flag is set to 1 (step S381) and control returns to the AE calculation process. If not, control simply returns to the AE calculation process. If the under-hand-shake speed flag is set at 1, the red LED 47b is turned ON in the finder LCD backlight lighting process at step S73 to illuminate the finder LCD 45 by red light so as to warn the user that a desired image will not be obtained.

Finder LCD Backlight Lighting Process

Figure 18:
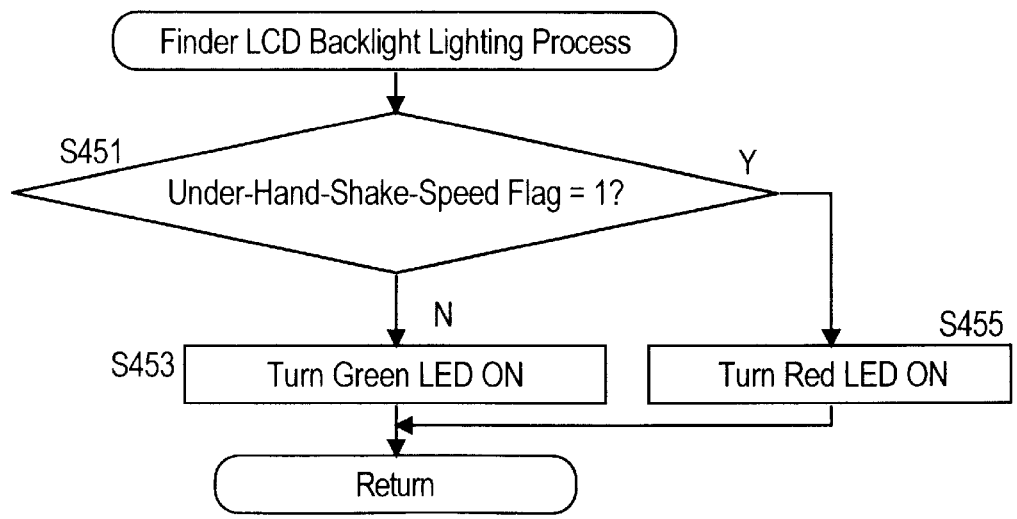
FIG. 18 is a flow chart of the subroutine "Finder LCD Backlight Lighting Process" shown in FIG. 9.

The finder LCD backlight lighting process, which is performed at step S73 in the main process shown in FIG. 9B, will be hereinafter discussed in detail with reference to the flow chart shown in FIG. 18. In this process, firstly, it is determined whether the under-hand-shake-speed flag is 1 (step S451). If the under-hand-shake-speed flag is not 1, the green LED 47a is turned ON to indicate a normal photographic condition (step S453) and subsequently control returns to the main process. If the under-hand-shake-speed flag is 1, the red LED 47b is turned ON to warn the user that a desired image will not be obtained due to hand movement (step S455) and subsequently control returns to the main process. According to this control, in the case of warning the user that a desired image will not be obtained due to hand movement, not only the illumination color of a piece of warning information of the photographic information indicated on the finder LCD 45 is changed, but the illumination color of all the photographic information indicated on the finder LCD 45 is changed, so that it is easy for the user to be visually warned.

If the auto-flashlight permission flag is set to 1 after the built-in flash 111 or the external flash 63 has been charged, the under-hand-shake-speed flag is set to 0 at step S301 in the AE calculation process (FIG. 14) and subsequently the optimum shutter speed is calculated again in the flashlight-permission condition, this recalculated optimum shutter speed is a flash synchronization speed, so that the red LED 47b is turned OFF and at the same time the green LED 47a is turned ON.

Picture Mode Indication Lighting Process

Figure 19A:
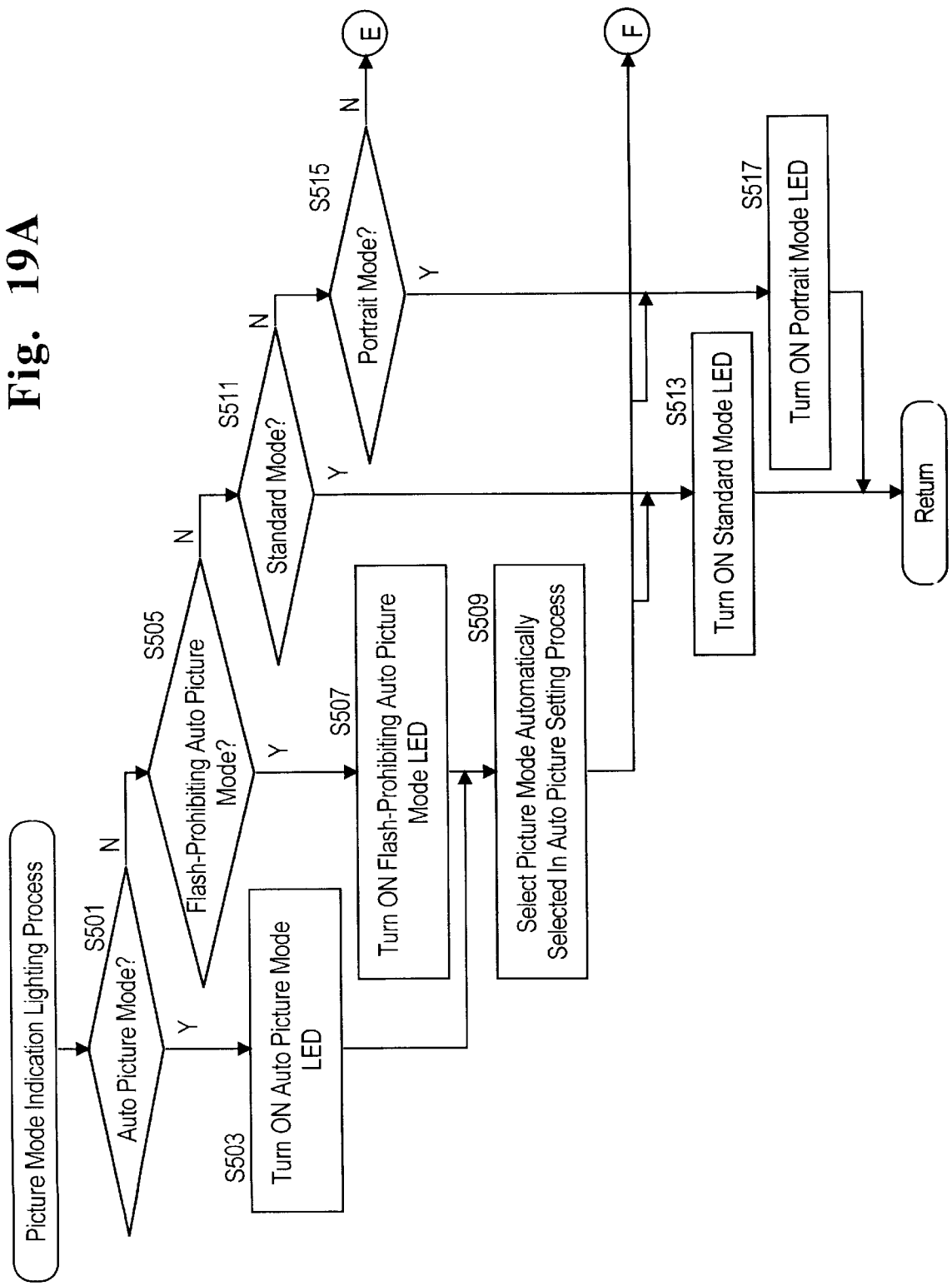
FIGS. 19A and 19B show a flow chart of the subroutine "Picture Mode Indication Lighting Process" shown in FIG. 9.
Figure 19B:
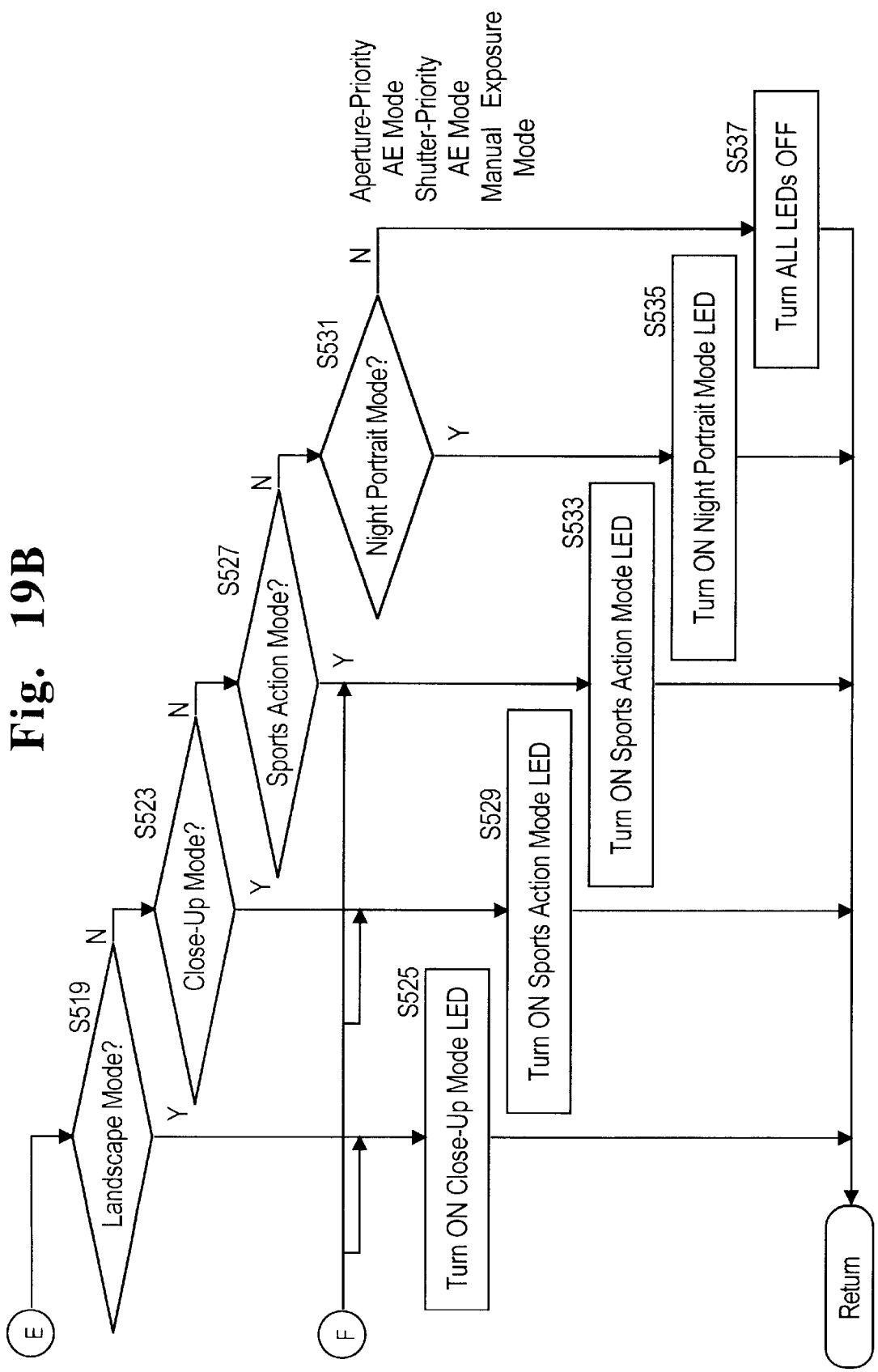

The picture mode indication lighting process, which is performed at step S75 in the main process shown in FIG. 9B, will be hereinafter discussed in detail with reference to the flow chart shown in FIGS. 19A and 19B. In this process, if the mode selected by an operation of the bezel 125 is one of the eight picture modes: the auto picture mode, the flash prohibiting auto picture mode, the standard mode, the portrait mode, the close-up mode, the close-up mode, the sports action mode and the night portrait mode, the corresponding one of the eight LEDs 51h, 51a, 51g, 51f, 51e, 51d, 51c and 51b is turned ON, respectively. In the case where the auto picture mode or the flash-prohibiting auto picture mode is selected, one of the picture mode character illumination LEDs 51a through 51h which corresponds to a picture mode automatically selected is turned ON. In other words, two LEDs are illuminated in the auto picture mode or in the flash-prohibiting auto picture mode. None of the eight LEDs 51a through 51h are turned ON in the case where the shutter-priority AE mode, the aperture-priority AE mode or the manual mode is selected by an operation of the bezel 125. In the present embodiment, the color of the LED 51a for illuminating the character 124a of the mode indication disk 123 which represents the flash-prohibiting auto picture mode, the color of the LED 51h for illuminating the character 124h of the mode indication disk 123 which represents the auto picture mode, and the color of each of the remaining LEDs 51b through 51g are different from one another. This makes the camera settings easy to monitor. In the present embodiment, the LED 51a for the flash-prohibiting auto picture mode preferably emits red light as a typical warning color, the LED 51h for the auto picture mode preferably emits green light, the LED 51b for the night portrait mode (which is not selected in the auto picture mode) preferably emits orange light, and each of the remaining LEDs 51c through 51g preferably emits yellow light. However, it is possible to adapt any other color scheme.

In the picture mode indication lighting process, it is determined whether the mode selected by the mode dial switch SWMod is the auto picture mode, the flash-prohibiting auto picture mode, the standard mode, the portrait mode, the close-up mode, the close-up mode, the sports action mode or the night portrait mode in this order (steps S501, S505, S511, S515, S519, S523, S527 and S531).

If the auto picture mode has been selected, the corresponding LED 51h is turned ON (step S503). Subsequently, one of the five picture modes (the sports action mode, the close-up mode, the landscape mode, the portrait mode and the standard mode) which is automatically A selected in the auto picture setting process (FIG. 15) in the AE calculation process is selected (step S509). Subsequently, one of the eight LEDs 51c through 51g which corresponds to the selected picture mode at step S509 is turned ON (step S513/S517/S525/S529/S533). Thereafter control returns to the main process.

Similarly, if the flash-prohibiting auto picture mode has been selected, the corresponding LED 51a is turned ON (step S507). Subsequently, one of the five picture modes which is automatically selected in the auto picture setting process (FIG. 15) in the AE calculation process is selected (step S509). Subsequently, one of the eight LEDs 51c through 51g which corresponds to the selected picture mode at step S509 is turned ON (step S513/S517/S525/S529/S533). Thereafter control returns to the main process.

According to this process, in the auto picture mode or the flash-prohibiting auto picture mode, the LED 51h for the auto picture mode or the LED 51a for the flash-prohibiting auto picture mode is firstly turned ON and also one of the eight LEDs 51c through 51g which corresponds to the automatically-selected picture mode is turned ON, so that the user can be easily informed of the selected program exposure mode in the auto picture mode or the flash-prohibiting auto picture mode by monitoring the state of illumination of each character 124a, 124c, 124d, 124e, 125f, 125g and 125h.

If it is determined that either the auto picture mode or the flash-prohibiting auto picture mode has not been selected (steps S501 and S505) and if it is determined that the standard mode has been selected (step S511), the corresponding LED 51g is turned ON (step S513) and subsequently control returns to the main process. If it is determined that the portrait mode has been selected (step S515), the corresponding LED 51f is turned ON (step S517) and subsequently control returns to the main process.

If it is determined that the landscape mode has been selected (step S519), the corresponding LED 51e is turned ON (step S525) and subsequently control returns to the main process. If it is determined that the close-up mode has been selected (step S523), the corresponding LED 51d is turned ON (step S529) and subsequently control returns to the main process. If it is determined that the sports action mode has been selected (step S527), the corresponding LED 51c is turned ON (step S533) and subsequently control returns to the main process. If it is determined that the night portrait mode has been selected (step S531), the corresponding LED 51b is turned ON (step S535) and subsequently control returns to the main process. If it is determined through the operations from step S511 to step S531 that none of the standard mode, the portrait mode, the close-up mode, the sports action mode and the night portrait mode have not been selected, all the LEDs 51a through 51h are turned OFF (step S537) and subsequently control returns to the main process.

Shutter Release Process

Figure 20:
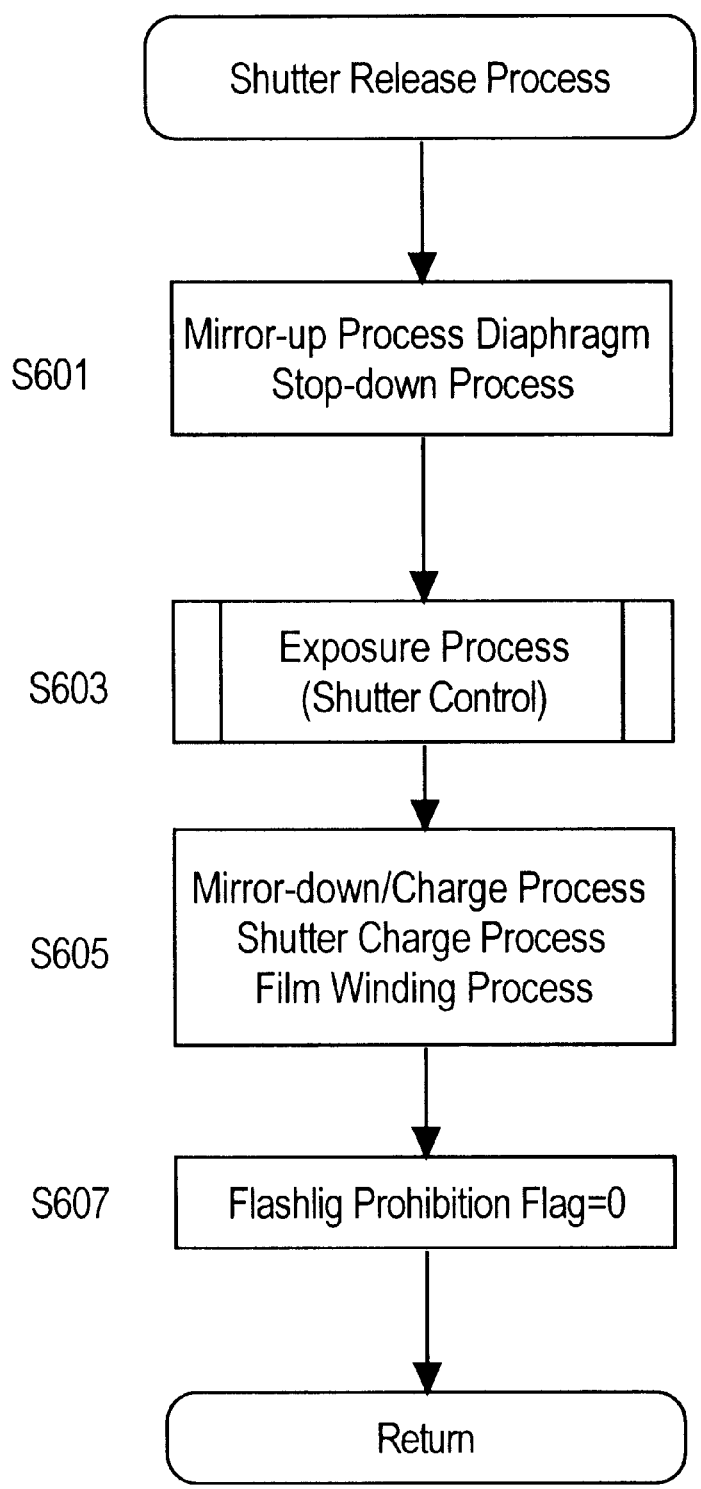
FIG. 20 is a flow chart of the subroutine "Shutter Release Process" shown in FIG. 9.

The shutter release process, which is performed at step S95 in the main process shown in FIG. 9B, will be hereinafter discussed in detail with reference to the flow chart shown in FIG. 20. In this process, firstly a mirror-engagement release magnet (not shown) is supplied with current to release the engagement of an engaging member with the quick return mirror 160 so that the quick-return mirror 160 rises by a spring force of a spring (not shown) and at the same time the diaphragm control circuit 37 is controlled to stop down the iris diaphragm of the interchangeable lens 61 by an amount corresponding to the aperture value determined by the AE calculation process (step S601). Immediately after it is detected with a mirror-up detection switch (not shown) that the quick-return mirror 160 has completely risen, the shutter circuit 35 starts operating to perform an exposure process ("Exposure Process" described in FIG. 21) in which the shutter circuit 35 is controlled to release the focal plane shutter in accordance with the determined shutter speed (step S603). The details of the exposure process will be discussed later. Subsequently, a mirror-down/charge process, a shutter charge process and a film winding process are performed (Step S605). In the mirror-down/charge process, the charge motor 21 is driven to make the quick return mirror 160 swing down while the drive springs of the leading and trailing curtains of the shutter mechanism are charged. In the shutter charge process, the leading and trailing curtains are moved back to the initial positioned thereof while a shutter charging spring is charged. In the film winding process, the film motor 25 is driven to wind film by one frame. Subsequently the flashlight prohibition flag is set to 0 (step S607) and control returns to the main process.

Exposure Process

Figure 21:
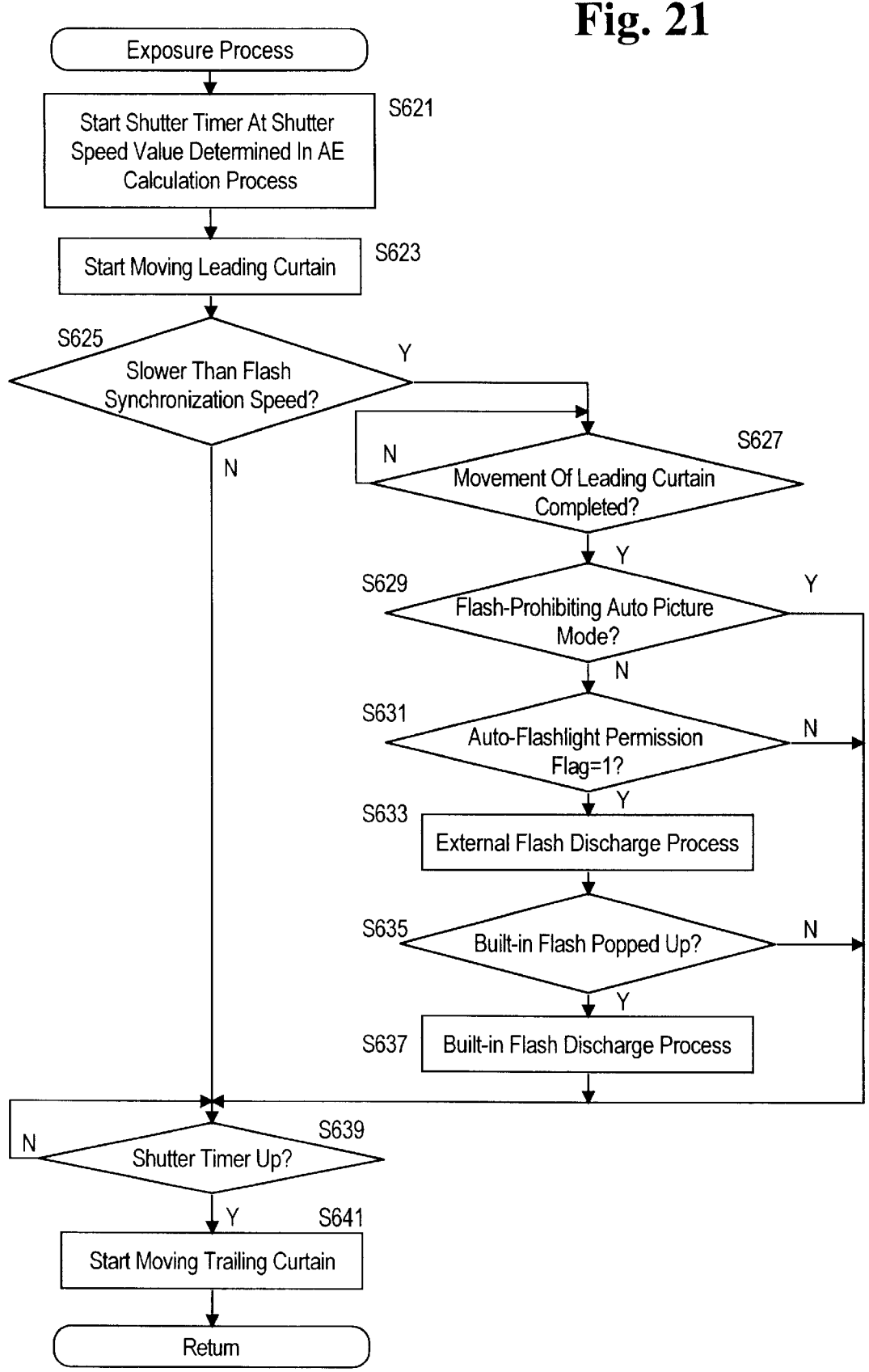
FIG. 21 is a flow chart of the subroutine "Exposure Process" shown in FIG. 20.

The exposure process, which is performed at step S603 in the shutter release process described in FIG. 20, will be hereinafter discussed in detail with reference to the flow chart shown in FIG. 21. In this process, firstly the time value of a shutter timer is set to the value of the shutter speed (exposure) determined in the AE calculation process, and subsequently the shutter timer is started (step S621). Subsequently the leading curtain of the focal plane shutter is released to start moving (step S623). It is next determined whether the shutter speed determined in the AE calculation process is equal to or slower than the flash synchronization speed (step S625). If the shutter speed is faster than the flash synchronization speed, neither the built-in flash 111 nor the external flash 71 should discharge. Accordingly, after the operation at step S625, control proceeds to step S639 at which it is determined whether the shutter timer has elapsed. If the counting of the shutter timer is up, the trailing curtain of the focal plane shutter is released to start moving (step S641), and subsequently control returns to the shutter release process.

If it is determined at step S625 that the shutter speed is equal to or slower than the flash synchronization speed, it is determined whether the movement of the leading curtain has completed (step S627). If the movement of the leading curtain has not yet completed, control repeats the checking operation at step S627. Thereafter, if the movement of the leading curtain has not yet completed, it is determined whether the flash-prohibiting auto picture mode has been selected (step S629). If the flash-prohibiting auto picture mode has been selected, neither the built-in flash 111 nor the external flash 71 should discharge. Accordingly, control proceeds to step S639. 15 If the flash-prohibiting auto picture mode has not been selected, it is determined whether the auto-flashlight permission flag is 1, i.e., whether the built-in flash 111 or the external flash 71 can discharge (step S631). If the auto-flashlight permission flag is not 1, i.e., the built-in flash 111 or the external flash 71 cannot discharge, control proceeds to step S639. If it is determined at step S631 that the auto-flashlight permission flag is 1, control proceeds to step S633 at which an external flash discharge process is performed. In this process, a command signal (discharging signal) is sent to the external flash 71 to make it discharge in the case where the external flash 71 is attached to the hot shoe 113.

Subsequently, it is determined whether the built-in flash 111 has risen to the discharge position by determining if the pop-up state detection switch SWPud is turned ON (step S635). If the built-in flash 111 has risen to the discharge position, control proceeds to step S637 at which a built-in flash discharge process is performed to make the built-in flash 111 discharge. In the case where the external flash 71 is attached to the hot shoe 113, the built-in flash 111 is prohibited from popping up, so that at step S635 control proceeds to step S639.

In the external flash discharge process at step S633 and the built-in flash discharge process at step S637, normally, exposure from image light passing through the lens is measured by a suitable light-sensitive mechanism of a TTL photometering system (not shown). Subsequently, if the value of the exposure reaches the calculated exposure value, a command signal (discharge stop signal) is sent to the built in flash 111 or the external flash 71 to stop discharging.

Opening Indication Changing Process

Figure 22:
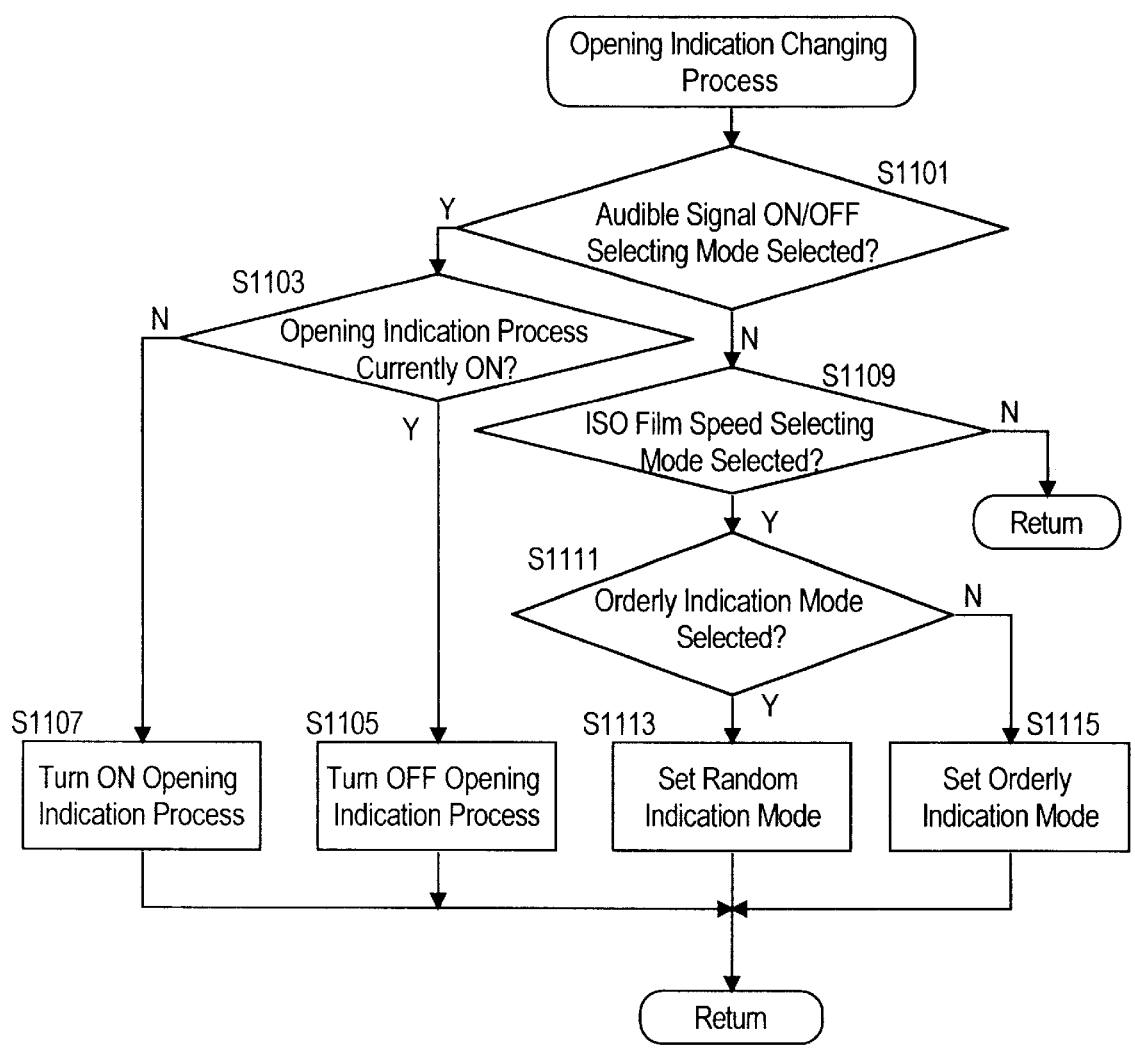
FIG. 22 is a flow chart of the subroutine "Opening Indication Changing Process" which is performed as one of the initializing processes in "CPU Initialization Process" shown in FIG. 9.

The opening indication changing process, which is a part of the CPU initializing process performed at step S11 in the main process shown in FIG. 9A, will be hereinafter discussed in detail with reference to the flow chart shown in FIG. 22. In the opening indication changing process, it is determined whether to perform the opening indication process, and it is further determined whether to select the orderly indication mode or the random indication mode if the opening indication process is performed. Since the opening indication changing process is a part of the CPU initializing process, the opening indication changing process is performed each time the battery 13 is loaded in the camera body 101. In other words, each time the opening indication changing process is performed, the opening indication process, or whether to select the orderly indication mode or the random indication mode can be changed via a toggle action of the opening indication changing process In the opening indication changing process, firstly, it is determined whether the index mark 127 of the bezel 125 is set to the character 124*m* of the mode indication disk 123, i.e., it is determined whether the audible signal ON/OFF selecting mode has been selected (step 1101). If it is determined at step S1101 that the index mark 127 of the bezel 125 is set to the character 124*m*, it is determined whether the opening indication process is currently ON (step S1103). If it is determined that the opening indication process is currently ON, the opening indication process is turned OFF (step S1105) and control returns. If it is determined that the opening indication process is currently OFF, the opening indication process is turned ON. At step S105 in the opening indication process, control proceeds to step S107 if the opening indication process is ON while control returns to the main process if the opening indication process is OFF.

If it is determined at step S1101 that the index mark 127 of the bezel 125 is not set to the character 124*m*, it is determined whether the index mark 127 of the bezel 125 is set opposite the character 1241, i.e., it is determined whether the ISO film speed selecting mode has been selected (step S1109). If it is determined at step S1109 that the index mark 127 of the bezel 125 is not set to the character 124*m*, control returns. If it is determined at step S1109 that the index mark 127 of the bezel 125 is set to the character 124*m*, it is determined whether the orderly indication mode has been selected (step S1111). If it is determined the orderly indication mode has been selected, the indication mode is changed from the orderly indication mode to the random indication mode (step S1113) and subsequently control returns. If it is determined the orderly indication mode has not been selected (i.e., the random indication mode has been selected), the indication mode is changed from the random indication mode to the orderly indication mode (step S1115) and subsequently control returns.

According to the opening indication changing process, each time the battery 13 is loaded and unloaded with the index mark 127 of the bezel 125 being set opposite the character 124*m* (which represents the audible signal ON/OFF selecting mode), the opening indication process is ON or OFF. Still more, each time the battery 13 is loaded and unloaded with the index mark 127 of the bezel 125 being set opposite the character 124*m* (which represents the audible signal ON/OFF selecting mode), the indication mode is changed between the random indication mode and the orderly indication mode. The opening indication process can be turned ON and OFF by switching over an alternate state of a predetermined flag. Likewise, the indication mode can be changed between the random indication mode and the orderly indication mode by switching over an alternate state of a predetermined flag. These flags can be stored in the EEPROM 39 so that the CPU can read out the same when necessary.

In the opening indication changing process, although it is determined at step S1103 whether the opening indication process is currently ON if it is determined at step S1101 that the index mark 127 is set opposite the character 124m, the character on the mode indication dial 123 at which the index mark 127 points at step S1101 is not limited solely to the character 124m, any other character on the mode indication dial 123 can be applied. Likewise, the character on the mode indication dial 123 at which the index mark 127 points at step S1109 is not limited solely to the character 124l, any other character on the mode indication dial 123 can be applied.

As can be understood from the foregoing, according to the illustrated embodiment to which the present invention is applied, since a character formed on the mode indication member which is selected manually with an operation member from a plurality of characters each representing the corresponding mode or setting is I illuminated by an illuminating device, the operation member and the mode indication member are closely related to each other. This makes it easy for the user to visually confirm the currently selected mode or setting.

The control turns ON one of a plurality of LEDs which corresponds to one of a plurality of characters which represents the auto picture mode or the flash-prohibiting auto picture mode, and the control further turns ON another of the LEDs which corresponds to one character of the plurality of characters representing one of a number of different modes that is automatically selected in the auto picture mode or the flash-prohibiting auto picture mode. Furthermore, when the power of the camera is ON while the index mark points to another character of the plurality of characters which respectively represent the different modes, control turns ON one of the plurality of LEDs which corresponds to the above mentioned character of the plurality of characters which respectively represent the different modes. According to this control, more than one mode can be selected and indicated at a time with a single operation member and a single indication member.

According to the present embodiment, since a plurality of light emitters are respectively disposed to correspond to a corresponding plurality of positions each of which the index mark of the operation member can point at, each of different characters which respectively represent different modes or settings can be illuminated by a corresponding one of the plurality of light emitters.

Obvious changes may be made in the specific embodiments of the present invention described herein, such modifications being within the spirit and scope of the invention claimed. It is indicated that all matter contained herein is illustrative and does not limit the cope of the present invention.

What is claimed is:

1. An operation device of a camera, the operation device comprising:
    an indication member comprising a plurality of characters, each character of the plurality of characters being representative of at least one of a mode, a function and a setting;
    an operation member which is mechanically movable relative to said indication member, said operation member comprising an index mark for pointing at one of said plurality of characters when said operation member stops at a corresponding stop position; and
    an illuminating device which illuminates the one of said plurality of characters at which said index mark points, said illuminating device comprising a plurality of light emitters, each of said plurality of light emitters illuminating a corresponding one of said plurality of characters; and the camera comprising:
    a control device for selecting the at least one of a mode, a function and a setting which corresponds to the one of said plurality of characters at which said index mark is set to operate in accordance with said selected mode, function and setting.

2. The operation device according to claim 1, the camera comprising:
    an auto picture mode in which an appropriate mode is automatically selected from a plurality of photographic modes based on predetermined conditions.

3. The operation device according to claim 1, wherein, when a power supply of the camera is turned ON, said control device controls said illuminating device to illuminate said one of said plurality of characters at which said index mark points; and
    wherein said control device controls said illuminating device to stop illuminating the at least one of the plurality of characters after a predetermined time has elapsed.

4. The operation device according to claim 1, said operation member further comprising a shutter selecting dial which selects one of a shutter speed and a shutter auto selected mode.

5. The operation device according to claim 1, wherein said illuminating device does not illuminate said one of said plurality of characters when said one of said plurality of characters is set at said index mark.

6. The operation device according to claim 5, further comprising a stop mechanism for stopping said operation member at a corresponding stop position.

7. The operation device according to claim 6, wherein said stop mechanism is positioned substantially in a plane containing said illuminating device.

8. The operation device according to claim 7, said operation member comprising a rotatable cylindrical member which is rotatable relative to a camera body; and said indication member comprising a disk member surrounded by said operation member.

9. The operation device according to claim 8, further comprising a support disk positioned behind said indication member, said illuminating device being fixed to said support disk; and
    said ratatable cylindrical member comprising a bezel having said index mark, the bezel being ratatable around said indication member and said support disk.

10. The operation device according to claim 9, said bezel comprising a bottom end member, said bottom end member defining a through-hole at a center of said bottom end member; and
    said support disk comprising an axial shaft extending through said through hole, said support disk being fixed to a camera body of the camera via said axial shaft.

11. The operation device according to claim 10, said stop mechanism comprising:
    a series of click holes formed on said bottom end member at predetermined intervals;
    a spring member, a part of which is fixed to said support disk; and
    a click ball, which is fitted in a spring member hole, formed on said spring member to stay engaged with said spring member hole;
    wherein said click ball is continuously pressed against said bottom end member by said spring member so as to be engaged with one of said series of click holes when a rotation operation of said bezel stops.

12. The operation device according to claim 11, said illuminating device comprising a plurality of LEDs which are arranged substantially in a circle at predetermined intervals on said support disk; and said support disk comprising a receiving hole in which said spring member is positioned, said plurality of LEDs being arranged on a portion of said support disk other than a portion of said support disk in which the receiving hole is formed;

wherein said spring member is positioned so that said corresponding spring member hole is positioned in said receiving hole.

13. The operation device according to claim 1, wherein the plurality of light emitters of said illuminating device emits a plurality of illuminating lights of different colors.

14. The operation device according to claim 13, wherein said control device controls said illuminating device to turn said plurality of light emitters ON and OFF in said predetermined pattern, between a first mode and a second mode;

wherein, in said first mode, said control device controls said plurality of light emitters to be turned ON and OFF regularly immediately after power of the camera is turned ON; and wherein, in said second mode, said control device controls said plurality of light emitters to be turned ON and OFF irregularly immediately after said power supply of the camera is turned ON.

15. The operation device according to claim 14, wherein said control device switches between said first mode and said second mode each time a battery is loaded in a camera body of the camera when said index mark is set at a second one of said plurality of characters.

16. The operation device according to claim 1, wherein said control device turns each of said plurality of light emitters ON and OFF in a predetermined pattern immediately after a power supply of the camera is turned ON, for a predetermined time, and wherein said control device does not turn said plurality of light emitters ON and OFF in said predetermined pattern after the predetermined time when the camera remains in a power ON state.

17. The operation device according to claim 16, wherein, when said operation member is operated while said control device is controlling said plurality of light emitters to be turned ON and OFF in said predetermined pattern, a lighting controller stops turning the plurality of light emitters ON and OFF in said predetermined pattern and subsequently turns ON one of said plurality of light emitters which corresponds to one of said plurality of characters at which said index mark is set.

18. The operation device according to claim 1, the camera comprising:

an auto picture mode in which an appropriate mode is automatically selected from a plurality of photographic modes based on predetermined conditions;

a flash-prohibiting auto picture mode in which an appropriate mode is automatically selected from said plurality of photographic modes based on predetermined conditions; and a flash-light unit, which is coupled to a camera body of the camera and which is prohibited from discharging in said flash-prohibiting auto picture mode;

wherein one of said plurality of characters represents one of said auto picture mode and another of said plurality of characters represents said flash-prohibiting auto picture mode; and wherein the remaining characters of the plurality of characters represent one each of the remaining plurality of photographic modes.

19. The operation device according to claim 18, wherein, when said power supply of the camera is ON while said index mark is set at said one of the plurality of characters which represents one of said auto picture mode and said flash-prohibiting auto picture mode, said control device turns ON one of the plurality of light emitters which corresponds to said one of said plurality of characters which represents one of said auto picture mode and said flash-prohibiting auto picture mode; and wherein said control device further turns ON another one of said plurality of light emitters which corresponds to another one of said plurality of characters which represents one of said different modes that is automatically selected in one of said auto picture mode and said flash-prohibiting auto picture mode.

20. The operation device according to claim 1, wherein said control device controls said plurality of light emitters to be turned ON and OFF in said predetermined pattern immediately after power to the camera is turned ON only when said index mark is set at said auto picture mode.

21. The operation device in combination with the camera according to claim 1, further comprising:

a camera body, said camera body comprising a built-in flash unit; and an interchangeable lens, removably attached to the camera body, wherein the interchangeable lens is in communication with said control device;

wherein said control device receives lens information from said interchangeable lens and determines whether the interchangeable lens is a type of lens wherein a picture mode can be selected according to the lens information; and wherein, when said control device determines that said auto picture mode cannot be selected, said control device does not turn each of said plurality of light emitters ON and OFF immediately after power to the camera is turned ON.

22. The operation device in combination with the camera according to claim 1, wherein, when power to said camera is switched ON, said control device selects between a mode wherein said plurality of light emitters are turned ON and OFF and another mode wherein said plurality of light emitters are not turned ON and OFF.

23. An operation device of a camera, comprising:

an indication member comprising a plurality of characters;

an operation member which is movable relative to said indication member, said operation member comprising an index mark for pointing at one of said plurality of characters when said operation member stops at a corresponding stop position;

an illuminating device, comprising a plurality of light emitters corresponding to said plurality of characters; and a control device for controlling said illuminating device;

wherein said illuminating device illuminates said one of said plurality of characters at which said index mark points, wherein one character of said plurality of characters represents an auto picture mode in which an appropriate photographic mode is automatically selected from a plurality of photographic modes based on predetermined conditions;

wherein the remaining characters of said plurality of characters each represent respective remaining photographic mode of said plurality of photographic modes;

wherein said control device is turned ON and OFF in a predetermined particular pattern immediately after power to the camera is turned ON;

wherein when the power of the camera is ON and said index mark is set at said one of said plurality of characters which represents said auto picture mode, said control device turns ON one of said plurality of light emitters which corresponds to said one of said plurality of characters which represents said auto picture mode.

24. The operation device according to claim 23, the camera further comprising:

a flash-prohibiting auto picture mode in which an appropriate photographic mode is automatically selected from said plurality of photographic modes based on predetermined conditions; and a flash-light unit, which is coupled to a camera body of the camera, and is being prohibited from discharging in said flash-prohibiting auto picture mode;

wherein one of said plurality of characters represents one of said auto picture mode and said flash-prohibiting auto picture mode; and wherein one of the remaining characters of the plurality of characters represent each corresponding remaining mode of said plurality of photographic modes.

25. The operation device according to claim 23, wherein each of said plurality of light emitters can illuminate a corresponding one of said plurality of characters; and wherein said control device controls said plurality of light emitters to be turned ON and OFF regularly immediately after said power of the camera is turned ON.

26. The operation device according to claim 25, wherein, immediately after said power of the camera is turned ON, said control device controls said plurality of light emitters to be firstly turned ON in a sequential order, and subsequently turned OFF in said sequential order after all of said plurality of light emitters are turned ON.

27. The operation device according to claim 23, wherein each of said plurality of light emitters can illuminate a corresponding one of said plurality of characters; and wherein said control device controls said plurality of light emitters to be turned ON and OFF irregularly immediately after said power supply is turned ON.

28. The operation device according to claim 27, wherein, immediately after said power of the camera is turned ON, said control device controls said plurality of light emitters to be turned ON and OFF one by one at random.

29. The operation device according to claim 23, wherein each of said plurality of light emitters can illuminate a corresponding one of said plurality of characters; and wherein said control device turns ON all of said plurality of light emitters before a predetermined period of time elapses after said power of the camera is turned ON; and wherein said control device turns ON one of said plurality of light emitters which corresponds to one of said plurality of characters at which said index mark is set, after said predetermined period of time elapses.

30. The operation device according to claim 23, wherein each of said plurality of light emitters can illuminate a corresponding one of said plurality of characters; and wherein said control device controls said plurality of light emitters to be turned ON and OFF in said predetermined pattern immediately after said power of the camera is turned ON only when said index mark is set at a specific one of the plurality of characters.

31. The operation device according to claim 23, wherein each of said plurality of light emitters can illuminate a corresponding one of said plurality of characters; and wherein, when said operation member is operated while said control device is controlling said plurality of light emitters to be turned ON and OFF in said predetermined pattern, a lighting controller stops turning said plurality of light emitters ON and OFF in said predetermined pattern and subsequently turns ON one of said plurality of light emitters which corresponds to one of said plurality of characters at which said index mark is set.

32. The operation device according to claim 23, wherein said control device comprehensively controls overall operations of a camera; and wherein said control device stops turning said plurality of light emitters ON and OFF in said predetermined pattern whenever said operation member is operated while said control device is controlling said plurality of light emitters to be turned ON and OFF in said predetermined pattern.

33. The operation device according to claim 23, wherein said control device controls said illuminating device to be turned ON and OFF in said predetermined pattern, between a first mode and a second mode;

wherein, in said first mode, said control device controls said plurality of light emitters to be turned ON and OFF regularly immediately after said power of the camera is turned ON; and wherein, in said second mode, said control device controls said plurality of light emitters to be turned ON and OFF irregularly immediately after said power of the camera is turned ON.

34. The operation device according to claim 23, wherein said control device sets one of a first mode and a second mode;

wherein, in said first mode, said control device controls said illuminating device to be turned ON and OFF regularly immediately after said power of the camera is turned ON;

wherein, in said second mode, said control device controls said illuminating device to be turned ON and OFF irregularly immediately after said power of the camera is turned ON; and wherein said control device switches between said first mode and said second mode each time a battery is loaded in the camera when said index mark is set at a second one of said plurality of characters.

35. The operation device according to claim 23, where said illuminating device emits a plurality of illuminating lights of different colors.

36. The operation device according to claim 35, wherein a color of one of said plurality of illuminating lights which illuminates a corresponding one of said plurality of characters is different from a color of another one of said plurality of illuminating lights which illuminates a corresponding another one of said plurality of characters.

37. The operation device according to claim 23, wherein a first one of said plurality of characters represents said auto picture mode and is illuminated by one of said plurality of light emitters which has a first color;

wherein a second one of said plurality of characters represents said flash-prohibiting auto picture mode and is illuminated by another one of said plurality of light emitters which has a second color that is different from said first color; and wherein the remaining characters of said plurality of characters represent a corresponding one of each remaining photographic mode of said plurality of photographic modes and are respectively illuminated by yet another one of said plurality of light emitters which have a common third color that is different from said first color and said second color.

38. The operation device according to claim 37, wherein at least one of said plurality of characters represents a corresponding mode which is not automatically selected in one of said auto picture mode and said flash-prohibiting auto picture mode, said at least one of said plurality of characters being illuminated by another one of said plurality of light emitters which has a fourth color that is different from said first color, said second color and said third color.

39. The operation device according to claim 23, wherein at least two of said plurality of characters which can be illuminated by said illuminating device represent at least two different corresponding program exposure modes of a plurality of program exposure modes.

40. The operation device according to claim 23, wherein at least two of said plurality of characters which can be illuminated by said illuminating device respectively correspond to at least two groups of numerals of a plurality of numerals, each of which represents a different shutter speed.

41. An operation device of a camera, comprising:
    an indication member, comprising transparent character portions that correspond to a first plurality of characters and opaque character portions that correspond to a second plurality of characters;
    an operation member which is movable relative to said indication member, comprising an index mark for pointing at one of said first plurality of characters and said second plurality of characters when said operation member stops at a corresponding stop position;
    an illuminating device which illuminates at least one of the transparent character portions corresponding to one of said first plurality of characters at which said index mark points;
    a stop mechanism for stopping said operation member at said corresponding stop position, wherein said stop mechanism lies substantially in a plane in which said illuminating device lies; and
    a support member on which at least one light emitter of said illuminating device is mounted, wherein at least one element of said stop mechanism is fixed to a part of said support member which faces said opaque portions corresponding to said second plurality of characters of said indication member.

42. The operation device according to claim 41, said operation member comprising a rotatable cylindrical member which is rotatable relative to a camera body of the camera; and
    said indication member further comprising a disk member which is surrounded by said operation member.

43. The operation device according to claim 42, wherein said support member is positioned behind said indication member, said illuminating device being fixed to said support member; and
    wherein said operation member comprises a bezel, having said index mark, said bezel being rotatable around said indication member and said support member.

44. The operation device according to claim 43, said bezel comprising a bottom end member, said bottom end member defining a through hole at a center location; and
    said support member comprising an axial shaft extending through said through hole, said support member being fixed to said camera body via said axial shaft.

45. The operation device according to claim 44, further comprising a stop mechanism for stopping said operation member at said corresponding stop position;
    said stop mechanism comprising:
        a series of click holes formed on said bottom end member at predetermined intervals;
        a spring member, a part of which is fixed to said support member; and
        a click ball which is fitted in a spring member hole, said click ball being formed on said spring member and engaged with said spring member hole;
    wherein said click ball is continuously pressed against said bottom end member by said spring member to engage one of said series of click holes when a rotation operation of said bezel stops.

46. The operation device according to claim 45, said illuminating device comprising a plurality of LEDs which are arranged on said support member substantially along a circle at predetermined intervals; and
    said support member further comprising a receiving hole in which said spring member is positioned, said plurality of LEDs being arranged on a portion of said support member other than a portion of said support member on which said receiving hole is formed;
    wherein said spring member is positioned so that said spring member hole is positioned in said receiving hole.

47. The operation device according to claim 46, further comprising:
    a control device for selecting at least one of a mode, a function and a setting which corresponds to one of said plurality of characters at which said index mark is set, to operate in accordance with said selected mode, function and setting;
    wherein, the camera is ON, said control device controls one of said plurality of LEDs, which corresponds to said one of said plurality of characters at which said index mark points, to be turned ON.

48. The operation device according to claim 47, wherein said control device turns OFF one of said plurality of LEDs after a predetermined period of time elapses after said one of said plurality of LEDs is turned ON; and
    wherein said control device turns ON one of said plurality of LEDs which corresponds to said one of said plurality of characters at which said index mark is set, each time said bezel is operated.

49. The operation device according to claim 47, the camera comprising:
    an auto picture mode in which an appropriate mode is automatically selected from a plurality of modes based on predetermined conditions; and
    a flash-prohibiting auto picture mode in which an appropriate mode is automatically selected from said plurality of modes based on predetermined conditions, a flash-light unit, which is coupled to a body of the camera, being prohibited from discharging in said flash-prohibiting auto picture mode;
    wherein one of said plurality of characters represents one of said auto picture mode and another one of said plurality of characters represents said flash-prohibiting auto picture mode;
    wherein said remaining characters of said plurality of characters respectively represent each remaining different mode of said plurality of modes;
    wherein, when power of the camera is ON while said index mark is set at said one of said plurality of characters which represents one of said auto picture mode and said flash-prohibiting auto picture mode, said control device turns ON one of said plurality of LEDs which corresponds to said one of said plurality of characters which represents one of said auto picture mode and said flash-prohibiting auto picture mode;

wherein said control device further turns ON another one of said plurality of LEDs which corresponds to one of said remaining characters of said plurality of characters which represents one of said remaining different modes of said plurality of modes that is automatically selected in one of said auto picture mode and said flash-prohibiting auto picture mode; and wherein, when said power of the camera is ON while said index mark is set at one of said remaining characters of said plurality of characters which respectively represent said remaining different modes of said plurality of modes, said controller turns ON one of said plurality of LEDs which corresponds to said one of said remaining characters of said plurality of characters which respectively represent said plurality of photographic modes.

50. The operation device according to claim 47, wherein said control device turns each of said plurality of LEDS ON and OFF in a predetermined pattern immediately after said power of the camera is turned ON for a predetermined time, wherein said control device does not turn said plurality of LEDs ON and OFF in said predetermined pattern after the predetermined time when the camera remains in a power-ON state.

51. An operation device of a camera, comprising:

an indication member comprising a plurality of illustrative characters, said plurality of illustrative characters being visible on an upper face of said indication member;

an operation member that is mechanically movable relative to said indication member, said operation member comprising an index mark that points at one of said plurality of illustrative characters when said operation member stops at a stop position associated with the one of said plurality of illustrative characters; and an illuminating device that illuminates the one of said plurality of characters at which said index mark points.

52. The operation device of a camera according to claim 51, wherein each of the plurality of illustrative characters is translucent.

53. An operation device of a camera, comprising:

an indication member, comprising a plurality of illustrative characters, said plurality of illustrative characters being visible on an upper face of said indication member, each of said plurality of illustrative characters corresponding to one of a plurality of photographic controls of the camera;

an operation member that is configured to move relative to said indication member, said operation member comprising an index mark that points at one of said plurality of illustrative characters when said operation member stops at a corresponding stop position;

an illuminating device that illuminates from below at least the one of said plurality of illustrative characters at which said index mark points; and a stop mechanism that stops said operation member at said corresponding stop position, wherein said stop mechanism lies substantially in a plane in which said illuminating device lies.

54. The operation device of a camera according to claim 53, wherein each of the plurality of illustrative characters is translucent.

* * * * *